United States Patent [19]

Morita et al.

[11] Patent Number: 5,425,897

[45] Date of Patent: Jun. 20, 1995

[54] LIQUID-CRYSTALLINE COPOLYMER, PROCESS FOR THE PREPARATION OF THE SAME, DIENE COMPOUND USED FOR THE PREPARATION OF THE SAME AND PROCESS FOR THE PREPARATION OF THE DIENE COMPOUND

[75] Inventors: Kazuharu Morita, Katsuta; Satoshi Hachiya, Sodegaura; Fumio Moriwaki, Sodeguara; Hiroyuki Endo, Sodegaura, all of Japan

[73] Assignee: Idemitsu Kosan Co., Ltd., Tokyo, Japan

[21] Appl. No.: 297,052

[22] Filed: Aug. 26, 1994

Related U.S. Application Data

[62] Division of Ser. No. 67,135, May 26, 1993, Pat. No. 5,380,915, which is a division of Ser. No. 838,242, Mar. 5, 1992, Pat. No. 5,281,685.

[30] Foreign Application Priority Data

Jul. 24, 1990 [JP]  Japan ................................. 2-194065

[51] Int. Cl.$^6$ ........................ C09K 19/34; C07D 239/02
[52] U.S. Cl. ........................ 252/299.61; 252/199.01; 544/298; 544/301; 544/303; 544/335
[58] Field of Search ............ 252/299.01, 299.61; 544/298, 302, 303, 335

[56] References Cited

U.S. PATENT DOCUMENTS

| | | | |
|---|---|---|---|
| 4,388,453 | 6/1983 | Finkelmann et al. | 528/15 |
| 4,826,954 | 5/1989 | Suzuki et al. | 528/15 |
| 4,950,726 | 8/1990 | Yoshioka et al. | 528/15 |
| 4,981,607 | 1/1991 | Okawa et al. | 528/15 |
| 4,997,591 | 3/1991 | Heppke et al. | 252/299.61 |
| 5,098,978 | 3/1992 | Riepl et al. | 528/15 |
| 5,138,010 | 8/1992 | Keller et al. | 528/26 |
| 5,264,517 | 11/1993 | Endo et al. | 528/26 |
| 5,281,685 | 1/1994 | Morita et al. | 528/26 |
| 5,336,435 | 8/1994 | Endo et al. | 252/299.61 |

FOREIGN PATENT DOCUMENTS

| | | |
|---|---|---|
| 2407950 | 12/1977 | France . |
| 2647455 | 11/1990 | France . |
| 63-234086 | 9/1988 | Japan . |
| 63-280742 | 11/1988 | Japan . |
| 1-139551 | 6/1989 | Japan . |
| 1-217040 | 8/1989 | Japan . |
| 1-278532 | 11/1989 | Japan . |
| 2-000640 | 1/1990 | Japan . |
| 2-067393 | 3/1990 | Japan . |

*Primary Examiner*—Shean Wu
*Attorney, Agent, or Firm*—Antonelli, Terry, Stout & Kraus

[57] ABSTRACT

A liquid-crystalline copolymer comprising the repeating units represented by the following general formulas

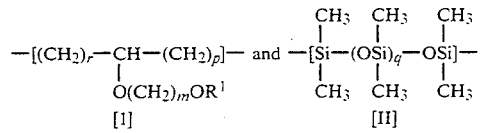

wherein each of r and p is an integer of 2 to 5, q is an integer of 0 to 3, m is an integer of 1 to 20, and $R^1$ is (Abstract continued on next page.)

[57] ABSTRACT
-continued

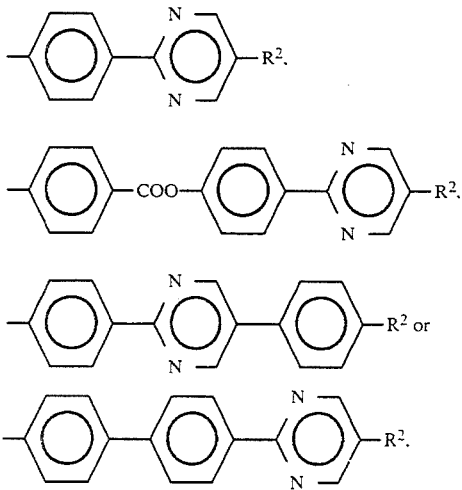

$R^2$ being —$COOR^3$, —$OR^3$ or —$OCOR^3$,
$R^3$ being

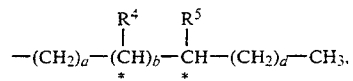

each of $R^4$ and $R^5$ being —$CH_3$ or a halogen atom, each of a and d being an integer of 0 to 10, b being an integer of 0 or 1, with the proviso that d is not 0 when $R^5$ is —$CH_3$, the repeating units [I] and [II] being present in the liquid-crystalline copolymer in a substantial molar ratio [I]:[II] of 1:1, exhibits ferroelectricity even at a temperature neighboring room temperature and having a high response speed to changes of external electric fields.

3 Claims, 29 Drawing Sheets

LIQUID-CRYSTALLINE COPOLYMER, PROCESS FOR THE PREPARATION OF THE SAME, DIENE COMPOUND USED FOR THE PREPARATION OF THE SAME AND PROCESS FOR THE PREPARATION OF THE DIENE COMPOUND

This application is a Divisional application of application Ser. No. 067,135, filed May 26, 1993 now U.S. Pat. No. 5,580,915, which application is a Divisional application of application Ser. No. 838,242, filed Mar. 5, 1992 (now U.S. Pat. No. 5,281,685).

TECHNICAL FIELD

The present invention relates to novel liquid-crystalline copolymers, a process for the preparation thereof, diene compounds used for the preparation thereof and processes for the preparation of the diene compounds. Particularly, the present invention relates to novel liquid-crystalline copolymers which exhibit ferroelectricity even at temperatures around room temperature, respond to the changes of external electric fields at such a high speed as to enable display of motion pictures and is useful as display elements for display in a large plane or a bent plane, to a process for the preparation thereof, diene compounds used for the preparation thereof and to processes for the preparation of the diene compounds. The liquid-crystalline copolymers are useful in various fields of optoelectronics, particularly, as a display element of desk calculators, clocks and watches, etc., and as various kinds of electronic, optical elements for, for example, electronic optical shatters, electronic optical diaphragms, optical modulators, optical-path transfer switches in optical communication systems, memories, liquid crystal printer heads, varifocal lenses, etc.

BACKGROUND ART

Display devices containing low molecular weight liquid crystals as display elements have been widely used for digital display of desk calculators, clocks and watches, etc. In these fields of utilization, the conventional low molecular weight liquid crystals are generally interposed between a couple of glass substrates which are arranged with a separation distance adjusted in micron unit. However, such an adjustment of the space has been practically impossible in the production of displays with a large picture plane or a bent picture plane. In order to solve the problem, some attempts have been made to develop polymeric liquid crystals so as to render liquid crystals themselves moldable (for example, J. Polym., Sci, Polym., Lett., Ed. 13, 243 (1975), Polym., Bull., 6, 309 (1982), Japanese Patent Application Kokai Koho (Laid-open) No. 56-21479).

These polymeric liquid crystals, however, have a defect that they do not exhibit properties of liquid crystals at room temperature unless they are heated to a temperature not lower than the glass transition temperatures thereof and lower than the clearing temperatures thereof in order to transit them into a liquid crystal state.

Japanese Patent Application Kokai Koho (Laid-open) No. 63-99204 reports the synthesis of polyacrylate-type ferroelectric liquid-crystalline polymers and shows that they are improved in performances as compared with the above-described polymeric liquid crystals. Nevertheless, even these side-chain type polymeric liquid crystals are unsatisfactory in their response speeds and the temperature ranges in which they can function.

In Japanese Patent Application Kokai Koho (Laid-open) No. 63-254529 are disclosed polyether-type ferroelectric polymeric liquid crystals obtainable by polymerizing epoxy monomers, for example polymeric liquid crystals which are represented by the following formula

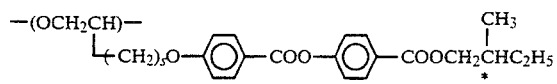

wherein s is an integer of 1 to 30, and are obtained by polymerizing epoxy compounds represented by the following formula

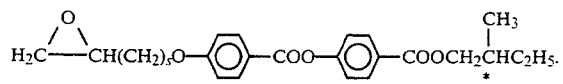

Although the side-chain type polymeric liquid crystals have an advantageous capability to respond to stimulations with external electric fields at a wide range of temperature including room temperature or the vicinity, they are still insufficient for practical use.

An object of the present invention is to provide a novel polymeric liquid crystal which not only exhibits ferroelectricity at a wide range of temperature including room temperature but also responds to external electric fields at great speed.

Another object of the present invention is to provide a process for the preparation of the polymeric liquid crystal, a diene compound usable for the preparation of the polymeric liquid crystals and a process for the preparation of the diene compound.

DISCLOSURE OF INVENTION

The inventors made researches for solving the above-described problems with the result that they found that novel copolymers comprising a repeating unit of a linear hydrocarbon structure having aromatic rings in side chains and a repeating unit of a siloxane structure exhibit SmC* phase at a wide range of temperature including room temperature and respond to the changes of electric fields at great speed, and the finding led them to completion of the present invention.

The present invention provides a liquid-crystalline copolymer comprising a repeating unit represented by the following general formula

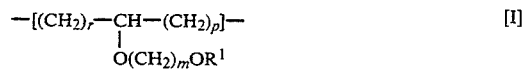

and a repeating unit represented by the following general formula

wherein each of r and p is an integer of 2 to 5, q is an integer of 0 to 3, m is an integer of 1 to 20, and $R^1$ is

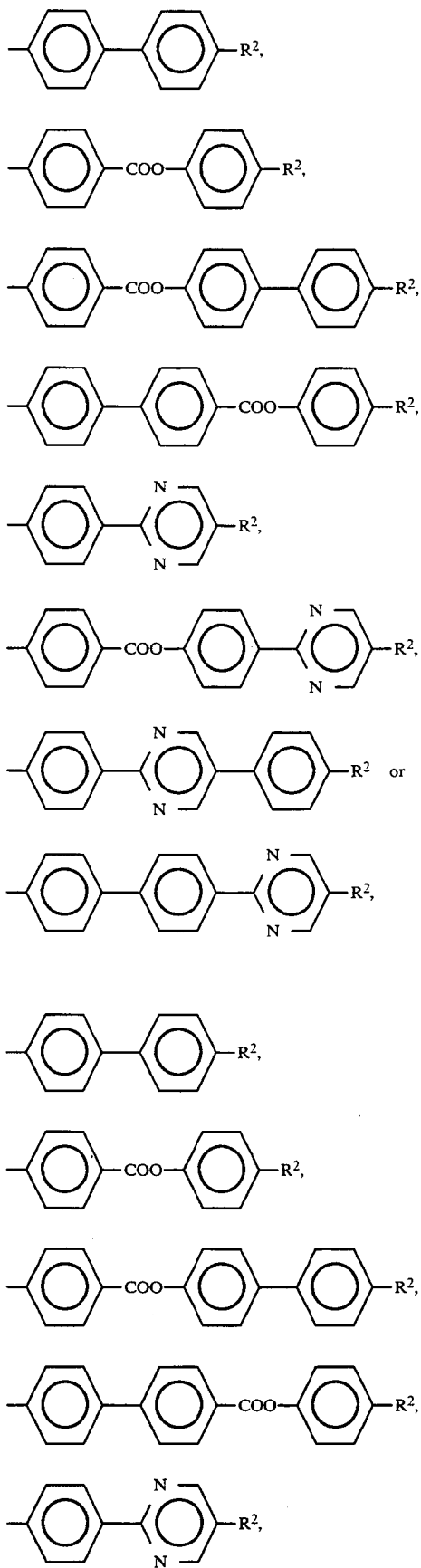

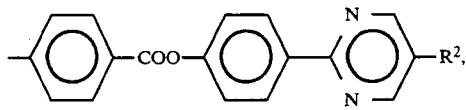

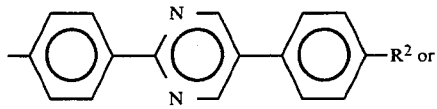

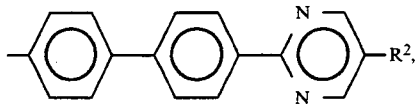

$R^2$ being

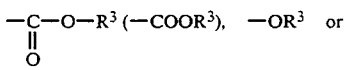

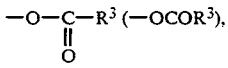

$R^3$ being

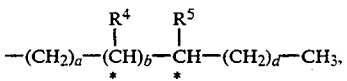

each of $R^4$ and $R^5$ being —$CH_3$ or a halogen atom, each of a and d being an integer of 0 to 10, b being an integer of 0 or 1, with the proviso that d is not 0 when $R^5$ is —$CH_3$, the repeating unit represented by the general formula [I] and the repeating unit represented by the general formula [II] being present in the liquid-crystalline copolymer in a substantial molar ratio [I]:[II] of 1:1.

The liquid-crystalline copolymer of the present invention preferably has a number average molecular weight (Mn) of 1,000 to 1,000,000, more preferably 1,000 to 100,000.

If the liquid-crystalline copolymer has a number average molecular weight of less than 1,000, they may sometimes be difficult to form into film or coating, and a number average molecular weight of more than 1,000,000 may sometimes cause disadvantages, such as a poor response speed.

In the above formula, m is an integer of 1 to 20, preferably 6 to 12, and each of a and d is an integer of 0 to 10, and a is preferably 0 or 1 and b is preferably an integer of 1 to 5.

The liquid-crystalline copolymer of the present invention may be prepared by carrying out a hydrosilylating reaction of substantially equimolecular quantities of a diene compound represented by the following general formula

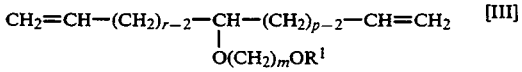

wherein r, p, $R^1$, $R^2$, $R^3$, $R^4$, $R^5$, a, b and d are as defined above,
and a silicon compound represented by the following general formula

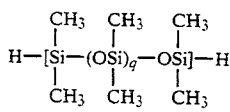

[IV]

wherein q is as defined above,
in a solvent in the presence of a catalyst.

Preferred examples of the solvent in which the hydrosilylating reaction of the compound [III] and the compound [IV] is carried out include an inert aromatic hydrocarbon having a boiling point of not lower than 70° C., such as benzene, toluene or xylene, and an inert ether solvent having a boiling point of not lower than 70° C., such as tetrahydrofuran or diisopropyl ether. Preferred examples of the catalyst to be used for the reaction include a platinum catalyst, such as a chloroplatinic acid such as hexachloroplatinic acid hexahydrate, and dicyclopentadienylplatinum chloride. The reaction is carried out preferably in an inert atmosphere at 60° to 90° C. for 5 to 20 hours.

The diene compound, which is used as a starting material of the above-described copolymer and is represented by the following general formula, $$CH_2=CH-(CH_2)_{r-2}-\underset{\underset{O(CH_2)_mR^1}{|}}{CH}-(CH_2)_{p-2}-CH=CH_2 \quad [III]$$

is a novel compound, and the presence of a repeating unit derived from this starting material renders a decreased viscosity to the copolymer so that the copolymer responds to the changes of electric fields at an increased speed. The diene compound may be used not only for the preparation of the liquid-crystalline copolymer of the present invention but also as a modifying agent for other liquid-crystalline polymers.

For example, the diene compound [III] may be prepared by carrying out an etherification reaction of an alcohol [V] represented by the following general formula $$CH_2=CH-(CH_2)_{r-2}-\underset{\underset{OH}{|}}{CH}-(CH_2)_{p-2}-CH=CH_2$$

wherein each of r and p is an integer of 2 to 5, and a difunctional compound [VI] represented by the following general formula $$X(CH_2)_mX$$

wherein m is an integer of 1 to 20, X is -Br, -I or

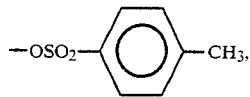

in a solvent in the presence of an alkali agent, purifying a reaction mixture obtained by the etherification reaction to obtain a purified product, and carrying out an etherification reaction of the purified product and a hydroxy compound [VII] represented by the following general formula $$HO-R^1$$

wherein $R^1$, $R^2$, $R^3$, $R^4$, $R^5$, a, b and d are as defined above,
in a solvent in the presence of an alkali agent.

For example, the reaction is conducted as follows.

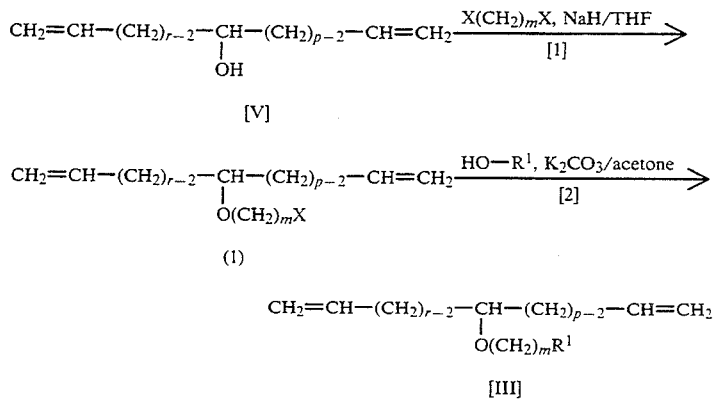

After a compound (1) is prepared by carrying out an etherification reaction [1] of the alcohol [V] and the difunctional compound [VI] in a solvent in the presence of an alkali agent, an etherification reaction [2] of the compound (1) and the hydroxy compound [VII] is carried out in a solvent in the presence of an alkali agent to obtain the objective diene compound [III].

Typical examples of the alcohol [V] include 1,4-pentadien-3-ol, 1,5-hexadien-3-ol, 1,6-heptadien-3-ol 1,7-octadien-3-ol, 1,6-heptadien-4-ol, 1,7-octadien-4-ol, 1,8-nonadien-5-ol and 1,10-undecadien-6-ol.

Typical examples of the difunctional compound [VI] include dibromomethane, diiodomethane, ditosylmethane, dibromoethane, diiodoethane, ditosylethane, dibromopropane, diiodopropane, ditosylpropane, dibromobutane, diiodobutane, ditosylbutane, dibromopentane, diiodopentane, ditosylpentane, dibromohexane, diiodohexane, ditosylhexane, dibromoheptane, diiodoheptane, ditosylheptane, dibromooctane, diiodooctane, ditosyloctane, dibromononane, diiodononane, ditosylnonane, dibromodecane, diiododecane, ditosyldecane, dibromoundecane, diiodoundecane, ditosylundecane, dibromododecane, diiodododecane, ditosyldodecane, dibromotridecane, diiodotridecane, ditosyltridecane, dibromotetradecane, diiodotetradecane, ditosyltetradecane, dibromopentadecane, diiodopentadecane, ditosylbentadecane, dibromohexadecane, diiodohexadecane, ditosylhexadecane, dibromoheptadecane, diiodoheptadecane, ditosylheptadecane, dibromooctadecane, diiodooctadecane, ditosyloctadecane, dibromononadecane, diiodononadecane, ditosylnonadecane, dibromoeicosane, diiodoeicosane and ditosyleicosane.

Preferred examples of the compound R¹—OH [VII] include those represented by the formulas

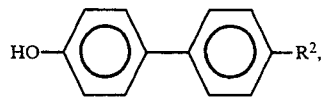

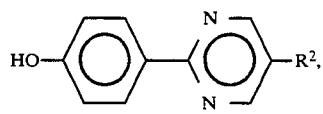

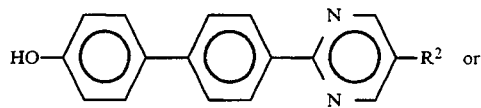

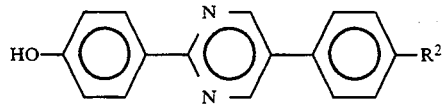

wherein R² is —COOR³, —OR³ or —OCOR³, and R³ is an optically active group as described above.

The optically active group of R² is introduced into the R² by the following reactions using an optically active alcohol R³—OH and or an optically active carboxylic acid R³COOH.

—COOH+R³OH→—COOR³

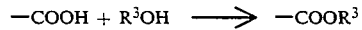

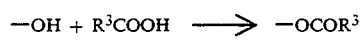

—OH+R³COOH→—OCOR³

Some examples of the optically active alcohol R³—OH include (+)-2-methylbutanol, (−)-2-methylbutanol, (+)-2-chlorobutanol, (−)-2-chlorobutanol, (+)-2-methylpentanol, (−)-2-methylpentanol, (+)-3-methylpentanol, (−)-3-methylpentanol, (+)-4-methylhexanol, (−)-4-methylhexanol, (+)-2-chloropropanol, (−)-2-chloropropanol, (+)-6-methyloctanol, (−)-6-methyloctanol, (+)-2-cyanobutanol, (−)-2-cyanobutanol, (+)-2-butanol, (−)-2-butanol, (+)-2-pentanol, (−)-2-pentanol, (+)-2-octanol, (−)-2-octanol, (+)-1,1,1-trifluoro-2-octanol, (−)-1,1,1-trifluoro-2-octanol, (+)-2-fluorooctanol, (−)-2-fluorooctanol, (+)-2-fluoroheptanol, (−)-2-fluoroheptanol, (+)-2-fluorohexanol, (−)-2-fluorohexanol, (+)-2-fluorononanol, (−)-2-fluorononanol, (+)-2-chloro-3-methylpentanol and (−)-2-chloro-3-methylpentanol.

Some examples of the optically active carboxylic acid R³—COOH include (+)-2-methylbutanoic acid, (−)-2-methylbutanoic acid, (+)-2-chlorobutanoic acid, (−)-2-chlorobutanoic acid, (+)-2-methylpentanoic acid, (−)-2-methylpentanoic acid, (+)-3-methylpentanoic acid, (−)-3-methylpentanoic acid, (+)-4-methylhexanoic acid, (−)-4-methylhexanoic acid, (+)-2-chloropropanoic acid, (−)-2-chloropropanoic acid, (+)16-methyloctanoic acid, (−)-6-methyloctanoic acid, (+)-2-cyanobutanoic acid, (−)-2-cyanobutanoic acid, (+)-2-fluorooctanoic acid, (−)-2-fluorooctanoic acid, (+)-2-chloro-3-methylpentanoic acid and (−)-2-chloro-3-methylpentanoic acid.

Among the alcohols [VII] represented by R¹—OH, pyrimidine derivatives are novel compounds which are prepared by the following process.

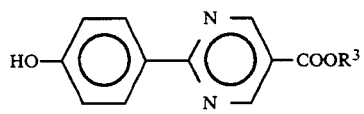

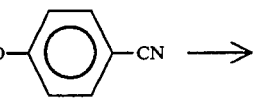

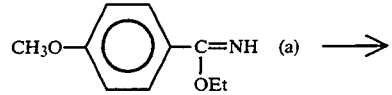

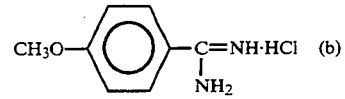

Gaseous hydrogen chloride is bubbled into 4-methoxybenzonitrile dissolved in ethanol solvent, and the solvent is then removed out by concentration to obtain the compound (a). The compound (a) is then dissolved in methanol and is allowed to react with gaseous ammonia bubbled therein, and the resulting reaction mixture is concentrated to obtain an amidine salt (b).

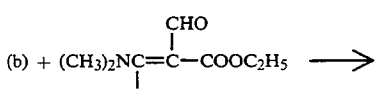

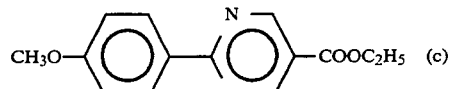

The amidine salt (b) and 2-ethoxycarbonyl-3-dimethylaminoacrolein are allowed to react with each other in ethanol solvent in the presence of sodium ethoxide, to obtain the above compound (c).

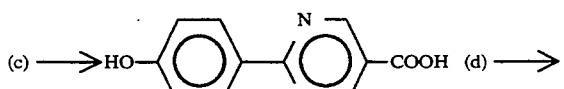

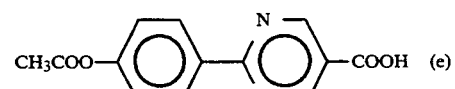

The protecting group is removed from the compound (c) by a HBr/acetic acid treatment to obtain a compound (d), which is then acetylated with acetic anhydride to obtain a compound (e).

(e) →

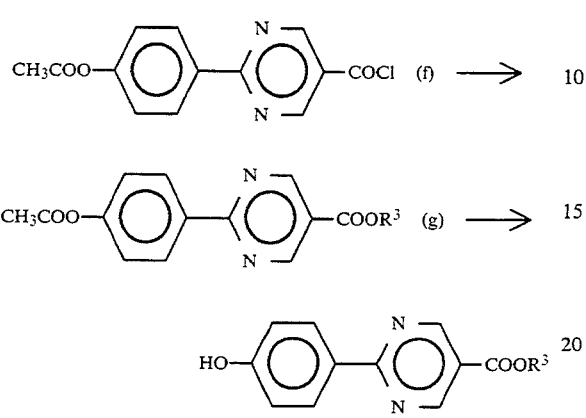

The acetylated carboxylic acid derivative (e) is treated with thionyl chloride or the like to form an acid chloride (f), which is then subjected to an esterification reaction with an optically active alcohol to obtain an ester compound (g). The protecting group, namely acetyl group, is then removed by using benzylamine or the like to obtain the objective alcohol compound.
Preparation of

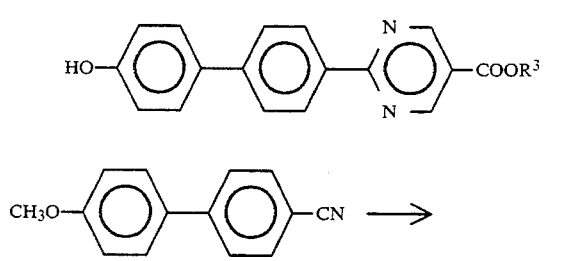

(the same reaction procedure as that for the preparation of

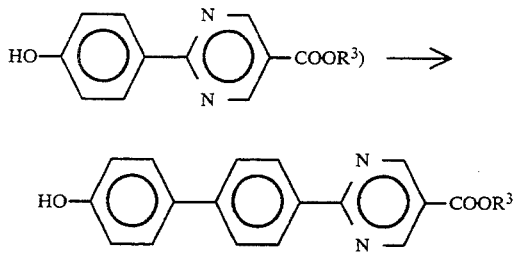

The same procedure as that employed for the preparation of

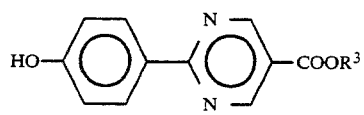

is employed with the exception that 4-methoxy-4'-cyanobiphenyl is used in place of 4-methoxybenzonitrile, to obtain the objective compound.
Preparation of

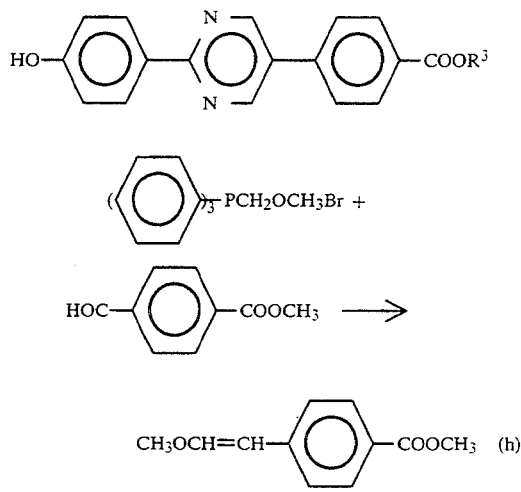

After butyllithium is added to a THF solution of methoxymethyltriphenylphosphonium bromide, methyl 4-formylbenzoate is added thereto, and a reaction is carried out to obtain (h).

$(CH_3)_2NCHO + (h)$ 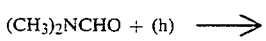

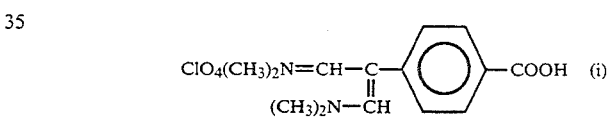

To DMF solvent added is phosphorus oxychloride followed by the benzoate compound (h), and the mixture is then poured into an aqueous sodium perchlorate solution to obtain an iminium salt (i).

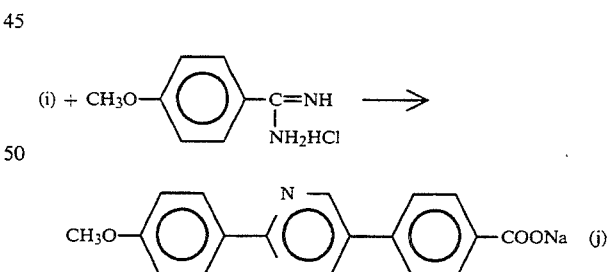

The iminium salt (i) and the amidine salt (b) obtained in the course of the preparation of

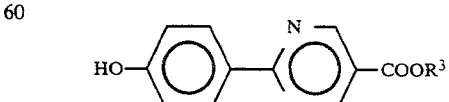

are allowed to react with each other in methanol solvent in the presence of sodium methoxide, to obtain a compound (j).

(j) ⟶ 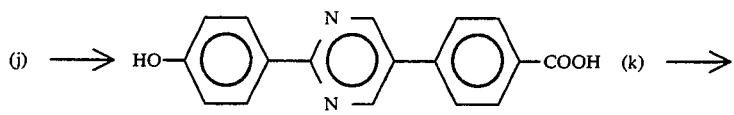 (k) ⟶

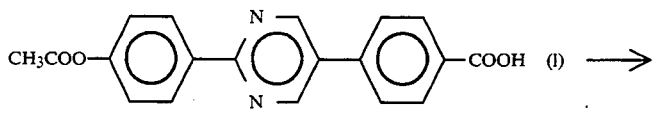 (l) ⟶

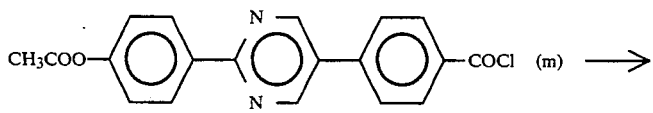 (m) ⟶

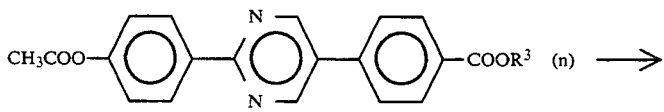 (n) ⟶

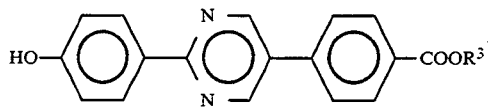

Removal of the protecting group (k), acetylation (l), conversion to an acid chloride (m), esterification (n) and removal of the protecting group are carried out in the same manner as in the preparation of

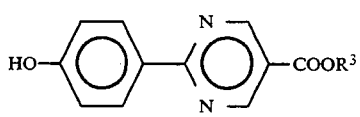

to obtain the objective compound.
Preparation of

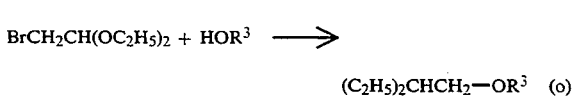

BrCH₂CH(OC₂H₅)₂ + HOR³ ⟶

(C₂H₅)₂CHCH₂—OR³ (o)

An optically active alcohol dissolved in THF is allowed to react with sodium hydride and was then allowed to react with bromoacetaldehyde diethylacetal, to obtain a compound (o).

(CH₃)₂NCHO $\xrightarrow{POCl_3}$ (CH₃)₂N=CHClPO₂Cl₂ $\xrightarrow{(o)}$ (CH₃)₂NCH=COR³ (p)
  |
  OHC After phosphorus oxychloride is added to N,N-dimethylformamide, reaction is carried out by adding the compound (o) thereto, to obtain a compound (p).

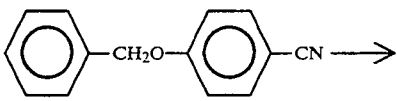 ⟶

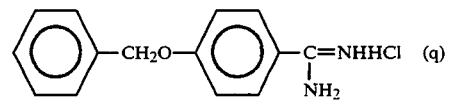 (q)

After gaseous hydrogen chloride is bubbled into an ethanol solution of 4-benzyloxybenzonitrile, the solution is concentrated. The concentrate is then dissolved in ethanol, and gaseous ammonia is bubbled therein, to obtain a compound (q).

(p) + (q) ⟶

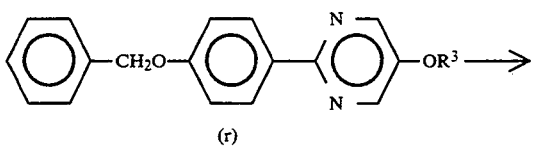 ⟶

(r)

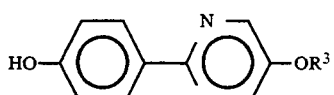

The compounds (p) and (q) dissolved in ethanol solvent are allowed to react with each other by adding sodium methoxide, to obtain a compound (r). The protecting group of the compound (r) is removed in an atmosphere of gaseous hydrogen in the presence of palladium carbon catalyst, to obtain the objective compound.
Preparation of

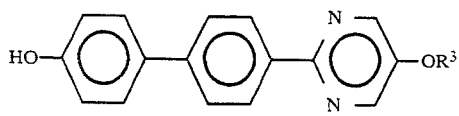

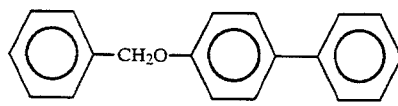 → (the same reaction procedure as that for the preparation of 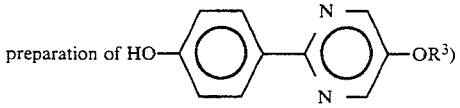)

→ 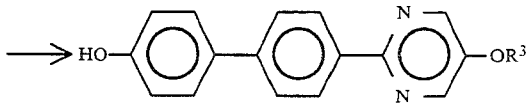

The same procedure as that employed for the preparation of

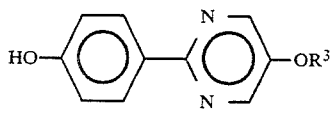

is employed with the exception that 4'-benzyloxy-4-cyanobiphenyl is used in place of 4'-methoxybenzylbenzonitrile, to obtain the objective compound.

Preparation of

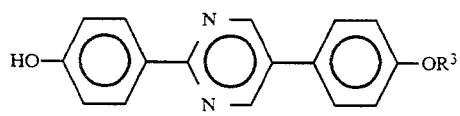

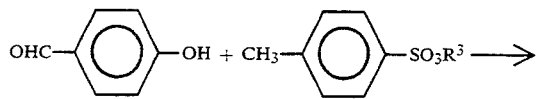 →

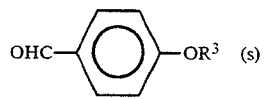 (s)

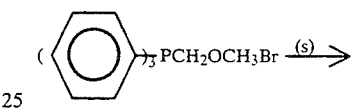 →

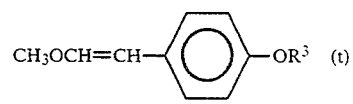 (t)

Butyllithium is added to a THF solution of methoxymethyltriphenylphosphonium bromide. The compound (s) is added thereto and allowed to react to obtain a compound (t).

$(CH_3)_2NCHO + (t) \longrightarrow$

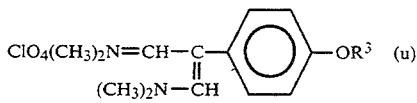 (u)

To DMF solvent is added phosphorus oxychloride followed by the compound (t), and the mixture was then poured into an aqueous sodium perchlorate solution, to obtain an iminium salt (u).

(u) + 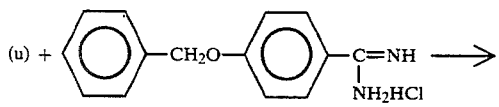 →

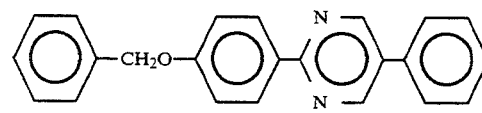 (v) → 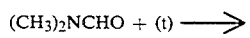

The iminium salt (u) and the amidine salt (q) obtained in the course of the preparation of

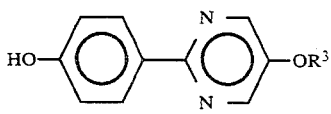

4-hydroxybenzaldehyde, an optically active p-toluene sulfonate and potassium carbonate are allowed to react in acetone solvent, to obtain an ether compound (s).

are allowed to react with each other in methanol solvent in the presence of sodium methoxide, to obtain a compound (v).

Removal of the protecting group from the compound (v) is carried out in an atmosphere of gaseous hydrogen in the presence of palladium carbon catalyst, to obtain the objective compound.

Preferred examples of the solvent used in the etherification reaction [1] include an aprotic polar solvent, such as tetrahydrofuran or N,N-dimethylformamide, and preferred examples of the etherifying agent include a metal hydride, such as sodium hydride, a metal hydroxide, such as potassium hydroxide or sodium hydroxide, and a basic compound having an ability of ionizing —OH.

In the etherification reaction [1], an alkali agent is introduced in a mixture of the alcohol [V] and a solvent to convert the alcohol to an alkoxide at room temperature (when the reactivity between the alcohol and the alkali agent is low, the reaction system may be heated). Subsequently, a dibromo compound [VI] is introduced therein, and the reaction is performed by conducting heating to 60° to 100° C. with stirring.

Preferred examples of the solvent used in the etherification reaction [2] include a ketone solvent, such as acetone or methyl ethyl ketone, an inert ether solvent, such as tetrahydrofuran or ether, and a lower alcohol, such as methanol or ethanol, and preferred examples of the etherifying agent include a carbonate, such as potassium carbonate or sodium carbonate, and a metal hydroxide, such as potassium hydroxide or sodium hydroxide.

The etherification reaction [2] is carried out by introducing a hydroxy compound [VII], a dibromo compound [VI], an alkali agent and a solvent into a reaction vessel not in order and heating them to 60° to 100° C. with stirring.

An example of the alternative to the process for the preparation of the compound [III] is a process which comprises carrying out an etherification reaction of an alcohol [V] represented by the following general formula $$CH_2=CH-(CH_2)_{r-2}-\underset{\underset{OH}{|}}{CH}-(CH_2)_{p-2}-CH=CH_2$$

wherein each of r and p is an integer of 2 to 5, and a difunctional compound [VI] represented by the following general formula $$X(CH_2)_mX$$

wherein m is an integer of 1 to 20, X is -Br, -I or

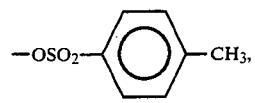

in a solvent in the presence of an alkali agent, purifying a reaction mixture obtained by the etherification reaction to obtain a purified product, carrying out an etherification reaction of the purified product and a compound [VIII] represented by the following general formula

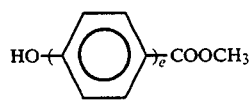

wherein e is an integer of 1 or 2, in a solvent in the presence of an alkali agent, collecting off a product from a reaction mixture obtained by the etherification reaction by filtration, hydrolyzing the product in water or an alcohol, pouring a reaction solution obtained by the hydrolysis into water to obtain a solution, making the pH of the solution acidic by adding a mineral acid, carrying out extraction of the acidified solution with ether, removing ether from the extrate to obtain a solid product, allowing the solid product to react with an acid halogenating agent to obtain an acid halide, carrying out an esterification reaction of the acid halide and a hydroxy compound [IX] represented by the following general formula $$HO-A-R^2$$

wherein A is

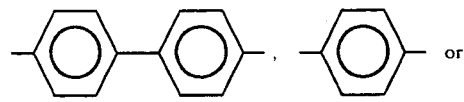

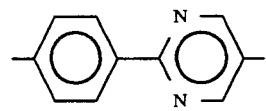

in a solvent.

For example, the reactions are conducted as follows.

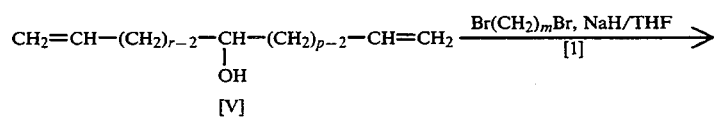

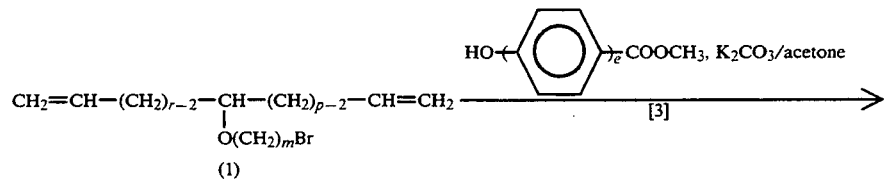

-continued

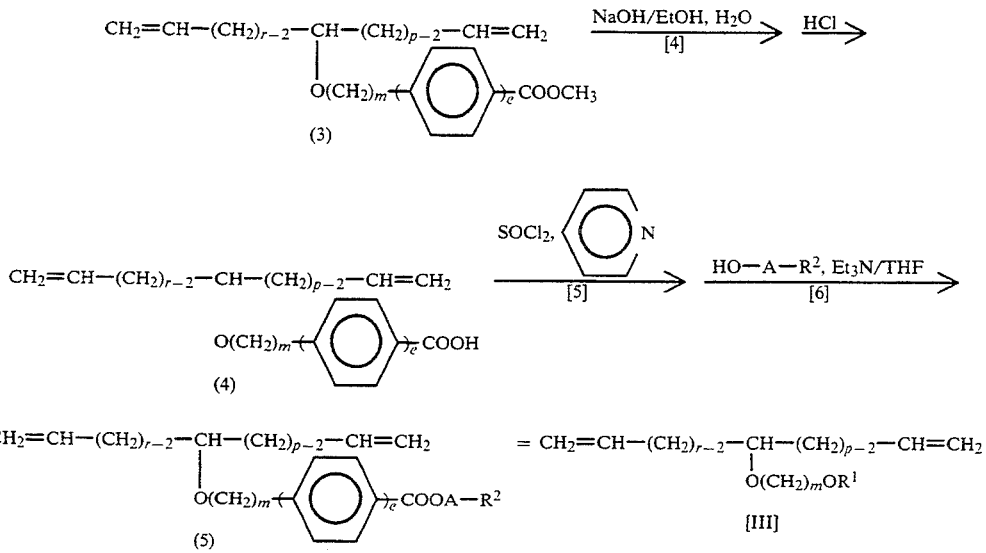

The hydroxy compound [IX] used in the esterification reaction [6] is a compound represented by the formula

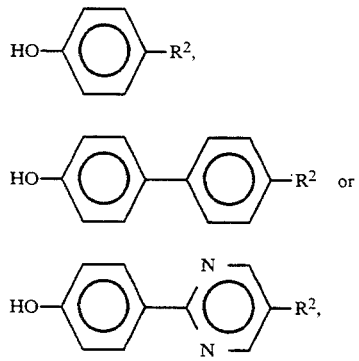

and the optically active group of $R^2$ is introduced in the same manner as described above.

The preparation of the compound (1) by the etherification reaction [1] is conducted in the same manner as described above. Subsequently, an etherification reaction [8] of the compound (1) and a compound [VIII] represented by the general formula

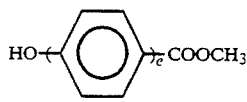

is carried out in a solvent in the presence of an alkali agent, to obtain a compound (3).

Subsequently, a hydrolysis [4] is carried out in water or alcohol in the presence of an alkali agent, and the obtained compound (4) is subjected to a halogenation reaction [5] using an acid halogenating agent to convert it to an acid chloride. An esterification reaction [6] of the acid chloride and a hydroxy compound [IX] represented by the general formula HO—A—$R^2$ is carried out in a solvent, such as THF, in the presence of triethylamine, to obtain the objective diene compound (5), namely the diene compound [III].

The compound [VIII] is methyl 4-hydroxybenzoate or methyl 4'-hydroxybiphenyl-4-carboxylate.

The solvent, agents and reaction conditions employed in the etherification reaction [3] are the same as those employed in the etherification reaction [2].

Preferred examples of the alkali agent used in the hydrolysis reaction [4] include a metal hydroxide, such as potassium hydroxide or sodium hydroxide, and preferred examples of the alcohol include a water-soluble lower alcohol, such as methanol or ethanol. Although the hydrolysis reaction may be carried out by heating a mixture containing only the ester compound, the alkali catalyst and water, addition of an alcohol improves the solubility of the ester compound that is a starting material, thereby facilitating the progress of the hydrolysis reaction.

In the halogenation reaction [5], any known acid halogenating agent, such as thionyl chloride, phosphorus oxychloride and phosphorus pentachloride are used.

Preferred examples of the solvent used in the esterification reaction [6] include an inert ether solvent, such as tetrahydrofuran, and an inert hydrocarbon solvent, such as toluene or hexane.

The esterification reaction is carried out by introducing the acid chloride or the acid chloride dissolved in a solvent into a solution containing a receptor of hydrogen halides, such as pyridine or a tertiary amine such as triethylamine, and agitating the resulting mixture.

When the mixture has low reactivity, the mixture may be heated to 20° to 80° C..

Some examples of the silicon compound [IV], which is another starting material of the copolymer of the present invention and includes two Si—H bonds, include 1,1,3,3-tetramethyldisiloxane, 1,1,3,3,5,5-hexamethyltrisyloxane, 1,1,3,3,5,5,7,7-octamethyltetrasiloxane and 1,1,3,3,5,5,7,7,9,9-decamethylpentasiloxane.

Thus, the liquid-crystalline copolymer of the present invention and the diene compound used for the preparation of the liquid-crystalline copolymer are obtained.

BEST MODE FOR CARRYING OUT THE INVENTION

Figure 1:
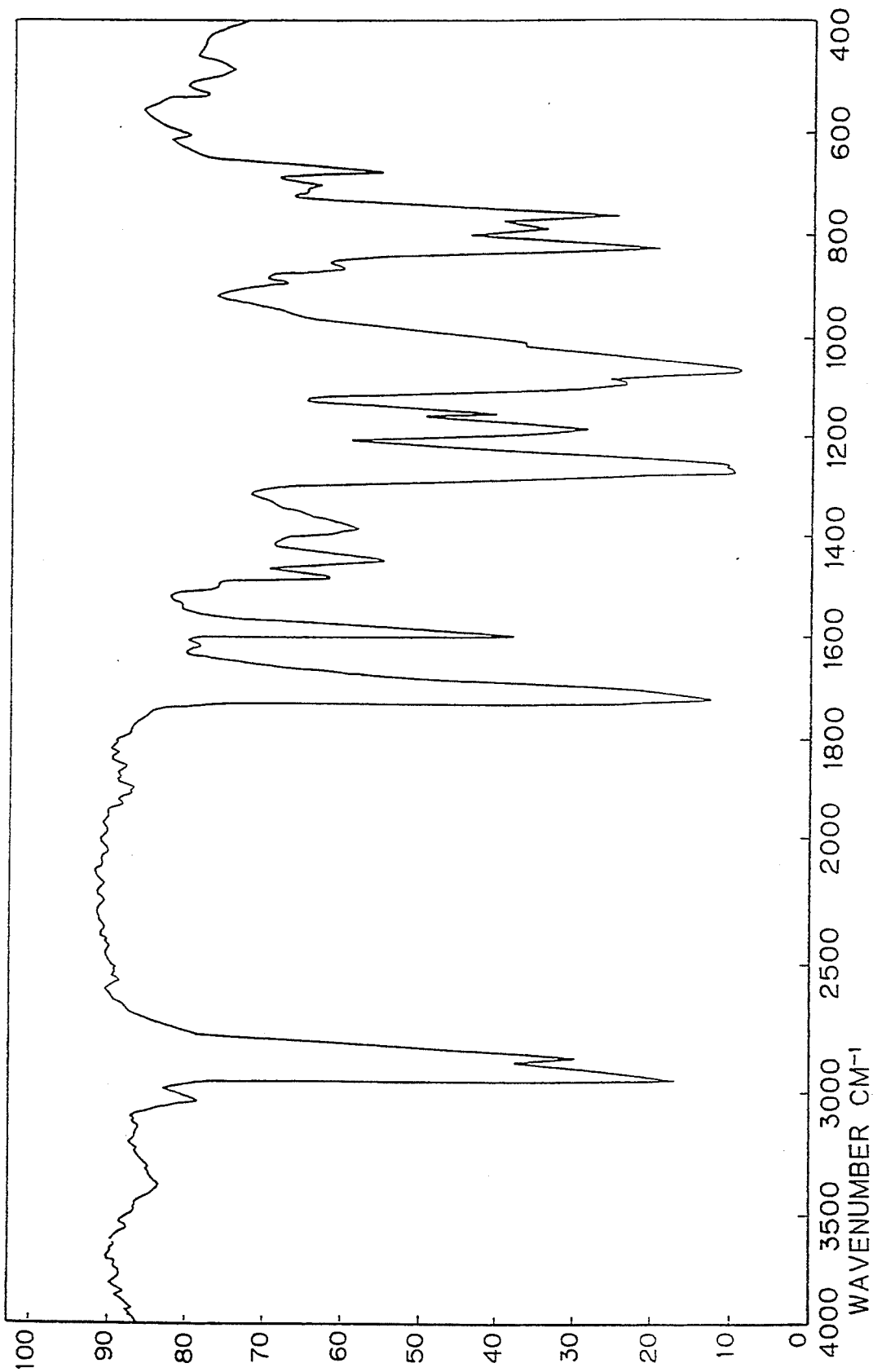
FIGS. 1 to 16 are charts showing IR spectra of the copolymers obtained in Examples 1 to 16, respectively.

In the following Examples, measurements of electric field response speeds were conducted as follows.

EXAMPLES 1 TO 18

A liquid crystal material was interposed between two sheets of substrate with ITO electrode of 20×10 mm in sizes, the thickness of the liquid crystal material was then adjusted to 2.5 μm with spacers, and an alternating current electric field $E = 2 \times 10^6$ V/m was applied between the ITO electrodes to measure the electric field response time required for the change of the light transmission from 0 to 90%.

EXAMPLES 19 TO 25

A liquid crystal material was interposed between two circular sheets of substrate with ITO electrode of 0.2 cm$^2$ in area, the thickness of the liquid crystal material was then adjusted to 25 μm with spacers, and the liquid crystal material was oriented by applying a shearing stress three to five times to obtain a liquid crystal optical device. A liquid crystal cell was produced by sandwiching the liquid crystal optical device between two polarizing plates whose axes perpendicularly intersect each other. A rectangular wave of ±10 MV/M was applied between the ITO electrodes of the liquid crystal cell to measure the electric field response time (t$_{10-90}$) required for the change of the light transmission from 0 to 90%.

In the formulas showing the phase transition behavior of liquid crystal materials, each symbol has the following meaning.

Cry: crystal, SmC*: chiral smectic C liquid crystal phase, SmA: smectic A liquid crystal phase. Iso: isotropic liquid, Sml: an unidentified smectic liquid crystal phase, N*: chiral nematic liquid crystal phase.

EXAMPLE 1

Synthesis of

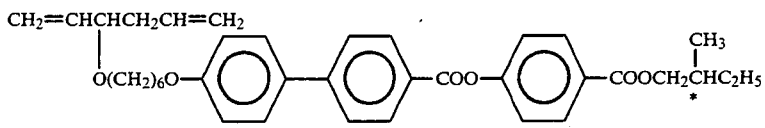

[1] Synthesis of

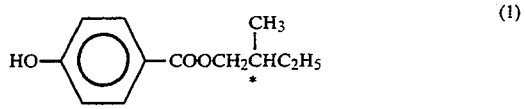

(1)

A dehydration reaction was carried out by refluxing 0.1 mol of 4-hydroxybenzoic acid, 0.3 mol of optically active 2-methylbutanol and 0.1 ml of concentrated sulfuric acid in one liter of toluene. The reaction solution was concentrated and purified by column chromatography to obtain the objective ester compound (1). (Yield: 97%)

[2] Synthesis of

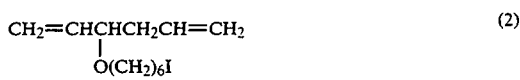

(2)

0.1 mol of 1,5-hexadien-3-ol and 0.17 mol of sodium hydride were stirred in 150 ml of THF for one hour at room temperature. 0.3 mol of 1,6-diiodohexane was introduced in the reaction system, which was then refluxed for 12 hours. After the reaction solution was filtered and concentrated, the concentrate was purified by column chromatography to obtain the objective ether compound (2). (Yield: 67%)

[3] Synthesis of

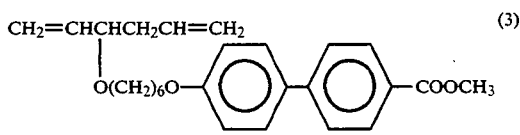

(3)

A solution containing 60 mmol of the ether compound (2) obtained in [2], 60 mmol of methyl 4'-hydroxybiphenyl-4-carboxylate and 0.2 mol of potassium carbonate dissolved in 150 ml of acetone was refluxed for 12 hours. After the reaction solution was filtered and concentrated, the concentrate was purified by column chromatography to obtain the objective ether compound (3). (Yield: 66%)

[4] Synthesis of

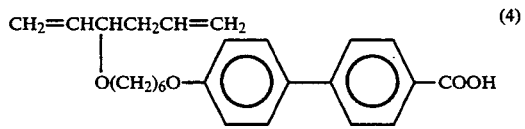

(4)

A solution containing 30 mmol of the ether compound (3) obtained in [3], 0.1 mol of sodium hydroxide, 50 ml of ethanol and 20 ml of water was refluxed for 30 minutes. The reaction solution was poured into 500 ml of water, and the resulting solution was adjusted to pH 2 with a diluted aqueous hydrochloric acid solution and was then subjected to ether extraction, drying and concentration. The concentrate was purified by column chromatography to obtain the objective carboxylic acid derivative (4). (Yield: 98%)

[5] Synthesis of $$CH_2=CHCHCH_2CH=CH_2 \atop | \atop O(CH_2)_6O-\bigcirc-\bigcirc-COO-\bigcirc-COOCH_2\overset{*}{C}HC_2H_5 \atop | \atop CH_3} \quad (5)$$

To 20 mmol of the carboxylic acid derivative (4) obtained in [4] were added 0.1 ml of pyridine and a solution containing 30 ml of thionyl chloride dissolved in 20 ml of toluene, and the mixture was stirred for three hours at room temperature. The solvent used and the excessive thionyl chloride were distilled out from the reaction solution under reduced pressure to obtain an acid chloride. A solution containing 25 mmol of the ester compound (1) obtained in [1] and 80 mmol of triethylamine dissolved in 80 ml of THF was stirred at room temperature. A solution of the acid chloride dissolved in 30 ml of THF was then added thereto dropwise, and the mixture was stirred for 12 hours. After the reaction solution was subjected to ether extraction, drying and concentration, the resulting concentrate was purified by column chromatography to obtain the objective diene compound (5). (Yield: 59%)

The diene compound exhibited liquid crystal properties and the following phase transition behavior and properties. The results of elementary analysis are shown in Table 2.

$$Cry \underset{-21}{\overset{-13}{\rightleftarrows}} SmC^* \underset{97}{\overset{98}{\rightleftarrows}} SmA \underset{98}{\overset{100}{\rightleftarrows}} Iso \quad (°C.)$$

Response time: 42 μs (77° C.), 115 μs (57° C.), 390 μs (37° C.)

Tilt angle (2θ): 61° (30° C.)

Polyaddition reaction

A copolymer wherein

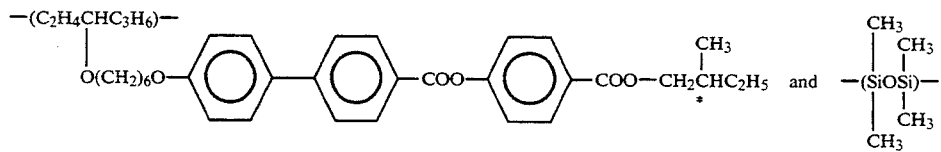

are bonded in a ratio of 1:1.

A toluene solution containing 10 mmol of the diene compound (5) obtained in [5], 10 mmol of 1,1,3,3-tetramethyldisiloxane and 20 mg of hexachloroplatinic acid hexahydrate was stirred in an atmosphere of gaseous argon for 24 hours at 80° C. The reaction solution was concentrated and was then purified by column chromatography to obtain the objective copolymer. (Yield: 88%)

The molecular weight, phase transition temperatures and response time of the obtained copolymer are shown in Table 1, and IR spectrum thereof is shown in FIG. 1.

EXAMPLE 2

Synthesis of

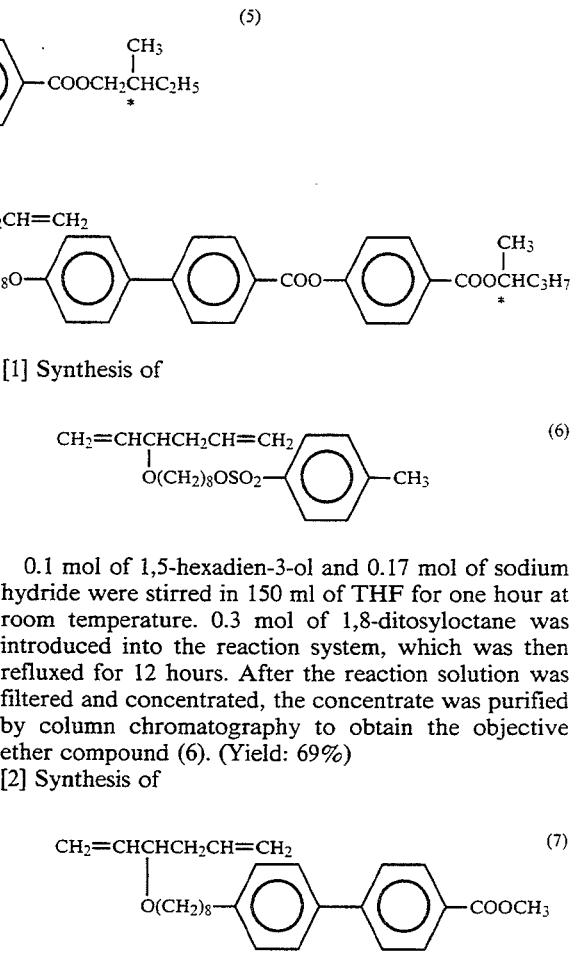

[1] Synthesis of $$CH_2=CHCHCH_2CH=CH_2 \atop | \atop O(CH_2)_8OSO_2-\bigcirc-CH_3} \quad (6)$$

0.1 mol of 1,5-hexadien-3-ol and 0.17 mol of sodium hydride were stirred in 150 ml of THF for one hour at room temperature. 0.3 mol of 1,8-ditosyloctane was introduced into the reaction system, which was then refluxed for 12 hours. After the reaction solution was filtered and concentrated, the concentrate was purified by column chromatography to obtain the objective ether compound (6). (Yield: 69%)

[2] Synthesis of $$CH_2=CHCHCH_2CH=CH_2 \atop | \atop O(CH_2)_8-\bigcirc-\bigcirc-COOCH_3} \quad (7)$$

A solution containing 60 mmol of the ether compound (6) obtained in [1], 60 mmol of methyl 4'-hydroxybiphenyl-4-carboxylate and 0.2 mol of potassium carbonate dissolved in 150 ml of acetone was refluxed for 12 hours. After the reaction solution was filtered and concentrated, the concentrate was purified by column chromatography to obtain the objective ether compound (7). (Yield: 67%)

[3] Synthesis of

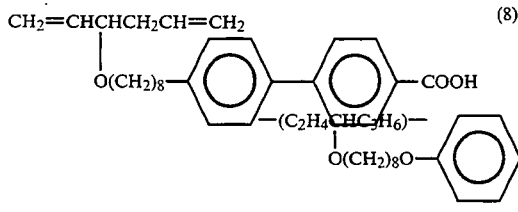

(8)

A solution containing 30 mmol of the ether compound (7) obtained in [2], 0.1 mol of sodium hydroxide, 50 ml of ethanol and 20 ml of water was refluxed for 30 minutes. The reaction solution was poured into 500 ml of water, and the resulting solution was adjusted to pH 2 with a diluted aqueous hydrochloric acid solution and was then subjected to ether extraction, drying and concentration. The concentrate was purified by column chromatography to obtain the objective carboxylic acid derivative (8). (Yield: 98%)

[4] Synthesis of

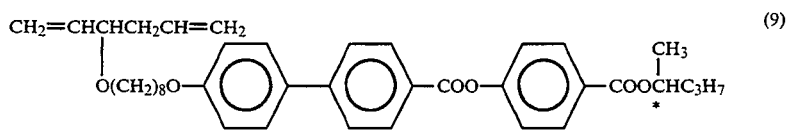

(9)

To 20 mmol of the carboxylic acid derivative (8) obtained in [3] were added 0.1 ml of pyridine and a solution containing 30 ml of thionyl chloride dissolved in 20 ml of toluene, and the mixture was stirred for three hours at room temperature. The solvent used arid the excessive thionyl chloride were distilled out from the reaction solution under reduced pressure to obtain an acid chloride. A solution containing 25 mmol of 1-methylbutyl 4-hydroxybenzoate and 30 mmol of triethylamine dissolved in 80 ml of THF was stirred at room temperature. A solution of the acid chloride dissolved in 30 mi of THF was then added thereto dropwise, and the mixture was stirred for 12 hours. After the reaction solution was subjected to ether extraction, drying and concentration, the resulting concentrate was purified by column chromatography to obtain the objective diene compound (9). (Yield: 66%)

The diene compound exhibited liquid crystal properties and the following phase transition behavior and properties. The results of elementary analysis are shown in Table 2.

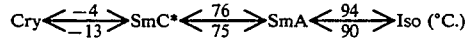

Response time: 13 μs (55° C.), 41 μs (35° C.), 300 μs (15° C.)

Tilt angle (2θ): 76° (25° C.)
Polyaddition reaction
A copolymer wherein

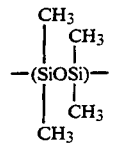

are bonded in a ratio of 1:1.

A toluene solution containing 10 mmol of the diene compound (9) obtained in [4], 10 mmol of 1,1,3,3-tetramethyldisiloxane and 20 mg of hexachloroplatinic acid hexahydrate was stirred in an atmosphere of gaseous argon for 24 hours at 80° C. The reaction solution was concentrated and was then purified by column chromatography to obtain the objective copolymer. (Conversion rate: 78%)

Figure 2:
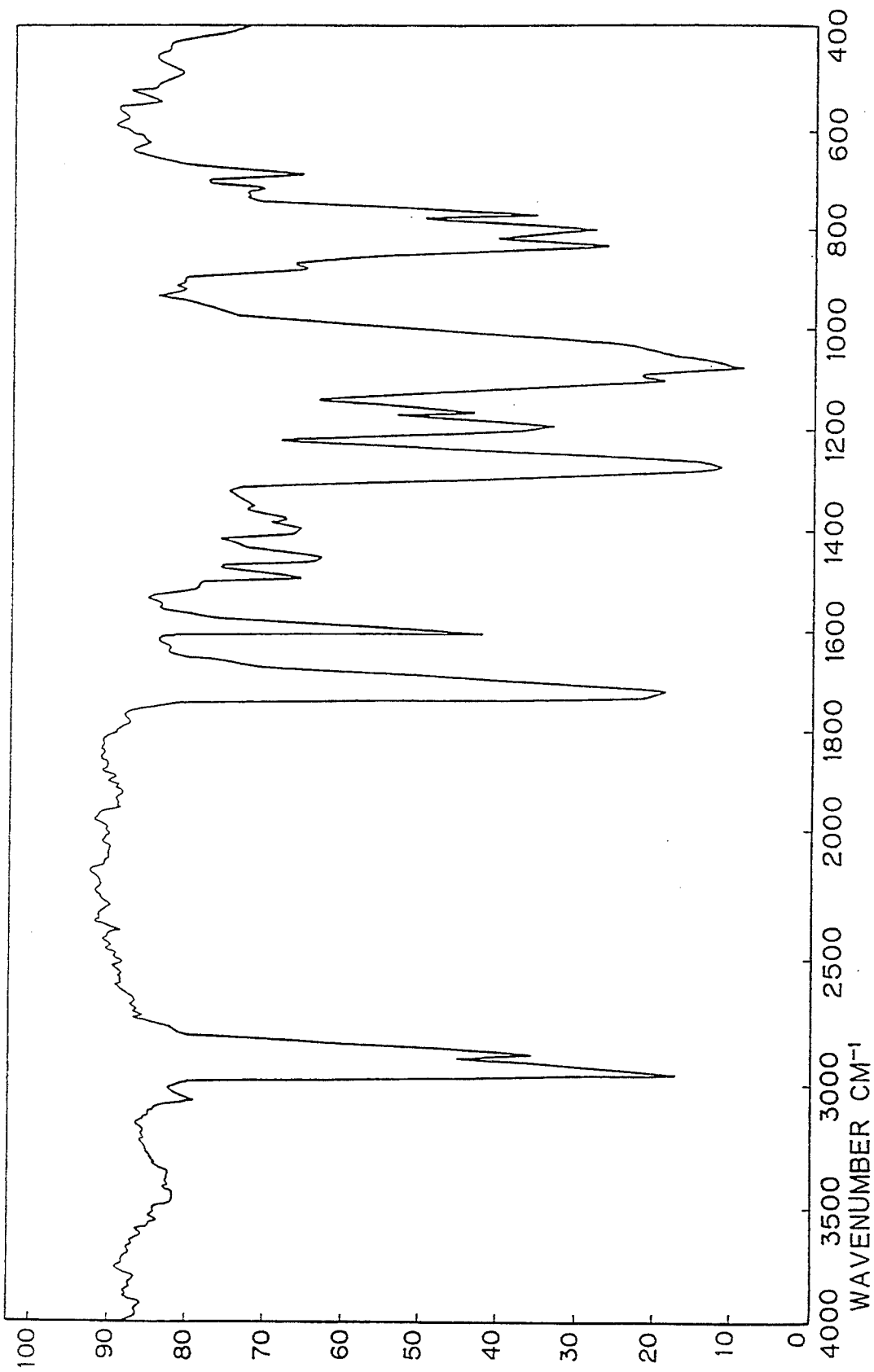

The molecular weight, phase transition temperatures and response time of the obtained copolymer is are shown in Table 1, and IR spectrum thereof is shown in FIG. 2.

EXAMPLE 3

[1] Synthesis of

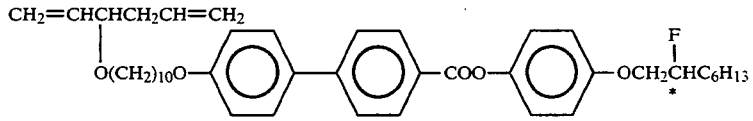

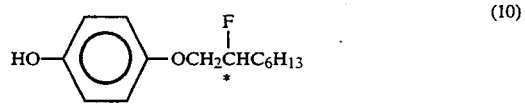
(10)

0.3 mol of hydroquinone, 0.2 mol of a tosylation product of optically active 2-fluorooctanol and 0.4 mol of potassium hydroxide were refluxed in one liter of methyl ethyl ketone in an atmosphere of gaseous argon for 12 hours. The reaction solution was concentrated and was then purified by column chromatography to obtain the objective phenol compound (10). (Yield: 57%)

[2] Synthesis of

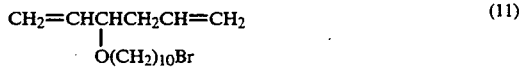
(11)

0.1 mol of 1,5-hexadien-3-ol and 0.17 mol of sodium hydride were stirred in 150 ml of THF for one hour at room temperature. 0.3 mol of 1,10-dibromodecane was introduced therein and reflux was carried out for 12 hours. After the reaction solution was filtered and concentrated, the concentrate was purified by column chromatography to obtain the objective ether compound (11). (Yield: 63%)

[3] Synthesis of

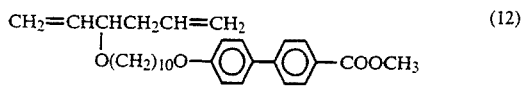 (12)

A solution containing 60 mmol of the ether compound (11) obtained in [2], 60 mmol of methyl 4'-hydroxybiphenyl-4-carboxylate and 0.2 mol of potassium carbonate dissolved in 150 ml of acetone was refluxed for 12 hours. After the reaction solution was filtered and concentrated, the concentrate was purified by column chromatography to obtain the objective ether compound (12). (Yield: 62%).

[4] Synthesis of

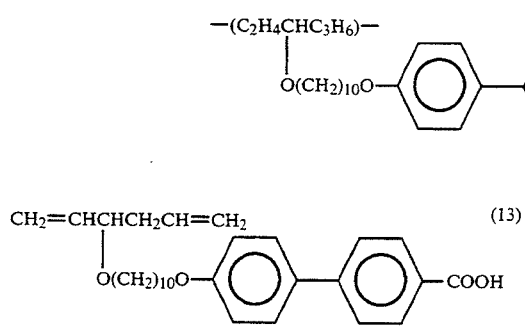 (13)

A solution containing 30 mmol of the ether compound (12) obtained in [3], 0.1 mol of sodium hydroxide, 50 ml of ethanol and 20 ml of water was refluxed for 30 minutes. The reaction solution was poured into 500 ml of water, and the resulting solution was adjusted to pH 2 with a diluted aqueous hydrochloric acid solution and was then subjected to ether extraction, drying and concentration. The concentrate was purified by column chromatography to obtain the objective carboxylic acid derivative (13). (Yield: 95%)

[5] Synthesis of

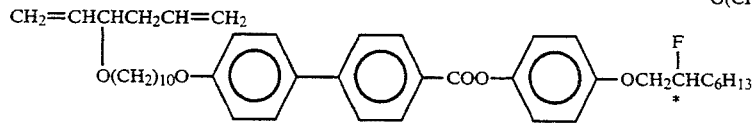

To 20 mmol of the carboxylic acid derivative (13) obtained in [4] were added 0.1 ml of pyridine and a solution containing 30 ml of thionyl chloride dissolved in 20 ml of toluene, and the mixture was stirred for three hours at room temperature. The solvent used and the excessive thionyl chloride were distilled out from the resulting reaction solution under reduced pressure to obtain an acid chloride. A solution containing 25 mmol of the phenol compound (10) obtained in [1] and 30 mmol of triethylamine dissolved in 80 ml of THF was stirred at room temperature. A solution of the acid chloride dissolved in 30 ml of THF was then added thereto dropwise, and the mixture was stirred for 12 hours. After the reaction solution was subjected to ether extraction, drying and concentration, the concentrate was purified by column chromatography to obtain the objective diene compound (14). (Yield: 59%)

The diene compound exhibited liquid crystal properties and the following phase transition behavior and properties. The results of elementary analysis are shown in Table 2.

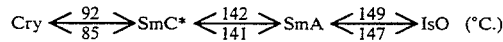

Response time: 9 μs (121° C.), 13 μs (101° C.),
Tilt angle: 72° (100° C.)
Polyaddition reaction
A copolymer comprising

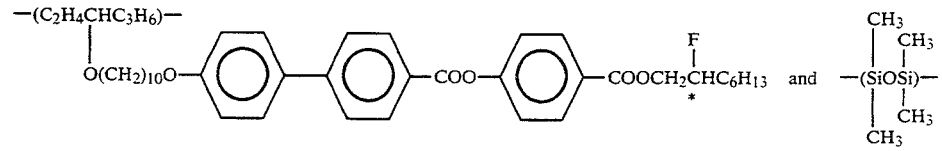

A toluene solution containing 10 mmol of the diene compound (14) obtained in [5], 10 mmol of 1,1,3,3-tetramethyldisiloxane and 20 mg of hexachloroplatinic acid hexahydrate was stirred in an atmosphere of gaseous argon for 24 hours at 80° C. The reaction solution was concentrated and was then purified by column chromatography to obtain the objective copolymer. (Conversion rate: 78%)

Figure 3:
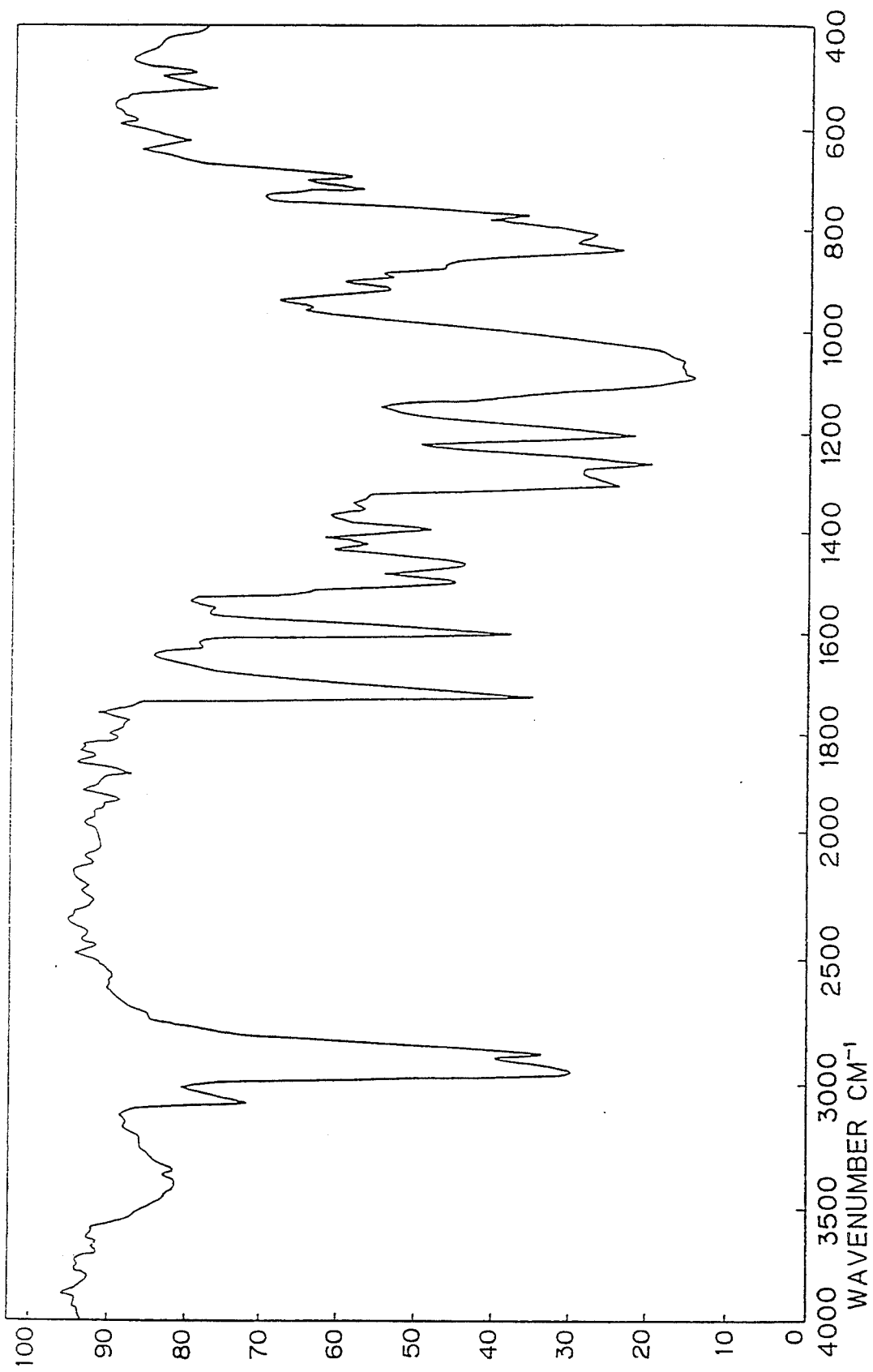

The molecular weight, phase transition temperatures and response time of the obtained copolymer are shown in Table 1, and IR spectrum thereof is shown in FIG. 3.

EXAMPLE 4

Synthesis of

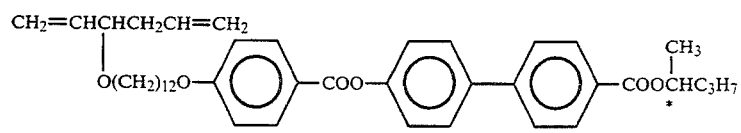

[1] Synthesis of

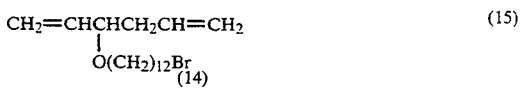 (15)
(14)

0.1 mol of 1,5-hexadien-3-ol and 0.17 mol of sodium hydride were stirred in 150 ml of THF for one hour at room temperature. 0.3 mol of 1,12-dibromododecane was added to the reaction system, which was then refluxed for 12 hours. After the reaction solution was filtered and concentrated, the concentrate was purified by column chromatography to obtain the objective ether compound (15). (Yield: 55%)

[2] Synthesis of

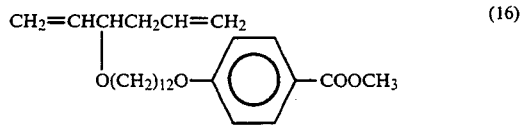
(16)

A solution containing 60 mmol of the ether compound (15) obtained in [1], 60 mmol of methyl 4-hydroxybenzoate and 0.2 mol of potassium carbonate dissolved in 150 ml of acetone was refluxed for 12 hours. After the reaction solution was filtered and concentrated, the concentrate was purified by column chromatography to obtain the objective ether compound (16). (Yield: 77%)

[3] Synthesis of

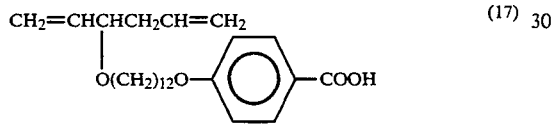
(17)

A solution containing 30 mmol of the ether compound (16) obtained in [2], 0.1 mol of sodium hydroxide, 50 ml of ethanol and 20 ml of water was refluxed for 30 minutes. After the reaction solution was poured into 500 ml of water, the resulting solution was adjusted to pH 2 with a diluted aqueous hydrochloric acid solution and was then subjected to ether extraction, drying and concentration. The concentrate was purified by column chromatography to obtain the objective carboxylic acid derivative (17). (Yield: 96%)

[4] Synthesis of

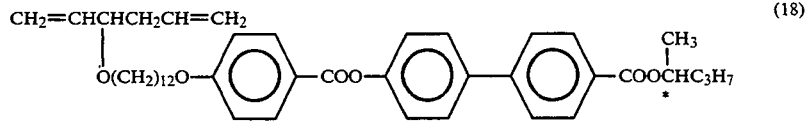

To 20 mmol of the carboxylic acid derivative (17) obtained in [3] were added 0.1 ml of pyridiene and a solution containing 30 ml of thionyl chloride dissolved in 20 ml of toluene, and the mixture was stirred for three hours at room temperature. The solvent used and the excessive thionyl chloride were distilled out from the reaction solution under reduced pressure to obtain an acid chloride. A solution containing 25 mmol of 1-methylbutyl 4'-hydroxybiphenyl-4-carboxylate and 30 mmol of triethylamine dissolved in 80 ml of THF was stirred at room temperature. A solution of the acid chloride dissolved in 30 ml of THF was then added thereto dropwise, and the mixture was stirred for 12 hours. After the reaction solution was subjected to ether extraction, drying and concentration, the concentrate was purified by column chromatography to obtain the objective diene compound (18). (Yield: 63%)

The diene compound exhibited liquid crystal properties and the following phase transition behavior and properties. The results of elementary analysis are shown in Table 2.

$$Cry \underset{-12}{\overset{-8}{\rightleftarrows}} SmC^* \underset{79}{\overset{81}{\rightleftarrows}} N^* \underset{80}{\overset{82}{\rightleftarrows}} Iso \; (°C.)$$

Response time: 19 μs (59° C.), 38 μs (39° C.), 310 μs (19° C.)
Tilt angle (2θ): 69° (40° C.)
Polyaddition reaction
A copolymer comprising

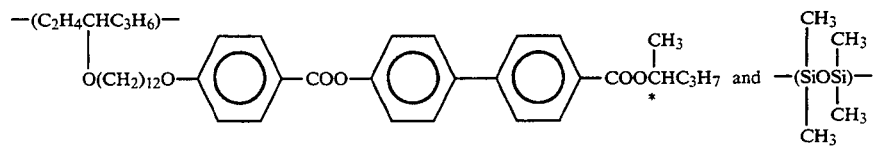

A toluene solution containing 10 mmol of the diene compound (18) obtained in [4], 10 mmol of 1,1,3,3-tetramethyldisiloxane and 20 mg of hexachloroplatinic acid hexahydrate was stirred in an atmosphere of gaseous argon for 24 hours at 80° C. The reaction solution was concentrated and was then purified by column chromatography to obtain the objective copolymer. (Conversion rate: 69%)

Figure 4:
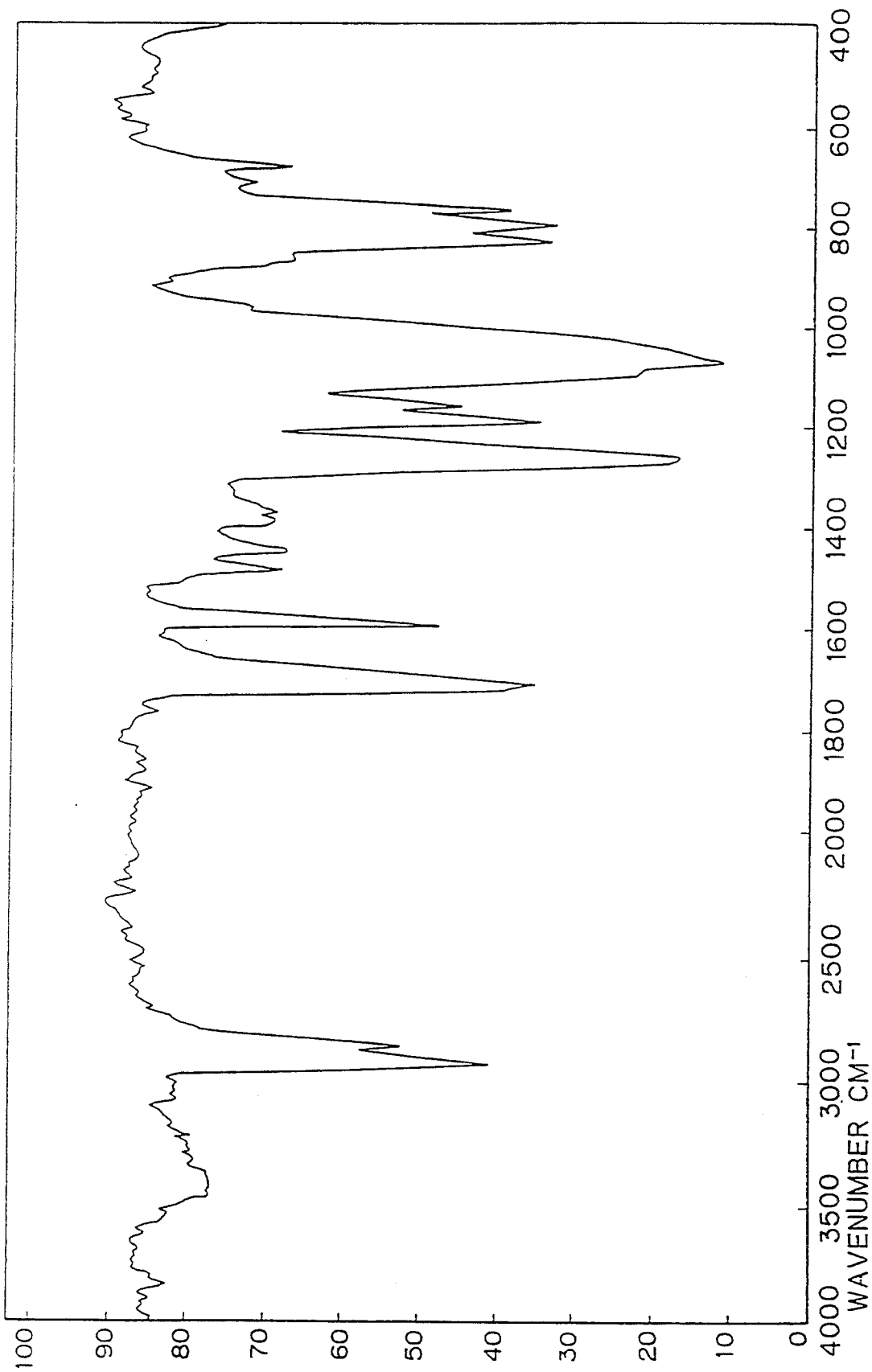

The molecular weight, phase transition temperatures and response time of the obtained copolymer are shown in Table 1, and IR spectrum thereof is shown in FIG. 4.

EXAMPLE 5

Synthesis of

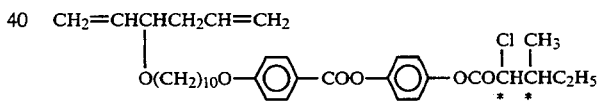

[1] Synthesis of

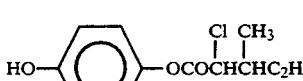

A dehydration reaction was carried out by refluxing 0.3 mol of hydroquinone, 0.1 mol of optically active 2-chloro-3-methylpentanoic acid and 0.1 ml of concentrated sulfuric acid in one liter of toluene. The reaction solution was concentrated and was then purified by column chromatography to obtain the objective ester compound (20). (Yield: 56%)

[2] Synthesis of

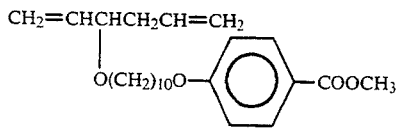

A solution containing 60 mmol of the ether compound (11) obtained in Example 3-[2], 60 mmol of methyl 4-hydroxybenzoate and 0.2 mol of potassium carbonate dissolved in 150 ml of acetone was refluxed for 12 hours. After the reaction solution was filtered and concentrated, the concentrate was purified by column chromatography to obtain the objective ether compound (21). (Yield: 77%)

[3] Synthesis of

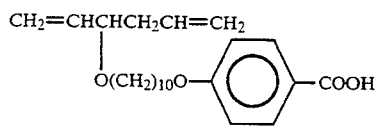

A solution containing 30 mmol of the ether compound (21) obtained in [2], 0.1 mol of sodium hydroxide, 50 ml of ethanol and 20 ml of water was refluxed for 30 minutes. After the reaction solution was poured into 500 ml of water, the resulting solution was adjusted to pH 2 with a diluted aqueous hydrochloric acid solution and was then subjected to ether extraction, drying and concentration. The concentrate was purified by column chromatography to obtain the objective carboxylic acid derivative (22). (Yield: 96%)

[4] Synthesis of

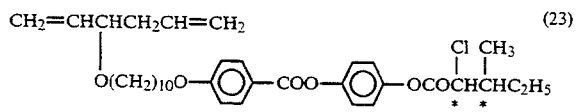

To 20 mmol of the carboxylic acid derivative (22) obtained in [3] were added 0.1 ml of pyridine and a solution containing 30 ml of thionyl chloride dissolved in 20 ml of toluene, and the mixture was stirred for three hours at room temperature. The solvent used and the excessive thionyl chloride were distilled out from the reaction solution under reduced pressure to obtain an acid chloride. A solution containing 25 mmol of the ester compound (20) obtained in [1] and 30 mmol of triethylamine dissolved in 80 ml of THF was stirred at room temperature. A solution containing the acid chloride dissolved in 30 ml of THF was added thereto dropwise, and the mixture was stirred for 12 hours. After the reaction solution was subjected to ether extraction, drying and concentration, the concentrate was purified by column chromatography to obtain the objective diene compound (23). (Yield: 44%)

The diene compound exhibited liquid crystal properties and the following phase transition behavior and properties. The results of elementary analysis are shown in Table 2.

Response time: 230 μs (−16° C.)
Tilt angle (2θ): 41° (−16° C.)
Polyaddition reaction
A copolymer comprising

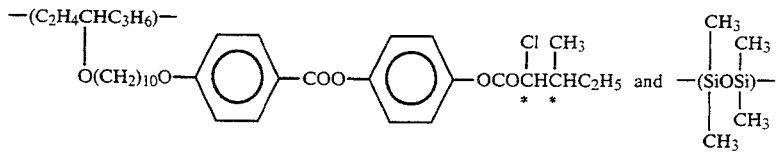

A toluene solution containing 10 mmol of the diene compound (23) obtained in [5], 10 mmol of 1,1,3,3-tetramethyldisiloxane and 20 mg of hexachloroplatinic acid hexahydrate was stirred in an atmosphere of gaseous argon for 24 hours at 80° C. The reaction solution was concentrated and was then purified by column chromatography to obtain the objective copolymer. (Conversion rate: 88%)

Figure 5:
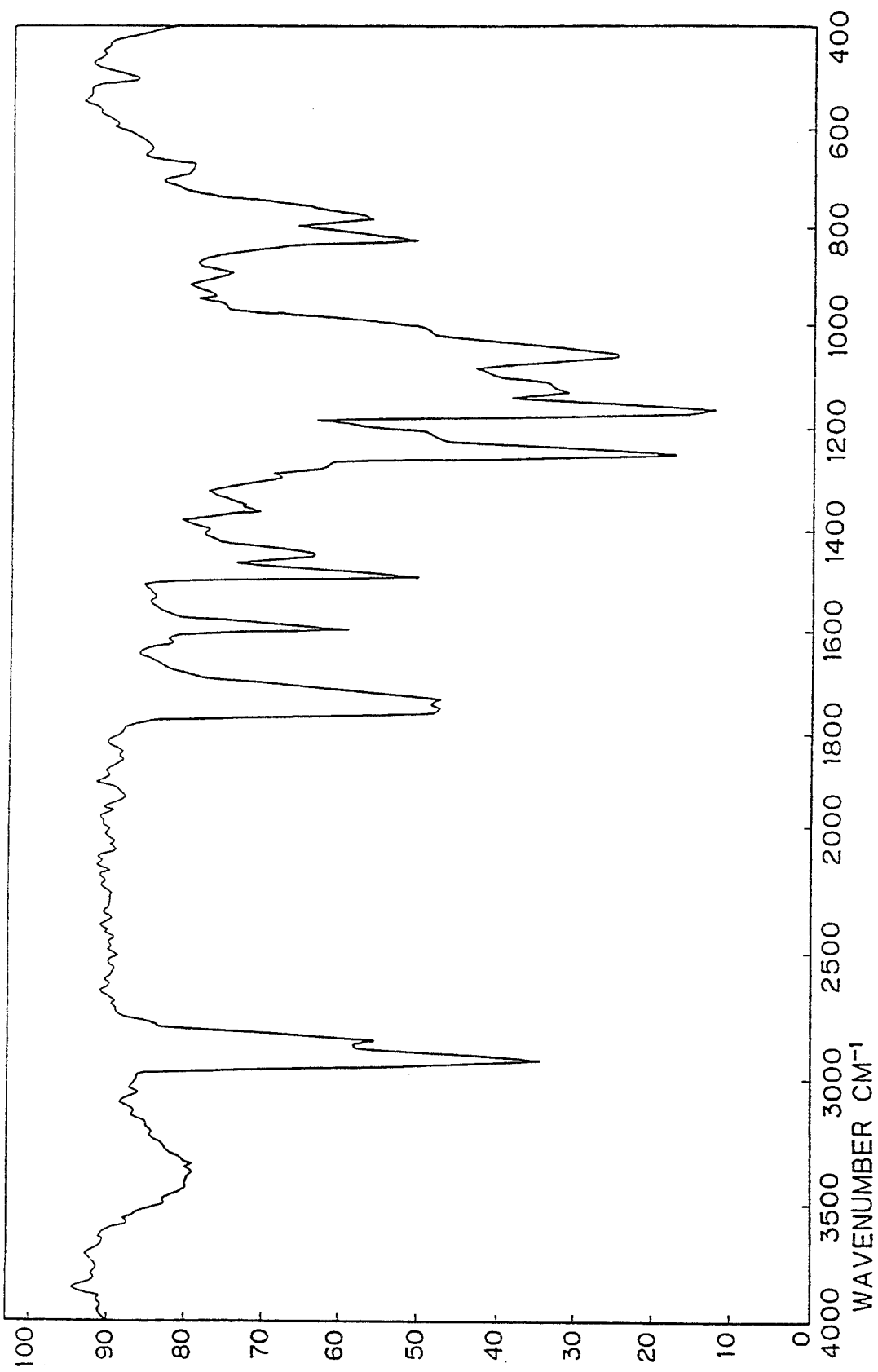

The molecular weight, phase transition temperatures and response time of the obtained copolymer are shown in Table 1, and IR spectrum thereof is shown in FIG. 5.

EXAMPLE 6

Synthesis of

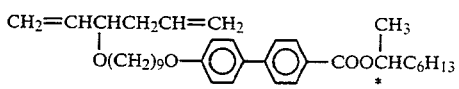

[1] Synthesis of

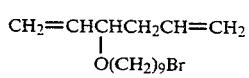

0.1 mol of 1,5-hexadiene-3-ol and 0.17 mol of sodium hydride were stirred in 150 ml of THF for one hour at room temperature. 0.3 mol of 1,9-dibromononane was added to the reaction system, which was then refluxed for 12 hours. After the reaction solution was filtered and concentrated, the concentrate was purified by column chromatography to obtain the objective ether compound (24). (Yield: 55%)

[2] Synthesis of

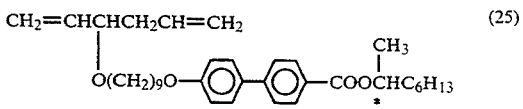

A solution containing 60 mmol of the ether compound (24) obtained [1], 60 mmol of 1-methylheptyl 4′-hydroxybiphenyl-4-carboxylate and 0.2 mol of potassium carbonate dissolved in 150 ml of acetone was refluxed for 12 hours. After the reaction solution was filtered and concentrated, the concentrate was purified by column chromatography to obtain the objective diene compound (25). (Yield: 72%)

The diene compound exhibited liquid crystal properties and the following phase transition behavior and properties. The results of elementary analysis are shown in Table 2.

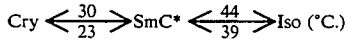

Response time: 88 μs (31° C.)
Tilt angle (2θ): 49° (31° C.)
Polyaddition reaction
A copolymer comprising

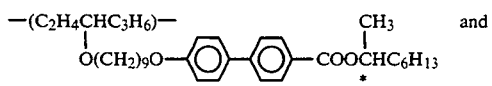

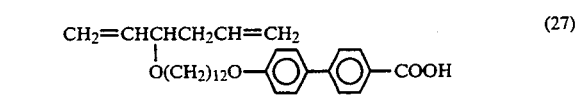 (27)

A solution containing 30 mmol of the ether compound (26) obtained in [1], 0.1 mol of sodium hydroxide, 50 ml of ethanol and 20 ml of water were refluxed for 30 minutes. After the reaction solution was poured into 500 ml of water, the resulting solution was adjusted to pH 2 with a diluted aqueous hydrochloric acid solution and was then subjected to ether extraction, drying and concentration. The concentrate was purified by column chromatography to obtain the objective carboxylic acid derivative (27). (Yield: 96%)

[3] Synthesis of

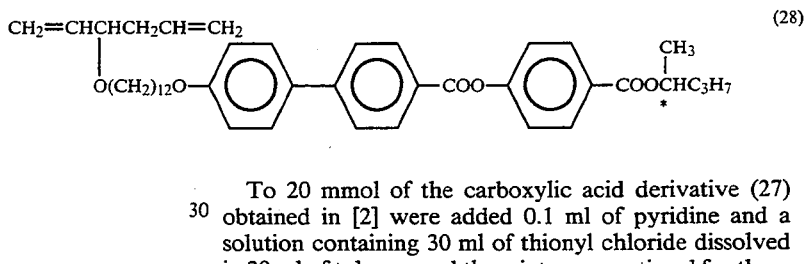 (28)

$$-(SiOSi)-\begin{matrix}CH_3\\|\\|\\CH_3\end{matrix}\begin{matrix}CH_3\\|\\|\\CH_3\end{matrix}$$

A toluene solution containing 10 mmol of the diene compound (25) obtained in [2], 10 mmol of 1,1,3,3-tetramethyldisiloxane and 20 mg of hexachloroplatinic acid hexahydrate was stirred in an atmosphere of gaseous argon for 24 hours at 80° C. The reaction solution was concentrated and was then purified by column chromatography to obtain the objective copolymer. (Conversion rate: 71%)

Figure 6:
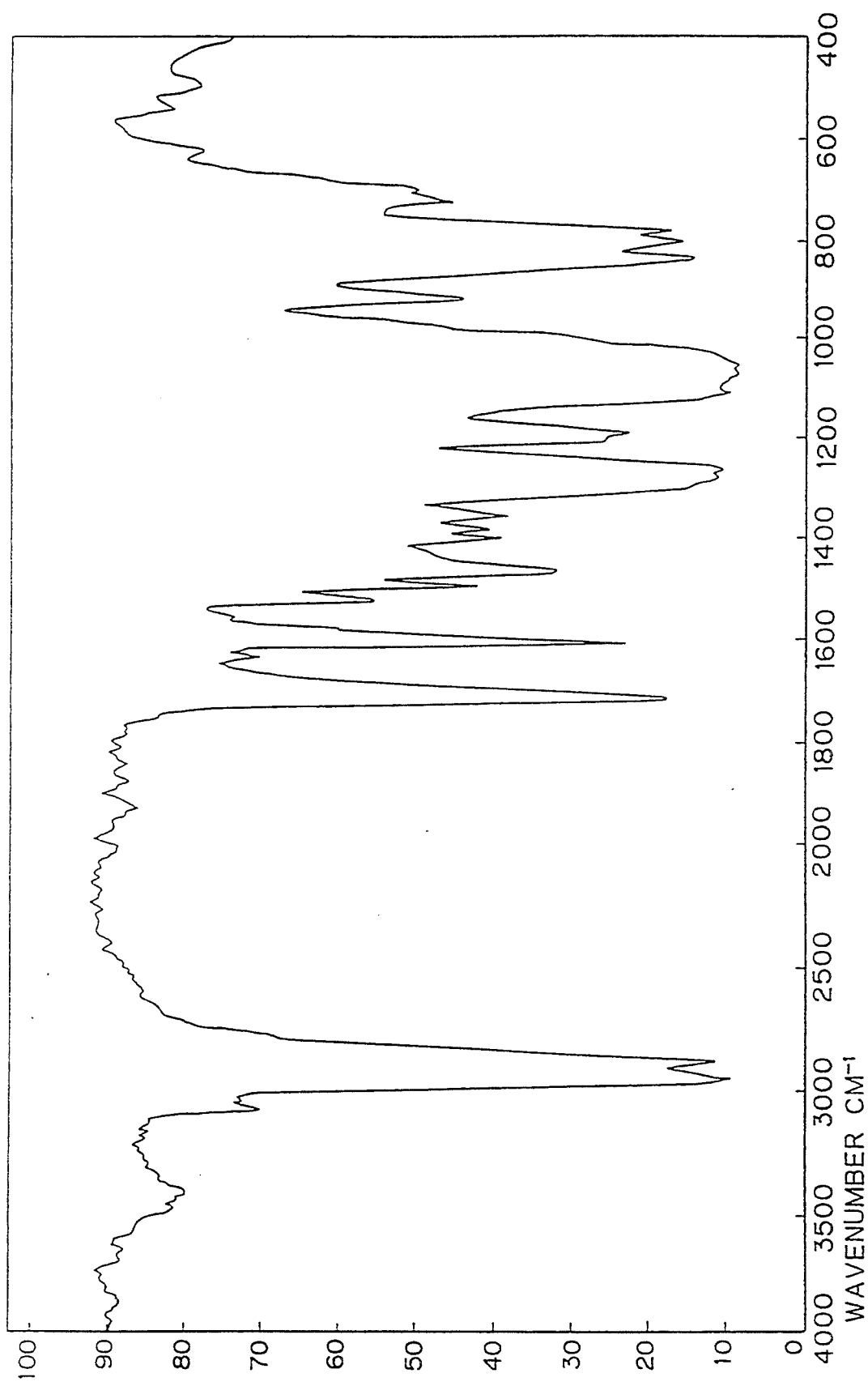

The molecular weight, phase transition temperatures and response time of the obtained copolymer are shown in Table 1, and IR spectrum thereof is shown in FIG. 6.

To 20 mmol of the carboxylic acid derivative (27) obtained in [2] were added 0.1 ml of pyridine and a solution containing 30 ml of thionyl chloride dissolved in 20 ml of toluene, and the mixture was stirred for three hours at room temperature. The solvent used and the excessive thionyl chloride were distilled out from the reaction solution under reduced pressure to obtain an acid chloride. A solution containing 25 mmol of 1-methylbutyl 4-hydroxybenzoate and 30 mmol of triethylamine dissolved in 80 ml of THF was stirred at room temperature. A solution containing the acid chloride dissolved in 30 ml of THF was added thereto dropwise, and the mixture was stirred for 12 hours. After the reaction solution was subjected ether extraction, drying and concentration, the concentrate was purified by column chromatography to obtain the objective diene compound (28), (Yield: 69%)

The diene compound exhibited liquid crystal proper-

EXAMPLE 7

Synthesis of

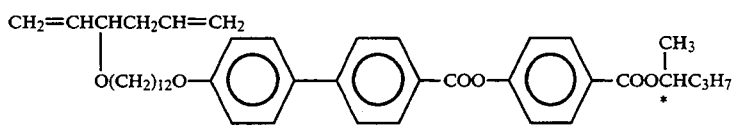

[1] Synthesis of

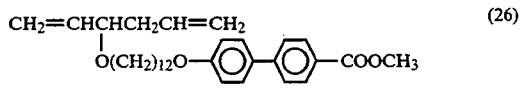 (26)

A solution containing 60 mmol of the ether compound (15) obtained in Example 4-[1], 60 mmol of methyl 4-hydroxybiphenyl-4-carboxylate and 0.2 mol of potassium carbonate dissolved in 150 ml of acetone was refluxed for 12 hours. After the reaction solution was filtered and concentrated, the concentrate was purified by column chromatography to obtain the objective ether compound (26). (Yield: 69%)

[2] Synthesis of ties and the following phase transition behavior and properties. The results of elementary analysis are shown in Table 2.

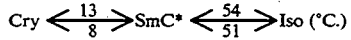

Response time: 98 μs (31° C.), 529 μms (11° C.)
Tilt angle (2θ): 53° (31° C.)
Polyaddition reaction
A copolymer comprising

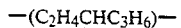 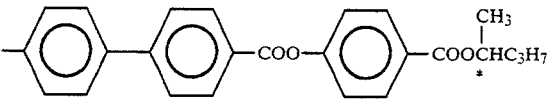 and 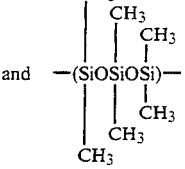

A toluene solution containing 10 mmol of the diene compound (28) obtained in [3], 10 mmol of 1,1,3,3,5,5-hexamethyltrisiloxane and 20 mg of hexachloroplatinic acid hexahydrate was stirred in an atmosphere of gaseous argon for 24 hours at 80° C. The reaction solution was concentrated and was then purified by column chromatography to obtain the objective copolymer. (Conversion rate: 74%)

Figure 7:
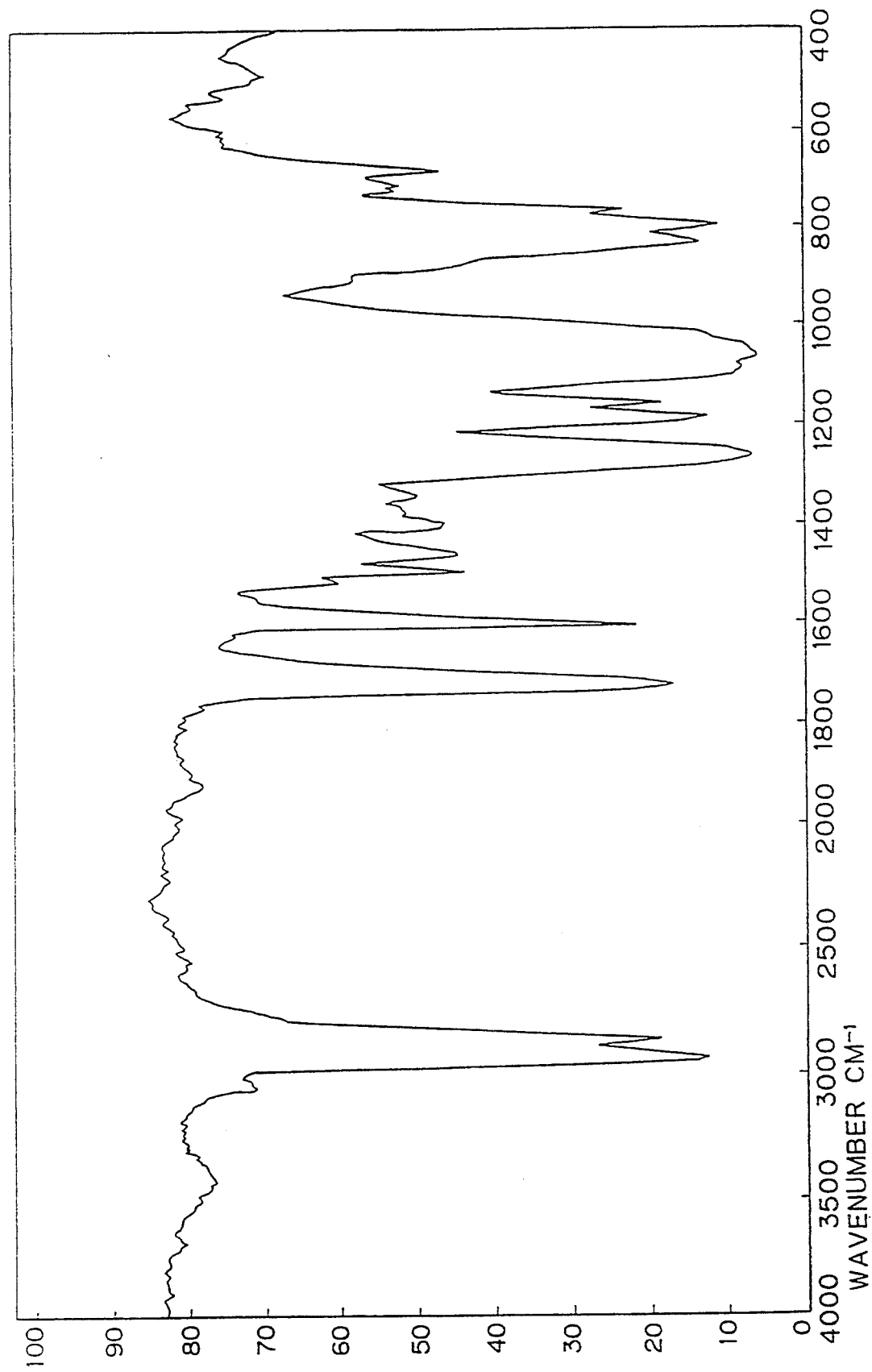

The molecular weight, phase transition temperatures and response time of the obtained copolymer are shown in Table 1. and IR spectrum thereof is shown in FIG. 7.

EXAMPLE 8

Synthesis of

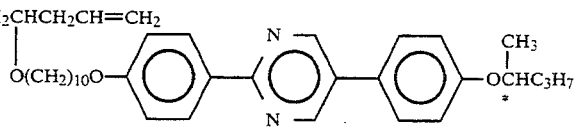

[1] Synthesis of

 (29)
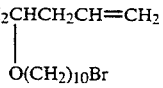

0.1 mol of 1,6-heptadien-4-ol and 0.17 mol of sodium hydride were stirred in 150 ml of THF for one hour at room temperature. 0.3 mol of 1,10-dibromodecane was introduced in the reaction system, which was then refluxed for 12 hours. After the reaction solution was filtered and concentrated, the concentrate was purified by column chromatography to obtain the objective ether compound (29). (Yield: 61%)

[2] Synthesis of a compound (30)

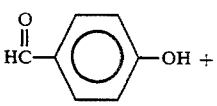

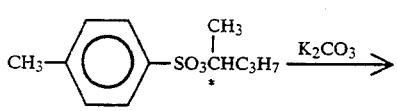

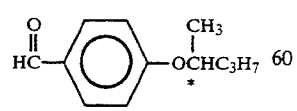

(30)

40 g of 4-hydroxybenzaldehyde, 80 g of (S)-1-methyl-butyl-p-toluene sulfonate and 46 g of potassium carbonate were refluxed in acetone for 12 hours, insoluble matters were removed from the reaction solution while the reaction solution was hot, and the solvent used was distilled out. The residue was purified by column chromatography to obtain 4-(1-methylbutyloxy)benzaldehyde (30).

[3] Synthesis of a compound (31)

(31)

A solution containing butyllithium dissolved in hexane was added to a solution containing 120 g of methoxymethyltriphenylphosphoni bromide dissolved in tetrahydrofuran (THF), in an atmosphere of argon, and the mixture was stirred for one hour at room temperature. A solution of the compound (30) dissolved in THF was added thereto and stirring was continued for two hours. The reaction solution was washed with water, was dried over magnesium sulfate, and was then concentrated. The residue was purified by column chromatography to obtain 1-(2-methoxyethenyl)-4-(1-methylbutyloxy)benzene (31).

[4] Synthesis of a compound (32)

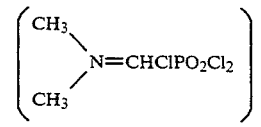

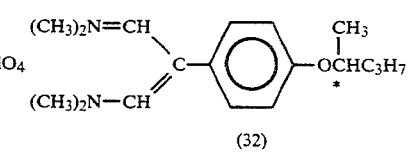

(32)

100 ml of N,N-dimethylformamide (DMF) was cooled to 0° C., and 75 g of phosphorus oxychloride was added thereto dropwise. The mixture was then stirred for 30 minutes at room temperature. A solution containing the compound (81) dissolved in DMF was added thereto, and the mixture was then stirred for one hour at 50° C. After allowed to cool, the reaction solution was poured into an aqueous sodium perchlorate solution, and the generated crystals of an iminium salt (82) were collected. The crystals of the iminium salt (32) were dried and used for the following reaction.

[5] Synthesis of a compound (33)

The compound (32) and 41 g of the amidine salt (33) obtained in [5] were dissolved in methanol. After addition of 8.5 g of sodium methoxide, the resulting solution was refluxed for 2 hours. Insoluble matters were removed out from the reaction solution while the reaction solution was hot, and the reaction solution was then concentrated. The concentrate was dissolved in ethyl acetate, and a hydrogenation was carried out using palladium carbon as a catalyst. The reaction solution was then concentrated, and the residue was recrystallized from a solvent mixture of hexane and toluene to obtain a phenol compound (34). (Yield:. 28.5 g, conversion rate from 4-benzyloxybenzaldehyde: 26%)

[7] Synthesis of

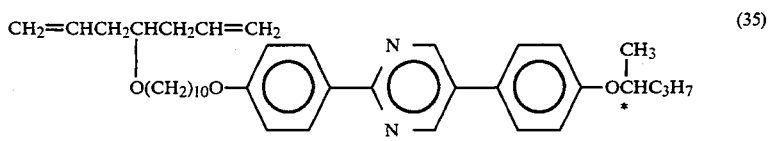
(35)

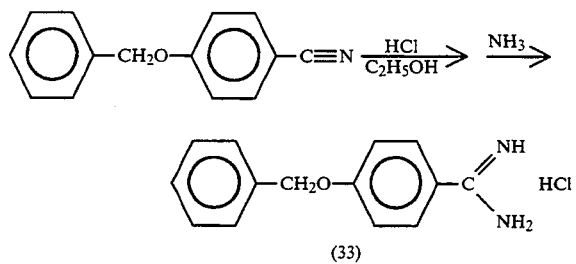

50 g of 4-benzyloxybenzonitrile was dissolved in dried ethanol and the solution was cooled. The solution was then stirred for two days at room temperature while gaseous hydrogen chloride was being bubbled therein. After the reaction solution was concentrated under reduced pressure, the concentrate was dissolved in methanol, and the resulting solution was stirred for one day while gaseous ammonia was being bubbled therein. The solvent used was distilled out from the reaction solution under reduced pressure to obtain an amidine salt (33).

[6] Synthesis of a compound (34).

A solution containing 30 mmol of the ether compound (29) obtained in [1], 30 mmol of the phenol compound (34) obtained in [6] and 0.1 mol of potassium carbonate dissolved in 100 ml of acetone was refluxed for 12 hours. After the reaction solution was filtered and concentrated, the concentrate was purified by column chromatography to obtain the objective diene compound (35). (Yield: 49%)

The diene compound exhibited liquid crystal properties and the following phase transition behavior and properties. The results of elementary analysis are shown in Table 2.

$$Cry \xrightleftharpoons[-25]{-13} SmC^* \xrightleftharpoons[61]{63} SmA \xrightleftharpoons[80]{83} Iso \; (°C.)$$

Response time: 25 μs (41° C.), 109 μs (21° C.), 143 ms (1° C.)

Tilt angle (2θ): 60° (21° C.)

Polyaddition reaction

A copolymer comprising

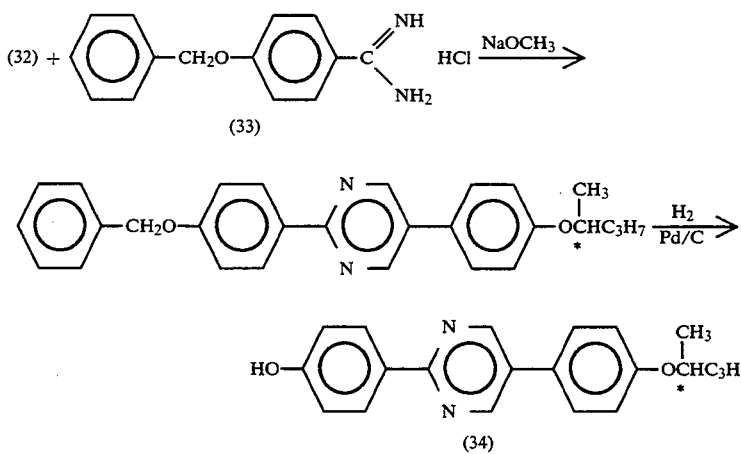

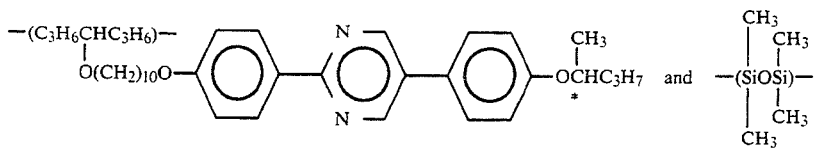

A toluene solution containing 10 mmol of the diene compound (35) obtained in [7], 10 mmol of 1,1,3,3-tetramethyldisiloxane and 20 mg of hexachloroplatinic acid hexahydrate was stirred in an atmosphere of gaseous argon for 24 hours at 80° C. The reaction solution was concentrated and was then purified by column chromatography to obtain the objective copolymer. (Conversion rate: 72%)

Figure 8:
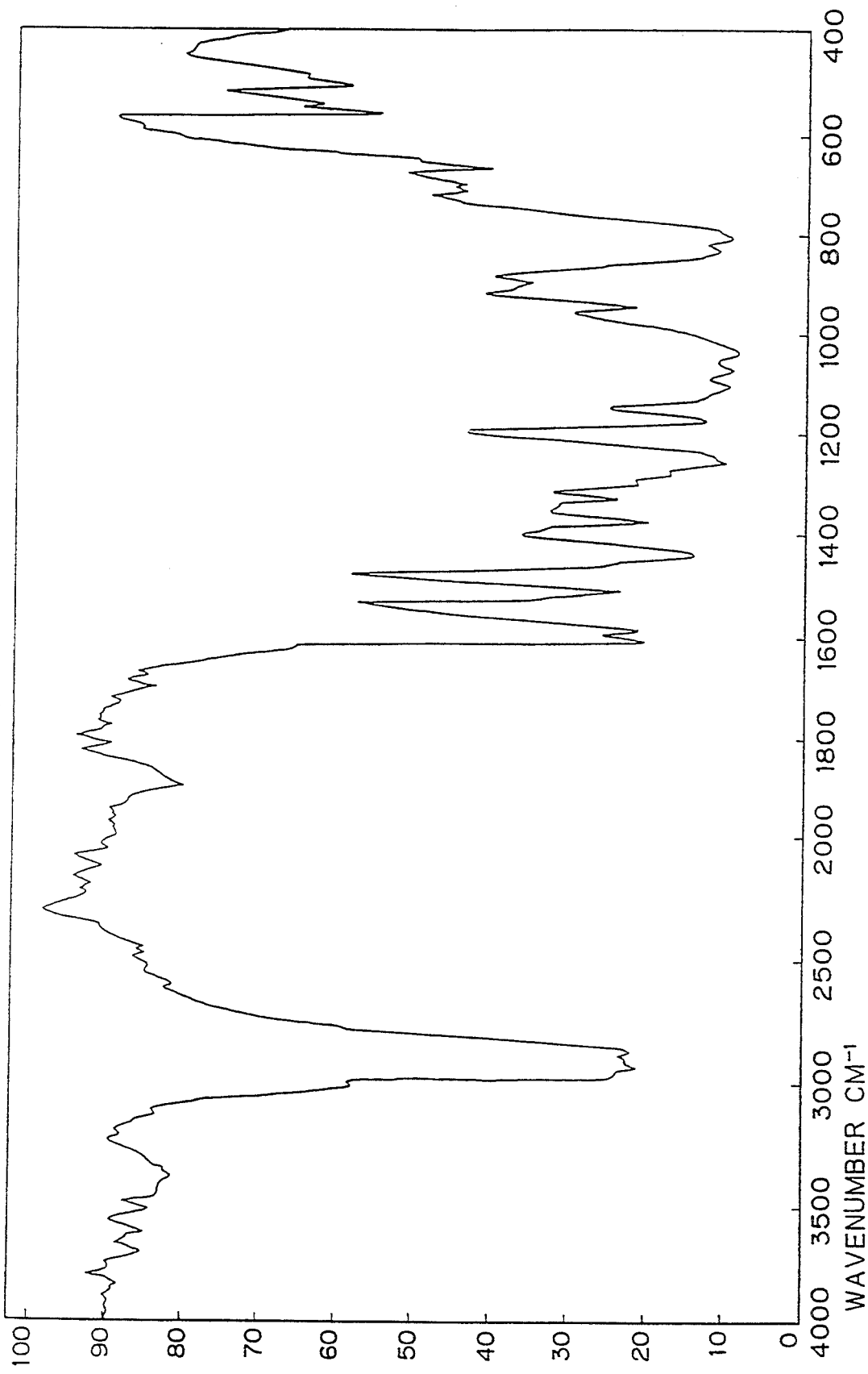

The molecular weight, phase transition temperatures and response time of the obtained copolymer are shown in Table 1, and IR spectrum thereof is shown in FIG. 8.

EXAMPLE 9

Synthesis of

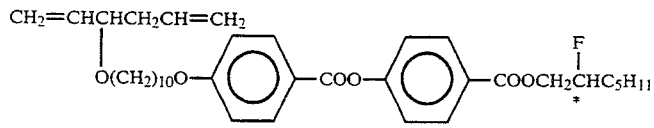

[1] Synthesis of

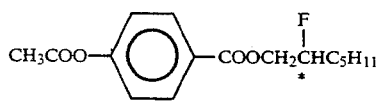

70 ml of thionyl chloride was added to 0.1 mol of 4-acetoxybenzoic acid, and the mixture was stirred for three hours at 80° C. The excessive thionyl chloride was distilled out from the reaction solution under reduced pressure to obtain an acid chloride. A solution containing 0.1 mol of optically active 2-fluoroheptanol and 0.12 mol of triethylamine dissolved in 500 ml of THF was stirred while a solution containing the acid chloride dissolved in THF was being added thereto dropwise, and the mixture was then stirred for 12 hours. After the reaction solution was subjected to an extraction with ether, drying and concentration, the concentrate was purified by column chromatography to obtain the objective ester compound (36). (Yield: 77%)

[2] Synthesis of

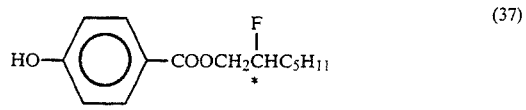

A solution containing 70 mmol of the ester compound (36) obtained in [1] and 50 ml of benzylamine dissolved in 300 ml of ether was stirred for one hour. After the reaction solution was washed with water, dried and concentrated, the concentrate was purified by column chromatography to obtain the objective phenol compound (37). (Yield: 95%)

[3] Synthesis of

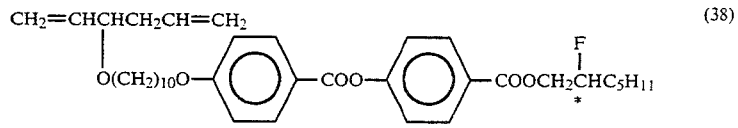

20 ml of thionyl chloride was added to 50 mol of the carboxylic acid derivative (22) obtained in Example 5-[3], and the mixture was stirred for three hours at 80° C. The excessive thionyl chloride was distilled out from the reaction solution under reduced pressure to obtain an acid chloride. Subsequently, A solution containing 50 mmol of the phenol compound (37) obtained in [2] and 60 mmol of triethylamine dissolved in 150 ml of THF was stirred while a solution of the acid chloride dissolved in THF was being added thereto dropwise, and the mixture was then stirred for 12 hours. After the reaction solution was subjected to an extraction with ether, drying and concentration, the concentrate was purified by column chromatography to obtain the objective diene compound (38). (Yield: 63%)

The diene compound exhibited liquid crystal properties and the following phase transition behavior and properties. The results of elementary analysis are shown In Table 2.

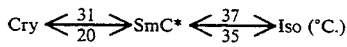

Response time: 112 μs (30° C.)
Tilt angle (2θ): 50° (30° C.)
Polyaddition reaction
A copolymer comprising

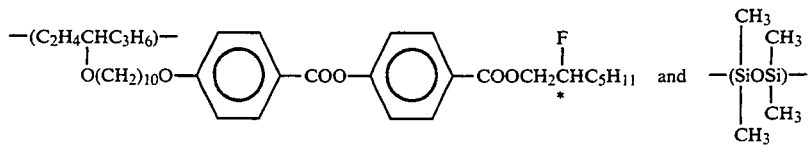

A toluene solution containing 10 mmol of the diene compound (38) obtained in [7], 10 mmol of 1,1,3,3-tetramethyldisiloxane and 20 mg of hexachloroplatinic acid hexahydrate was stirred in an atmosphere of gaseous argon for 24 hours at 80° C. The reaction solution was concentrated and was then purified by column chromatography to obtain the objective polymer. (Conversion rate: 88%)

Figure 9:
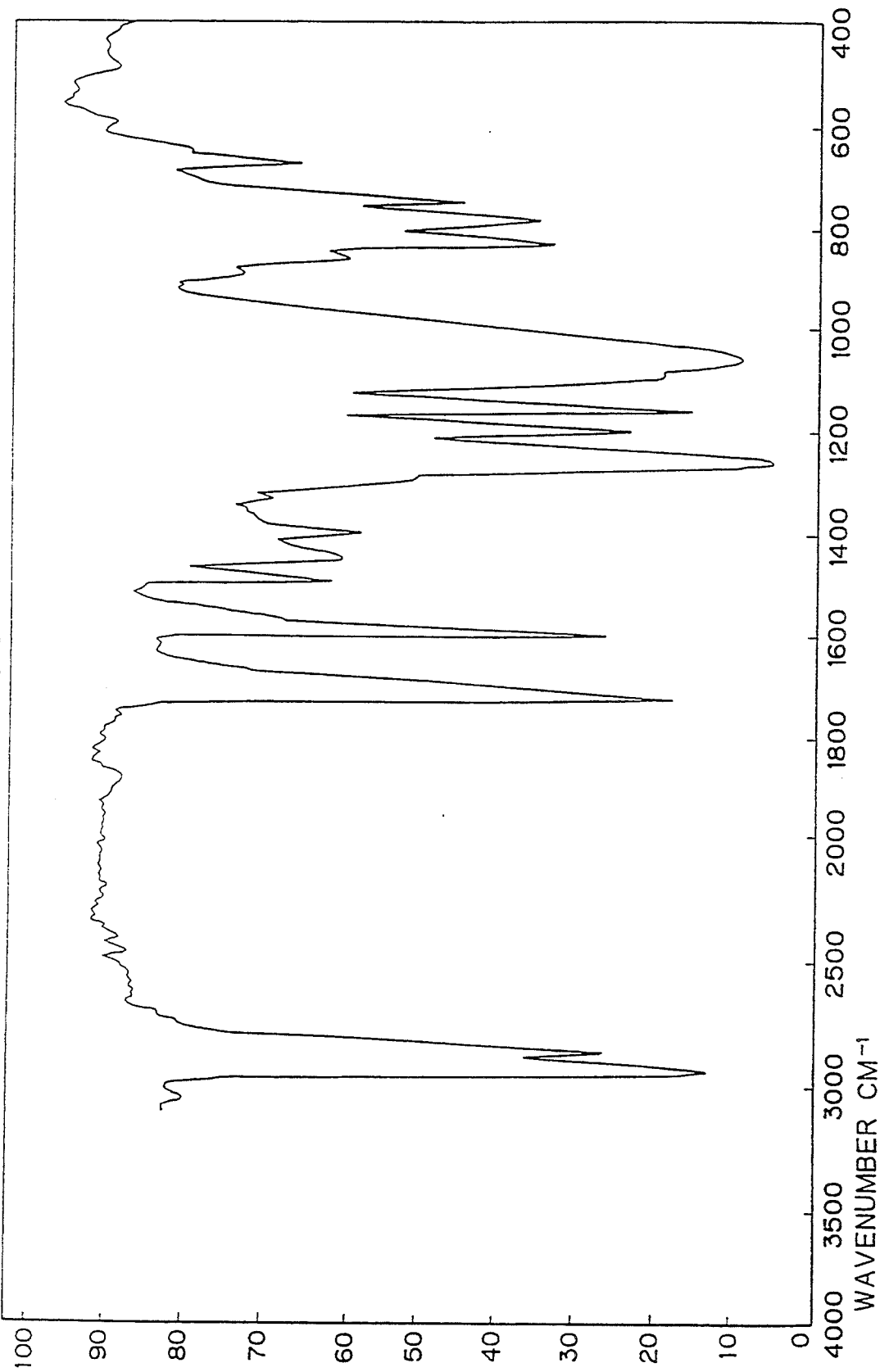

The molecular weight, phase transition temperatures and response time of the obtained polymer are shown in Table 1, and IR spectrum thereof is shown in FIG. 9.

EXAMPLE 10

Synthesis of

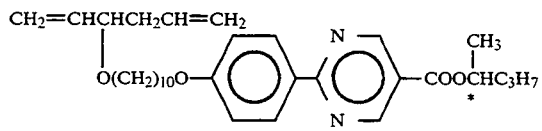

[1] Synthesis of a compound (39)

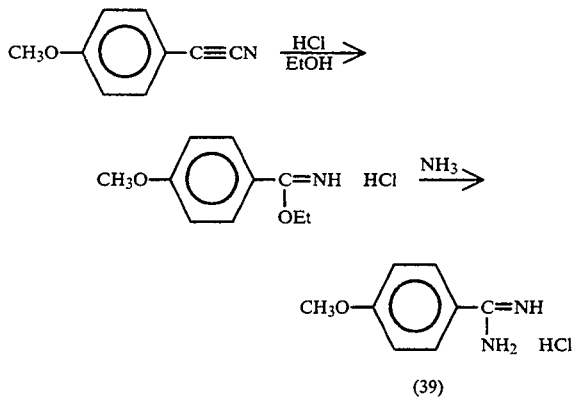

40 g of 4-methoxybenzonitrile was dissolved in ethanol, and the solution was then cooled. The mixture was stirred for two days at room temperature while dried gaseous hydrogen chloride was bubbled therein. After the reaction solution was concentrated under reduced pressure, the concentrate was dissolved in methanol, and was then stirred for one day while gaseous ammonia was being bubbled therein. The solvent used was distilled out from the reaction solution under reduced pressure to obtain an amidine salt (39).

[2] Synthesis of a compound (40)

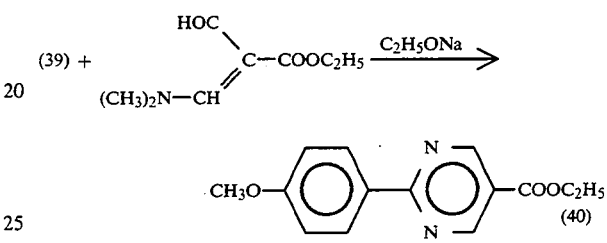

The amidine salt (39) and 50 g of 2-ethoxycarbonyl-3-dimethylaminoacrolein were mixed in ethanol, 45 g of sodium ethoxide was added gradually thereto, and the mixture was refluxed for 2 hours. Insoluble matters were removed out from the reaction mixture by filtration while the reaction mixture was hot, and after the filtrate was allowed to cool, the precipitate (40) generated therein was collected.

[3] Synthesis of a compound (41)

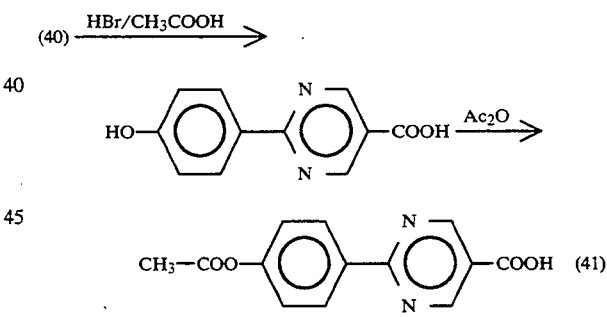

After removal of the protecting group from the compound (40) obtained in [2] by a treatment with HBr/acetic acid, the resulting compound was heated and stirred in acetic anhydride for one hour at 120° C. to obtain an acetylated compound (41).

[4] Synthesis of a compound (42)

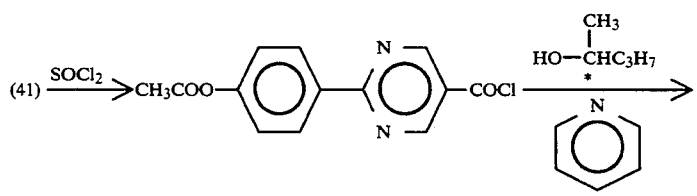

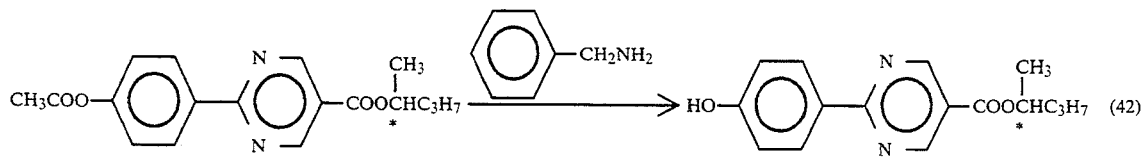

After the compound (41) obtained in [3] was dried under reduced pressure, the dried compound was refluxed in thionyl chloride and was then concentrated to obtain an acid chloride.

The acid chloride was dissolved in toluene, and a solution containing 15 g of (S)-2-pentanol and 20 g of pyridine dissolved in toluene was added thereto dropwise. The mixture was stirred for one day at room temperature. Insoluble matters were removed out from the reaction solution by filtration, and the filtrate was concentrated under reduced pressure. After the residue resulting from the concentration was dissolved in ether, 35 g of benzylamine was added thereto, and the mixture was then stirred for three hours at room temperature. After the reaction solution was washed with diluted hydrochloric acid and dried over magnesium sulfate, the solvent was distilled out under reduced pressure. The residue was purified by column chromatography to obtain a phenol compound (42). (Yield: 28.3 g, conversion rate from 4-methoxybenzonitrile: 33%)

[5] Synthesis of

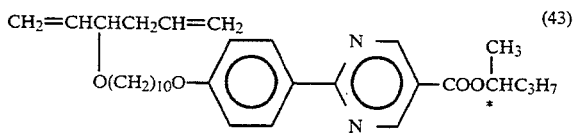

A solution containing 30 mmol of the ether compound (11) obtained in Example 3-[2], 30 mmol of the phenol compound (42) obtained in [4] and 0.1 mol of potassium carbonate dissolved in 150 ml of acetone was refluxed for 12 hours. After the reaction solution was filtered and concentrated, the concentrate was purified by column chromatography to obtain the objective diene compound (43). (Yield: 39%)

The diene compound exhibited liquid crystal properties and the following phase transition behavior and properties. The results of elementary analysis are shown in Table 2.

$$Cry \underset{18}{\overset{21}{\rightleftarrows}} SmC^* \underset{24}{\overset{28}{\rightleftarrows}} Iso\ (°C.)$$

Response time: 210 μs (21° C.)
Tilt angle (2θ): 56° (21° C.)
Polyaddition reaction
A copolymer comprising

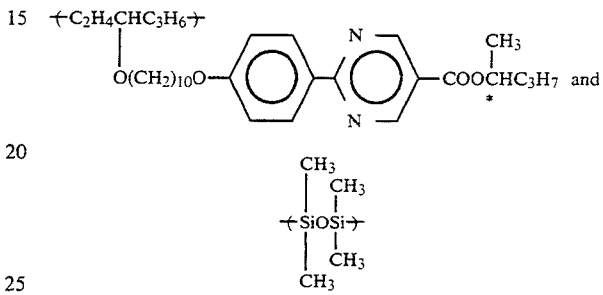

A toluene solution containing 10 mmol of the diene compound (43) obtained in [5], 10 mmol of 1,1,3,3-tetramethyldisiloxane and 20 mg of hexachloroplatinic acid hexahydrate was stirred in an atmosphere of gaseous argon for 24 hours at 80° C. The reaction solution was concentrated and was then purified by column chromatography to obtain the objective copolymer. (Conversion rate: 62%)

Figure 10:
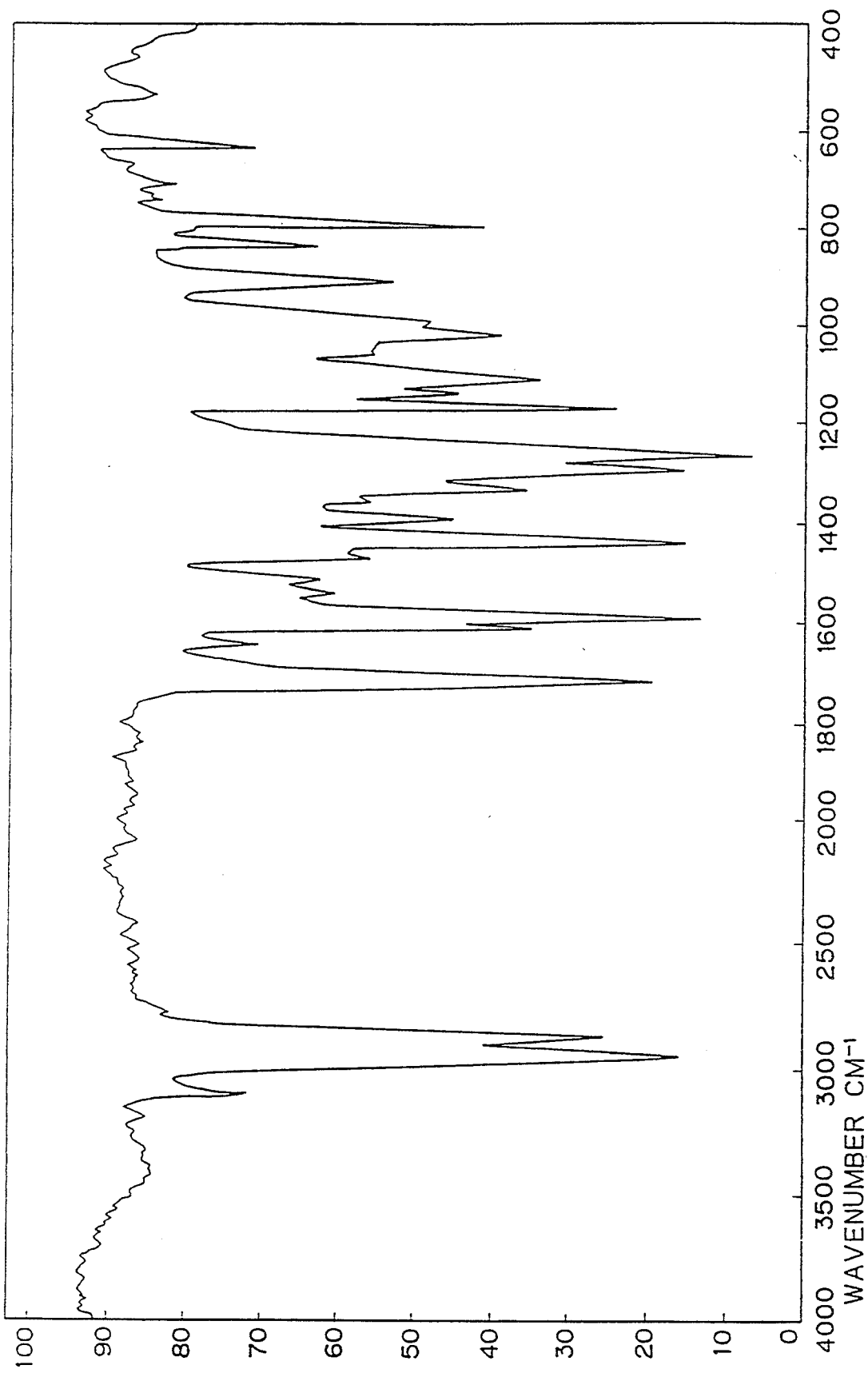

The molecular weight, phase transition temperatures and response time of the obtained copolymer are shown in Table 1, and IR spectrum thereof is shown in FIG. 10.

EXAMPLE 11

Synthesis of

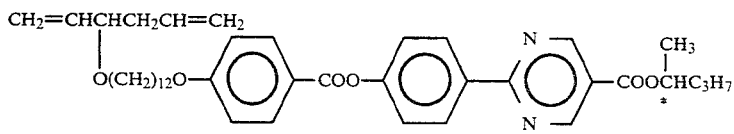

[1] Synthesis of

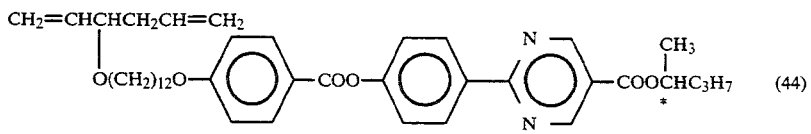

20 ml of thionyl chloride was added to 50 mmol of the carboxylic acid derivative (17) obtained in Example 4-[3], and the mixture was stirred for three hours at 80° C. Excessive thionyl chloride was distilled out from the reaction solution under reduced pressure to obtain an acid chloride. A solution containing 50 mmol of the phenol compound (42) obtained in Example 10-[4] and 60 ml of triethylamine dissolved in 150 ml of THF was stirred while a solution containing the acid chloride dissolved in THF was being added thereto dropwise, and the mixture was then stirred for 12 hours. After the reaction solution was subjected to an extraction with ether, drying and concentration, the concentrate was purified by column chromatography to obtain the objective diene compound (44). (Yield: 41%)

The diene compound exhibited liquid crystal properties and the following phase transition behavior and properties. The results of elementary analysis are shown in Table 2.

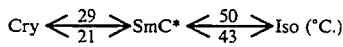

Response time: 106 μs (32° C.)
Tilt angle (2θ): 43° (32° C.)
Polyaddition reaction
A copolymer comprising

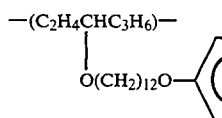

A toluene solution containing 10 mmol of the diene compound (44) obtained in [1], 10 mmol of 1,1,3,3-tetramethyldisiloxane and 20 mg of hexachloroplatinic acid hexahydrate was stirred in an atmosphere of gaseous argon for 24 hours at 80° C. The reaction solution was concentrated and was then purified by column chromatography to obtain the objective copolymer. (Conversion rate: 52%)

Figure 11:
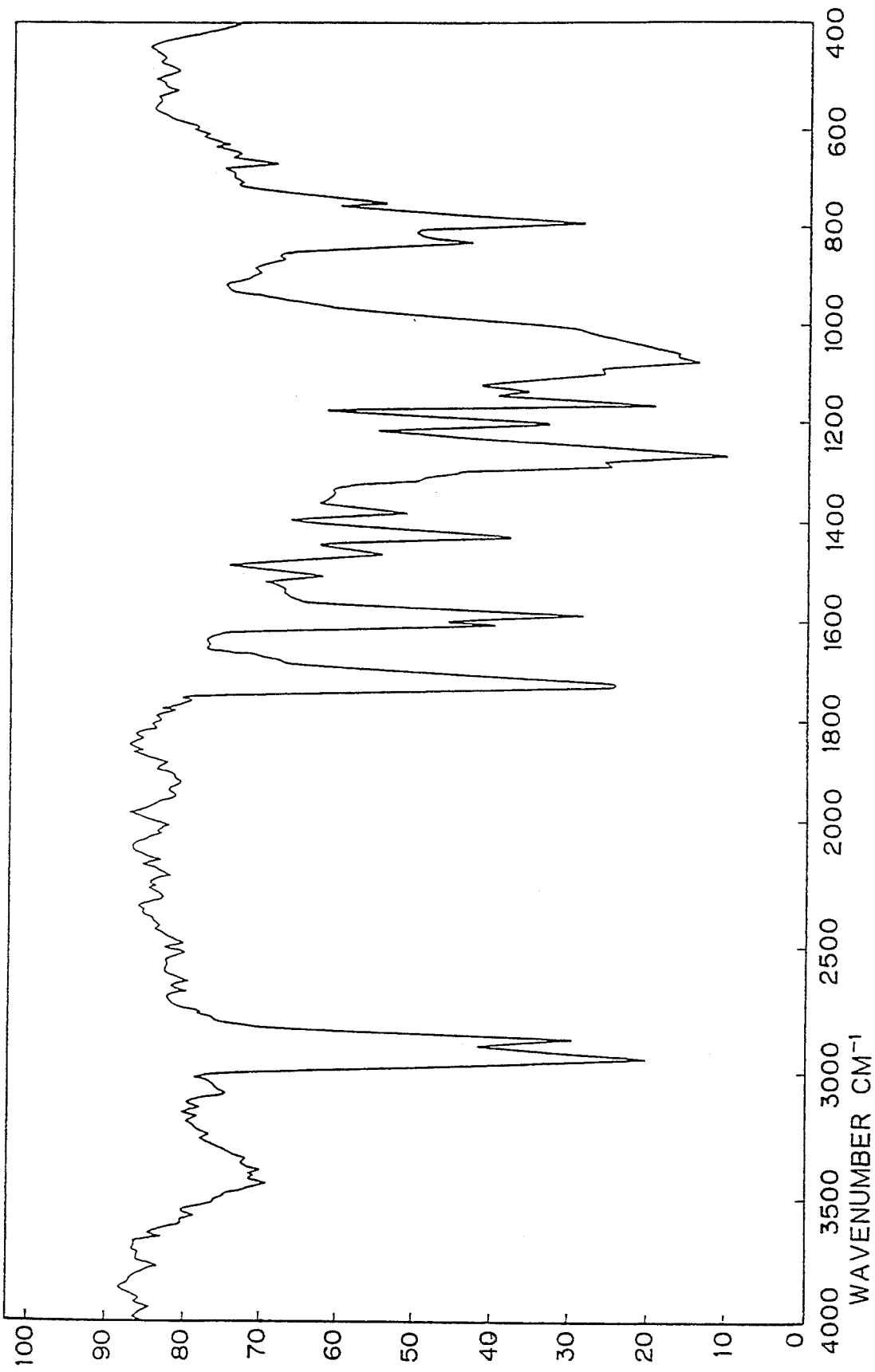

The molecular weight, phase transition temperatures and response time of the obtained copolymer are shown in Table 1, and IR spectrum thereof is shown in FIG. 11.

EXAMPLE 12

Synthesis of

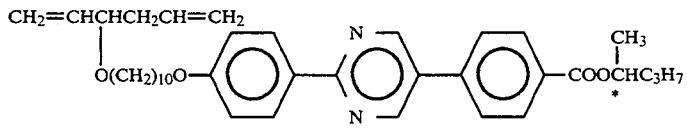

[1] Synthesis of a compound (45)

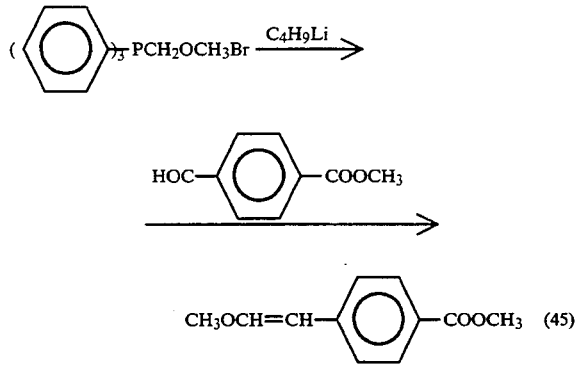

In an atmosphere of argon, a solution containing butyllithium dissolved in hexane was added to a solution containing 120 g of methoxymethyltriphenylphosphoni bromide dissolved in tetrahydrofuran (THF), and the mixture was stirred for one hour at room temperature. A solution containing 50 g of methyl 4-formylbenzoate dissolved in THF was added thereto, and stirring was continued for two hours. The reaction solution was washed with water, dried over magnesium sulfate and concentrated under reduced pressure. The residue was purified by column chromatography to obtain 47 g of methyl 4-(2-methoxyethenyl)benzoate (45).

[2] Synthesis of an iminium salt (46)

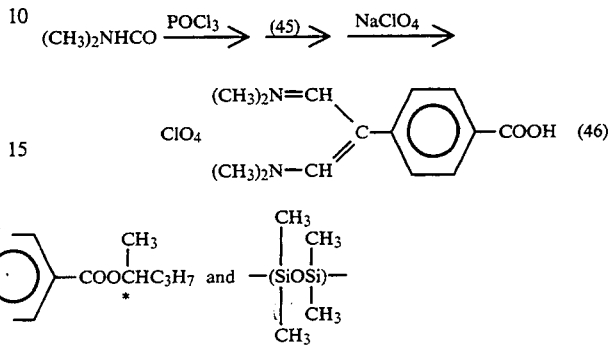

100 ml of dimethylformamide (DMF) was cooled to 0° C., and 40 g of phosphorus oxychloride was added thereto dropwise. The mixture was warmed back to room temperature and was then stirred for 30 minutes. A solution containing the above-described benzoate compound (45) dissolved in DMF was added thereto, and the mixture was stirred for one hour at 50° C. After the reaction solution was allowed to cool, the cooled reaction solution was poured into an aqueous sodium perchlorate, and the generated crystals of an iminium salt (46) were collected. The crystals were dried and used for the following reaction.

[3] Synthesis of a compound (47)

The above-described iminium salt (46) and 42 g of the amidine salt (39) obtained in Example 10-[1] were dissolved in methanol, 25 g of sodium methoxide was added thereto gradually, and the mixture was refluxed for 2 hours. After insoluble matters were removed out from the reaction solution while the reaction solution was hot, the remaining reaction solution was allowed to cool, and the generated precipitation (47) was collected.

[4] Synthesis of an acetylated compound (48)

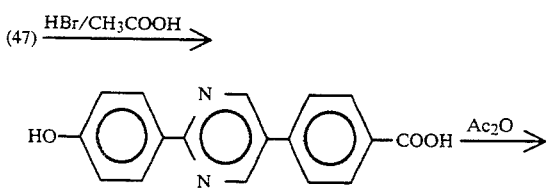

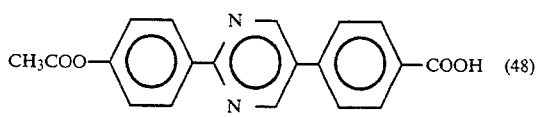

After removal of the protecting group from the compound (47) by a treatment with HBr/acetic acid, the obtained compound was heated and stirred in acetic anhydride for one hour at 120° C. to obtain an acetylated compound (48).

[5] Synthesis of a compound (51)

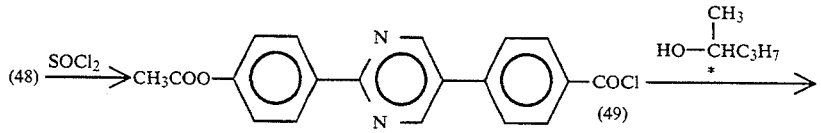

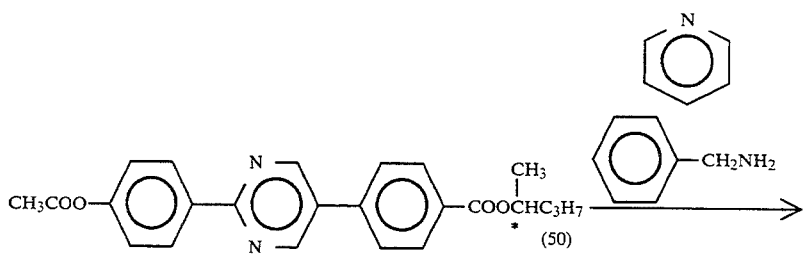

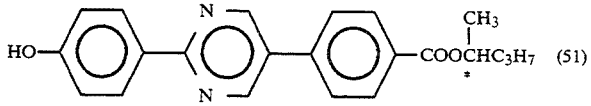

After the acetylated compound (48) was dried under reduced pressure, the dried compound (48) was refluxed in thionyl chloride to obtain an acid chloride (49).

The acid chloride was dissolved in toluene, and a solution containing 15 g of (S)-2-pentanol and 20 g of pyridine dissolved in toluene was added thereto dropwise. After the mixture was stirred for one day at room temperature, insoluble matters were removed out from the reaction solution by filtration, and the filtrate was concentrated under reduced pressure. The residue was dissolved in ether, 35 g of benzylamine was added thereto, and the mixture was then stirred for three hours at room temperature. After the reaction solution was washed with diluted hydrochloric acid and dried over magnesium sulfate, the solvent was distilled out under reduced pressure. The residue was purified by column chromatography to obtain a phenol compound (51). (Yield: 33 g, conversion rate from methyl 4-formylbenzoate: 30%)

[6] Synthesis of

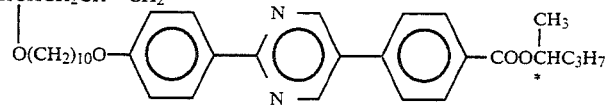

A solution containing 30 mmol of the ether compound (11) obtained in Example 3-[2], 30 mmol of the phenol compound (51) obtained in [5] and 0.1 mol of potassium carbonate dissolved in 150 ml of acetone was refluxed for 12 hours. After the reaction solution was filtered and concentrated, the concentrate was purified by column chromatography to obtain the objective diene compound (52). (Yield: 39%)

The diene compound exhibited liquid crystal properties and the following phase transition behavior and properties. The results of elementary analysis are shown in Table 2.

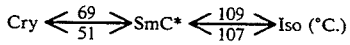

Response time: 26 μs (87° C.), 82 μs (67° C.)
Tilt angle (2θ): 68° (67° C.)
Polyaddition reaction
A copolymer comprising

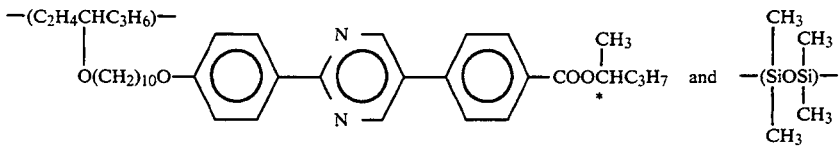

A toluene solution containing 10 mmol of the diene compound (52) obtained in [6], 10 mmol of 1,1,3.3-tetramethyldisiloxane and 20 mg of hexachloroplatinic acid hexahydrate was stirred in an atmosphere of gaseous argon for 24 hours at 80° C. The reaction solution was concentrated and was then purified by column chromatography to obtain the objective copolymer. (Conversion rate: 71%)

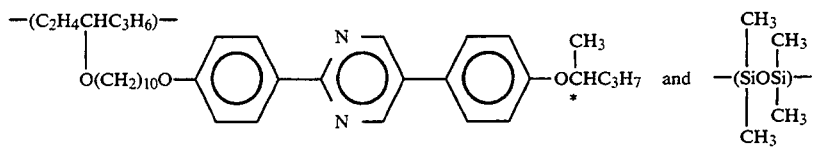

Response time: 115 μs (59° C.), 815 μs (39° C.)
Tilt angle (2θ): 88° (39° C.)
Polyaddition reaction
A copolymer comprising

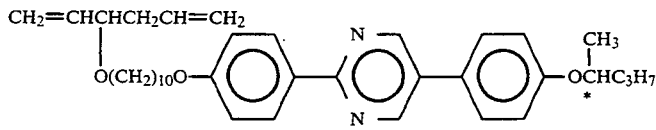

Figure 12:
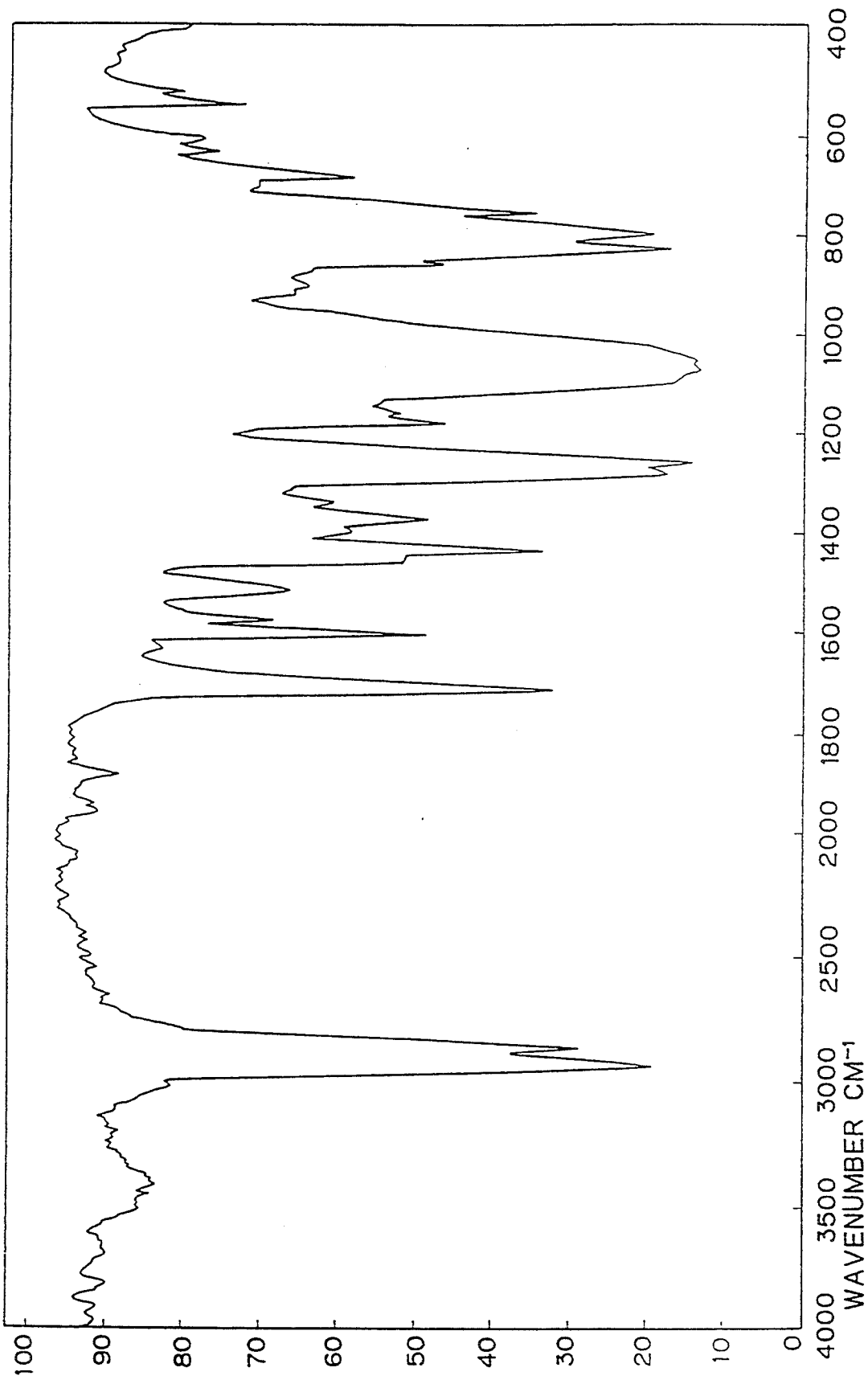

The molecular weight, phase transition temperatures and response time of the obtained copolymer are shown in Table 1, and IR spectrum thereof is shown in FIG. 12.

EXAMPLE 13
Synthesis of

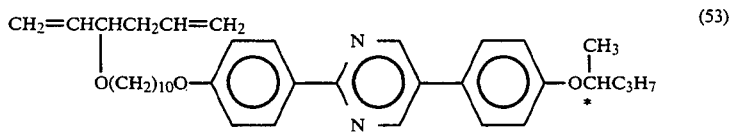

Synthesis of $CH_2=CHCHCH_2CH=CH_2$

A solution containing 30 mmol of the ether compound (11) obtained in Example 3-[2], 30 mmol of the phenol compound obtained in Example 8-[6] and 0.1 mol of potassium carbonate dissolved in 150 ml of acetone was stirred for 12 hours. After the reaction solution was filtered and concentrated, the concentrate was purified by column chromatography to obtain the objective diene compound (53). (Yield: 42%)

The diene compound exhibited liquid crystal properties and the following phase transition behavior and properties. The results of elementary analysis are shown in Table 2.

A toluene solution containing 10 mmol of the diene compound (53) obtained in [1], 10 mmol of 1,1,3,3-tetramethyldisiloxane and 20 mg of hexachloroplatinic acid hexahydrate was stirred in an atmosphere of gaseous argon for 24 hours at 80° C. The reaction solution was concentrated and was then purified by column chromatography to obtain the objective copolymer.

(Conversion rate: 67%)

(53)

Figure 13:
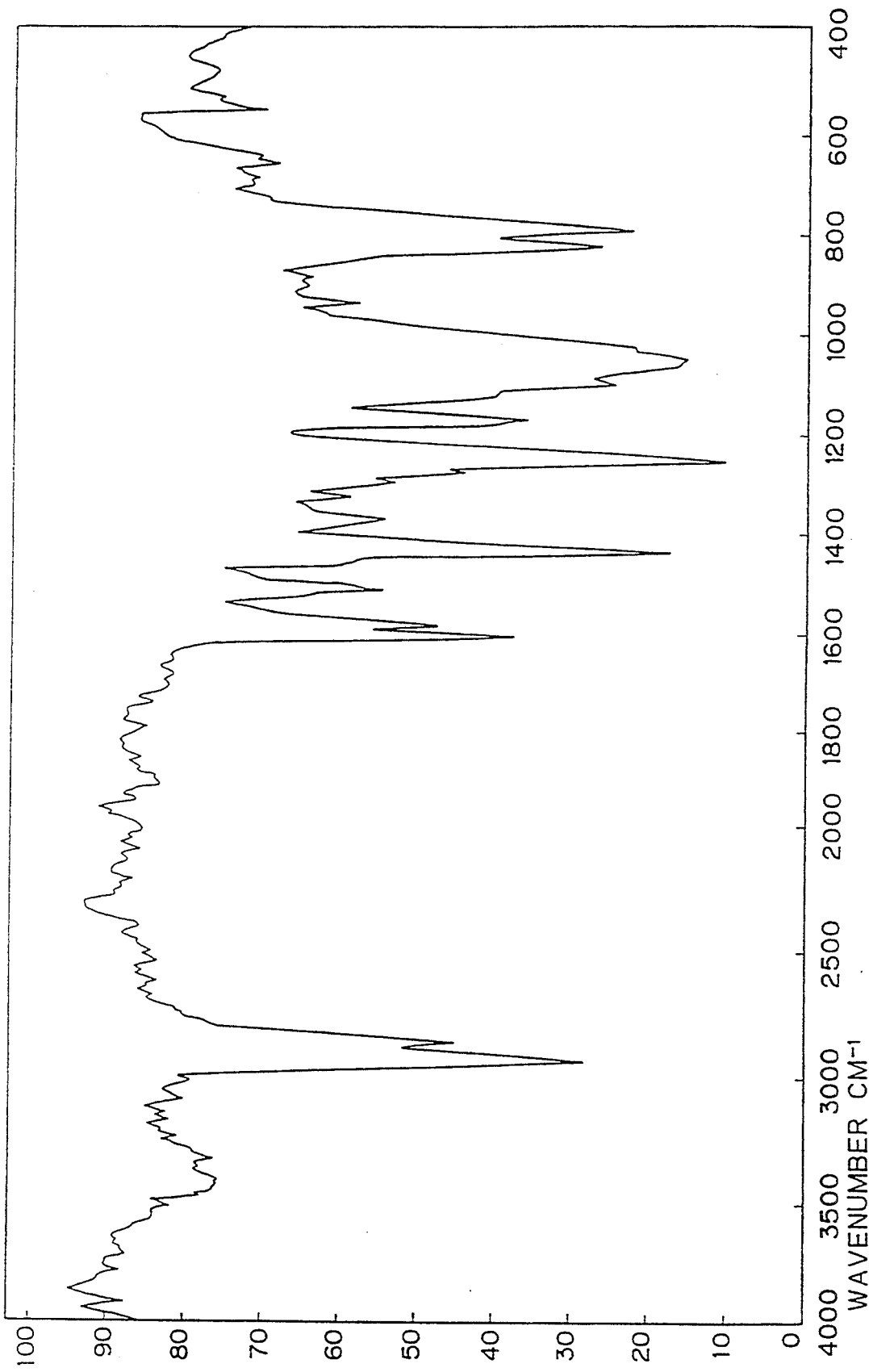

The molecular weight, phase transition temperatures and response time of the obtained copolymer are shown in Table 1, and IR spectrum thereof is shown in FIG. 13.

EXAMPLE 14
Synthesis of

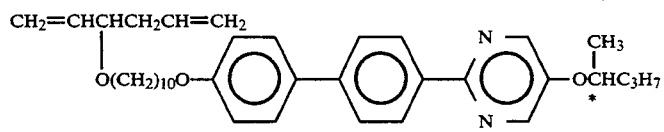

Synthesis of a compound (54)

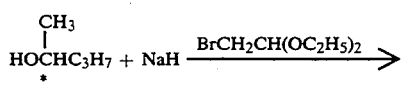

-continued

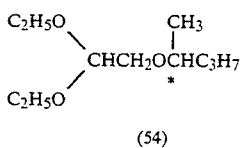
(54)

35 g of (S)-2-pentanol was dissolved in tetrahydrofuran, and 16 g of 60% sodium hydride was added thereto. After stirring for 30 minutes, 80 g of bromoacetaldehyde diethylacetal was added thereto, and the mixture was refluxed for 6 hours. After the reaction solution were concentrated and water and ether was added thereto, the mixture was shaken for mixing. The organic layer was collected and was dried with magnesium sulfate to remove the solvent off. Purification was carried out by column chromatography to obtain 2-(4-methylbutyloxy)acetaldehyde diethylacetal (54).
Synthesis of a compound (55)

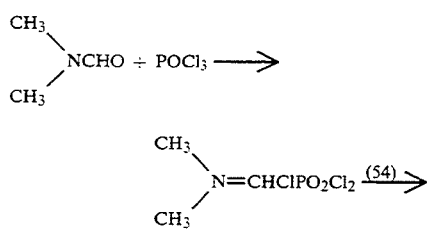

(55)

A solution prepared by adding 30 g of dried N,N-dimethylformamide to dried dichloroethane was cooled to 5° C. or lower, After a solution containing 63 g of phosphorus oxychlorate dissolved in dichloroethane was added to the cooled solution dropwise, the mixture was stirred for 30 minutes at 5° C. or lower. Subsequently, to the reaction solution was added a dichloroethane solution of the compound (54), and the resulting mixture was stirred for 30 minutes at room temperature and then for one hour at 70° C. After the reaction solution was cooled to room temperature, the reaction solution was poured into ice water and was then made basic by addition of potassium carbonate. The reaction solution was then concentrated under reduced pressure. The concentrate was warmed and stirred, and was then extracted with ethyl acetate. After the extract was dried over magnesium sulfate, the solvent used was distilled out. The residue was distilled under reduced pressure to obtain 2-(1-methylbutyloxy)-3-dimethylaminoacrolein (55) (boiling point: 150° to 155° C./5 mmHg).

[3] Synthesis of an amidine salt (56)

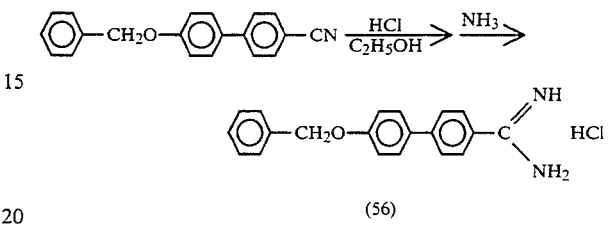

(56)

70 g of 4'-benzyloxy-4-cyanobiphenyl was dissolved in dried ethanol and was then cooled. The cooled solution was stirred for one day while gaseous hydrogen chloride was being bubbled therein. After the reaction solution was concentrated under reduced pressure, the concentrate was dissolved in methanol, and the resulting solution was stirred for one day while gaseous ammonium was being bubbled therein. The solvent used was then distilled out from the reaction solution under reduced pressure to obtain an amidine salt (56).

[4] Synthesis of a compound (58)

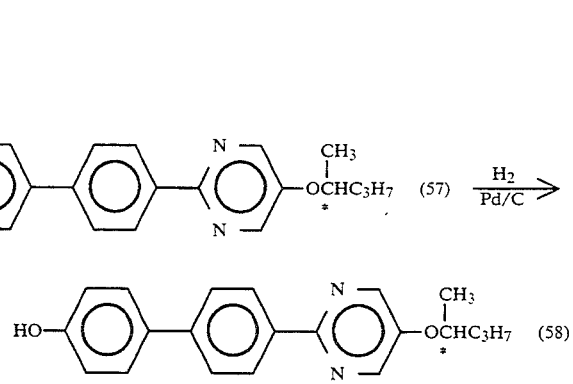

53 g of the compound (56) and 55 g of the compound (55) were mixed in ethanol, and 12 g of sodium methoxide was added thereto gradually. The reaction solution was refluxed for two hours, and insoluble matters were then removed out while the reaction solution was hot. After the solvent used was distilled out, the residue was purified by column chromatography to obtain a compound (57). The obtained compound (57) was dissolved in ethyl acetate, and hydrogenation was carried out by using palladium carbon as a catalyst. After the solvent used was removed out from the reaction solution, recrystallization from a solvent mixture of hexane and toluene was carried out to obtain the objective compound (58). (Yield: 41 g, Conversion rate from 4'-benzyloxy-4-cyanobiphenyl: 48%).

[5] Synthesis of

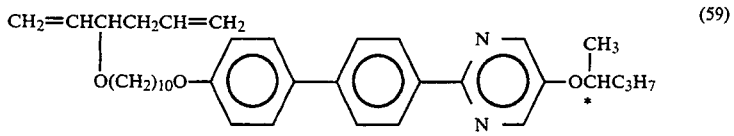
(59)

A solution containing 30 mmol of the ether compound (11) obtained in Example 3-[2], 30 mmol of the phenol compound (58) obtained in [4] and 0.1 mol of potassium carbonate dissolved in 150 ml of acetone was stirred for 12 hours. After the reaction solution was filtered and concentrated, the concentrate was purified by column chromatography to obtain the objective diene compound (59). (Yield: 52%)

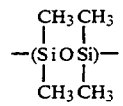

Response time: 104 μs (39° C.)
Tilt angle (2θ): 77° (39° C.)
Polyaddition reaction
A copolymer comprising

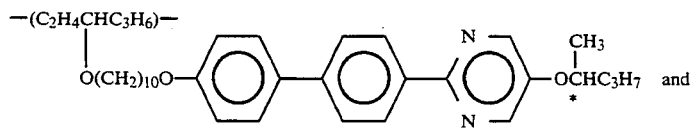 and $$\begin{array}{c} CH_3\ CH_3 \\ |\quad\ | \\ -(Si O Si)- \\ |\quad\ | \\ CH_3\ CH_3 \end{array}$$

A toluene solution containing 10 mmol of the diene compound (59) obtained in [5], 10 mmol of 1,1,3,3-tetramethyldisiloxane and 20 mg of hexachloroplatinic acid hexahydrate was stirred in an atmosphere of gaseous argon for 24 hours at 80° C. The reaction solution was concentrated and was then purified by column chromatography to obtain the objective copolymer. (Conversion rate: 66%)

The diene compound exhibited liquid crystal properties and the following phase transition behavior and properties. The results of elementary analysis are shown in Table 2.

Figure 14:
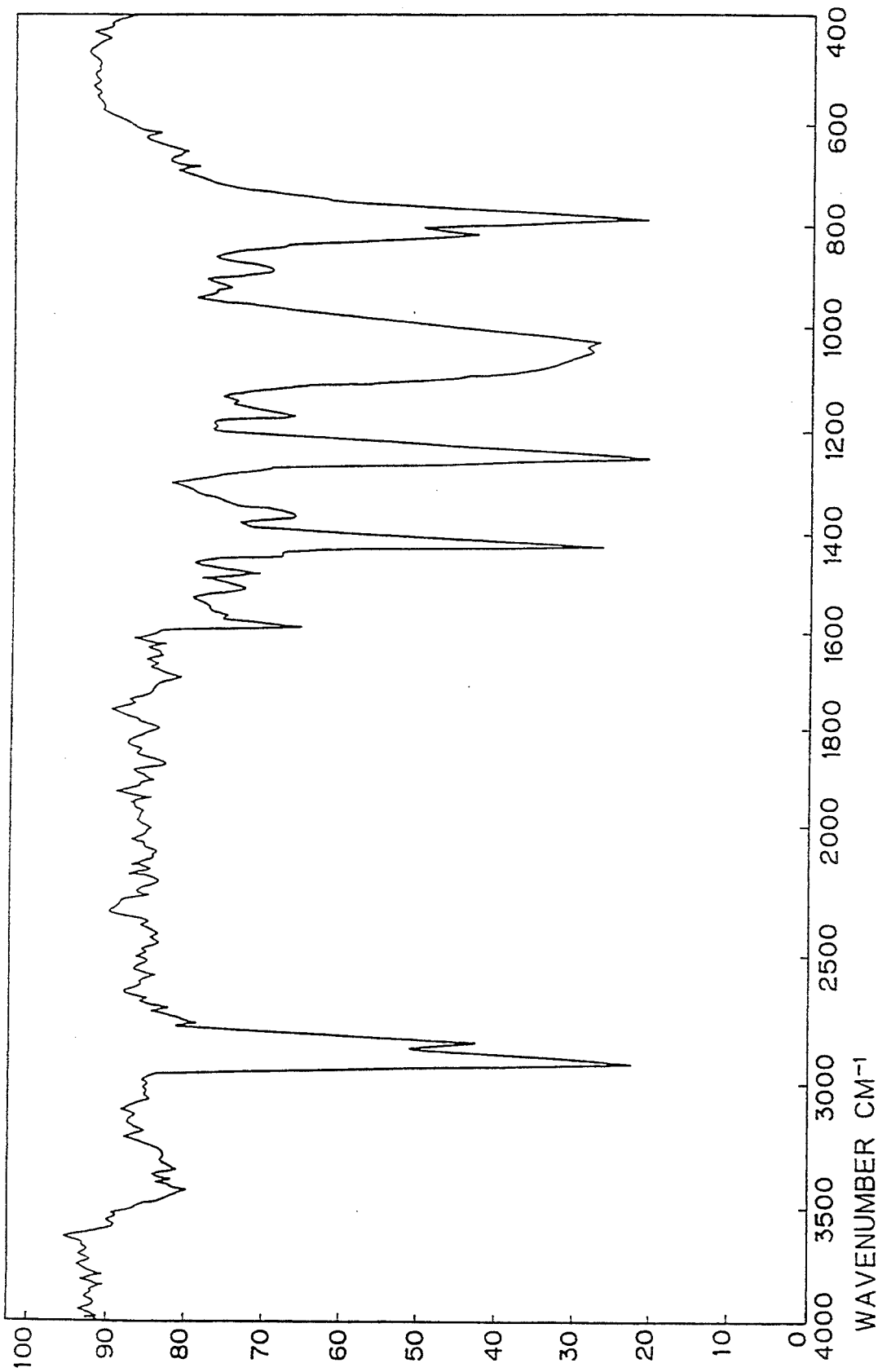

The molecular weight, phase transition temperatures and response time of the obtained copolymer are shown in Table 1, and IR spectrum thereof is shown in FIG. 14.

TABLE 1

| | Repeating Unit | Phase transition temperature (°C.) | Number average molecular weight (Mn) | Response time (temperature °C.) |
|---|---|---|---|---|
| Example 1 | —(C$_2$H$_4$CHC$_3$H$_6$)— O(CH$_2$)$_6$O—[Ph]—[Ph]—COO—[Ph]—COOCH$_2$CHC$_2$H$_5$ / CH$_3$ —(Z1)— | g $\underset{-44}{\overset{-41}{\longleftrightarrow}}$ SmC* $\underset{102}{\overset{103}{\longleftrightarrow}}$ SmA $\underset{104}{\overset{106}{\longleftrightarrow}}$ Iso | 8,200 | 31 ms (82° C.) 35 ms (62° C.) 420 ms (42° C.) |
| Example 2 | —(C$_2$H$_4$CHC$_3$H$_6$)— O(CH$_2$)$_8$O—[Ph]—[Ph]—COO—[Ph]—COOCHC$_3$H$_7$ / CH$_3$ —(Z1)— | g $\underset{-28}{\overset{-25}{\longleftrightarrow}}$ SmC* $\underset{77}{\overset{79}{\longleftrightarrow}}$ SmA $\underset{93}{\overset{99}{\longleftrightarrow}}$ Iso | 2,600 | 305 μs (57° C.) 3.7 ms (25° C.) |
| Example 3 | —(C$_2$H$_4$CHC$_3$H$_6$)— O(CH$_2$)$_{10}$O—[Ph]—[Ph]—COO—[Ph]—OCH$_2$CHC$_6$H$_{13}$ / F —(Z1)— | g $\underset{70}{\overset{80}{\longleftrightarrow}}$ SmC* $\underset{143}{\overset{144}{\longleftrightarrow}}$ Iso | 2,900 | 79 μs (120° C.) 127 μs (100° C.) 389 μs (80° C.) |
| Example 4 | —(C$_2$H$_4$CHC$_3$H$_6$)— O(CH$_2$)$_{12}$O—[Ph]—[Ph]—COO—[Ph]—COOCHC$_3$H$_7$ / CH$_3$ —(Z1)— | g $\underset{-29}{\overset{-23}{\longleftrightarrow}}$ SmI $\underset{-18}{\overset{-15}{\longleftrightarrow}}$ SmC* $\underset{75}{\overset{76}{\longleftrightarrow}}$ SmA $\underset{83}{\overset{84}{\longleftrightarrow}}$ Iso | 3,000 | 8.2 ms (55° C.) 10.5 ms (35° C.) 32.8 ms (25° C.) |
| Example 5 | —(C$_2$H$_4$CHC$_3$H$_6$)— O(CH$_2$)$_{10}$O—[Ph]—[Ph]—COO—[Ph]—OCOCHC$_2$H$_5$ / Cl CH$_3$ —(Z1)— | g $\underset{26}{\overset{-21}{\longleftrightarrow}}$ SmC* $\underset{-4}{\overset{2}{\longleftrightarrow}}$ Iso | 3,300 | 99 ms (−24° C.) |
| Example 6 | —(C$_2$H$_4$CHC$_3$H$_6$)— O(CH$_2$)$_9$O—[Ph]—[Ph]—COO—[Ph]—COO—CHC$_6$H$_{13}$ / CH$_3$ —(Z1)— | g $\underset{14}{\overset{15}{\longleftrightarrow}}$ SmC* $\underset{32}{\overset{39}{\longleftrightarrow}}$ Iso | 2,200 | 6.3 ms (22° C.) |
| Example 7 | —(C$_2$H$_4$CHC$_3$H$_6$)— O(CH$_2$)$_{12}$O—[Ph]—[Ph]—COO—[Ph]—COOCHC$_3$H$_7$ / CH$_3$ —(Z2)— | g $\underset{-31}{\overset{-20}{\longleftrightarrow}}$ SmC* $\underset{92}{\overset{99}{\longleftrightarrow}}$ SmA $\underset{108}{\overset{109}{\longleftrightarrow}}$ Iso | 2,800 | 2.3 ms (72° C.) 9.9 ms (52° C.) 13.5 ms (32° C.) |

TABLE 1-continued

| | Repeating Unit | Phase transition temperature (°C.) | Number average molecular weight (Mn) | Response time (temperature °C.) |
|---|---|---|---|---|
| Example 8 | —(C₃H₆CHC₃H₆)— / O(CH₂)₁₀O— —(Z1)— [pyrazine-biphenyl-OCH(CH₃)C₃H₇] | g ⇌(54/31) SmC* ⇌(93/88) Iso | 4,100 | 804 μs (68° C.) 6.1 ms (48° C.) |
| Example 9 | —(C₂H₄CHC₃H₆)— / O(CH₂)₁₀O— —(Z1)— [phenyl-COO-phenyl(F)-COOCH₂CHC₅H₁₁*] | g ⇌(5/−4) SmC* ⇌(28/25) Iso | 13,500 | 5.2 ms (5° C.) |
| Example 10 | —(C₂H₄CHC₃H₆)— / O(CH₂)₁₀O— —(Z1)— [pyrazine-phenyl-COOCHCH₃C₃H₇* with CH₃] | g ⇌(13/11) SmC* ⇌(32/28) Iso | 7,400 | 1.9 ms (18° C.) |
| Example 11 | —(C₂H₄CHC₃H₆)— / O(CH₂)₁₂O— —(Z1)— [phenyl-COO-pyrazine-CH(CH₃)COOCH₃C₃H₇*] | g ⇌(23/3) SmC* ⇌(59/56) Iso | 3,100 | 1.3 ms (36° C.) 59 ms (16° C.) |
| Example 12 | —(C₂H₄CHC₃H₆)— / O(CH₂)₁₀O— —(Z1)— [pyrazine-biphenyl-COOCHCH₃C₃H₇*] | g ⇌(18/6) SmC* ⇌(107/94) Iso | 3,800 | 1.0 ms (74° C.) 3.9 ms (54° C.) 13.2 ms (34° C.) |
| Example 13 | —(C₂H₄CHC₃H₆)— / O(CH₂)₁₀O— —(Z1)— [pyrazine-biphenyl-OCH(CH₃)C₃H₇*] | g ⇌(50/23) SmC* ⇌(102/99) Iso | 2,900 | 1.4 ms (79° C.) 6.1 ms (59° C.) 82.3 ms (39° C.) |

TABLE 1-continued

| Repeating Unit | Phase transition temperature (°C.) | Number average molecular weight (Mn) | Response time (temperature °C.) |
|---|---|---|---|
| Example 14 —(Z1)— <br><br> —(C₂H₄CHCH₃H₆)— <br> O(CH₂)₁₀O—〈ring〉—〈ring〉—C(=N)—〈ring〉—C(=N)—OCHC₃H₇ with CH₃ side group and * chiral center <br><br> Z1: CH₃–Si(CH₃)–O–Si(CH₃)– <br> Z2: CH₃–Si(CH₃)–O–Si(CH₃)–O–Si(CH₃)–O–Si(CH₃)– | g $\xrightarrow[-14]{-8}$ Sm1 $\xrightarrow[6]{10}$ SmC* $\xrightarrow[63]{65}$ Iso | 4,900 | 3.5 ms (43° C.) <br> 10.5 ms (23° C.) |

The response times were measured at (Iso—SmC* or SmA—SmC* transition temperature - 20) °C., (Iso—SmC* or SmA—SmC* transition temperature - 40) °C. and (Iso—SmC* or SmA—SmC* transition temperature - 60) °C. In Examples 6 and 10, the response times however were measured at (Iso—SmC* or SmA—SmC* transition temperature - 10) °C. since the temperature ranges of SmC* phase were narrow.

TABLE 2

RESULTS OF ELEMENTARY ANALYSIS

| | C (%) | H (%) | O (%) |
|---|---|---|---|
| Example 1 | | | |
| Calcd. | 76.00 | 7.58 | 16.42 |
| Found | 76.0 | 7.6 | 16.4 |
| Example 2 | | | |
| Calcd. | 76.44 | 7.90 | 15.66 |
| Found | 76.3 | 8.0 | 15.7 |
| Example 3 | | | |
| Calcd. | 78.98 | 8.79 | 12.23 |
| Found | 78.9 | 8.8 | 12.3 |
| Example 4 | | | |
| Calcd. | 77.21 | 8.44 | 14.35 |
| Found | 77.2 | 8.4 | 14.4 |
| Example 5 | | | |
| Calcd. | 75.09 | 8.69 | 16.22 |
| Found | 75.0 | 8.7 | 16.3 |
| Example 6 | | | |
| Calcd. | 78.79 | 9.55 | 11.66 |
| Found | 78.5 | 9.7 | 11.8 |
| Example 7 | | | |
| Calcd. | 77.71 | 8.79 | 13.50 |
| Found | 77.7 | 8.8 | 13.5 |
| Example 8 | | | |
| Calcd. | 78.75 | 8.96 | 8.21 |
| Found | 77.9 | 9.0 | 8.3 |
| Example 9 | | | |
| Calcd. | 75.09 | 8.69 | 16.22 |
| Found | 75.0 | 8.7 | 16.3 |
| Example 10 | | | |
| Calcd. | 73.73 | 8.87 | 12.24 |
| Found | 73.4 | 8.9 | 12.3 |
| Example 11 | | | |
| Calcd. | 73.40 | 8.11 | 14.31 |
| Found | 73.2 | 8.2 | 14.4 |
| Example 12 | | | |
| Calcd. | 76.21 | 8.42 | 10.69 |
| Found | 76.1 | 8.4 | 10.7 |
| Example 13 | | | |
| Calcd. | 77.85 | 8.83 | 8.41 |
| Found | 77.7 | 8.9 | 8.5 |
| Example 14 | | | |
| Calcd. | 77.85 | 8.83 | 8.41 |
| Found | 77.6 | 8.9 | 8.6 |

EXAMPLE 15

Synthesis of

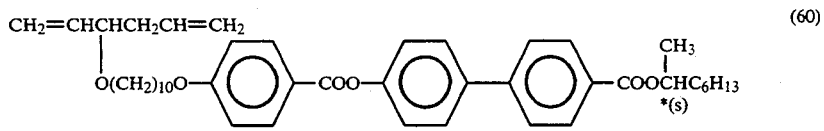

43.2 g of the carboxylic acid derivative (22) obtained in Example 5-[3], 34 ml of thionyl chloride and 130 ml of toluene were added to a 1000 ml four-neck flask equipped with a reflux condenser, and were then stirred to form a homogeneous solution. After addition of 0.2 ml of pyridine, the solution was heated to 65° C., and was then further stirred for four hours while the reaction temperature was maintained at 65° C.

Subsequently, the reaction mixture was further heated for one hour at 65° C. and for 30 minutes at 80° C. by using an aspirator under reduced pressure to remove out the toluene used and residual thionyl chloride. The reaction mixture was then cooled to room temperature. After addition of 170 ml of toluene and 11.8 ml of pyridine, the mixture was made into a homogeneous solution. To the solution was added dropwise 170 ml of a solution containing 37.9 g of optically active 1-methylheptyl 4'-hydroxybiphenyl-4-carboxylate dissolved in toluene with stirring over a period of 30 minutes. The mixture was then stirred for a night at room temperature to complete the reaction.

The reaction mixture was filtered to remove out a pyridine salt precipitated therein. Subsequently, the solvent was distilled out from the filtrate by using a rotary evaporator under reduced pressure at a bath temperature of 50° C. to obtain 79.8 g of a concentrate. To the concentrate was added 80 g of methylene chloride, and the mixture was stirred to form a homogeneous, transparent solution. Separation of the objective compound from the solution was carried out by employing a liquid chromatography using a pre-column filled with activated alumina and a main column filled with silica gel. An effluent containing the objective compound was distilled using a rotary evaporator under reduced pressure at a bath temperature of 50° C. to distill out the solvent used, and thus 69.2 g (yield: 88%) of a crude product of the objective diene compound (60) was obtained. The crude product was transferred into a 1-litter flask, and 900 ml of ethanol was then added thereto. After the flask was equipped with a reflux condenser, stirring was carried out for 10 minutes at 70° C. After it was confirmed that white solids were dissolved completely to form a homogeneous solution, the flask was allowed to cool to near room temperature. Subsequently, the flask was sealed to avoid the entrance of humidity, and was then placed in a refrigerator and allowed to stand for more than 4 hours. Thereafter, the flask was taken out from the refrigerator, and white solids precipitated in the solution were collected by suction filter and washed with ethanol several times. Finally, the solids were dried for a night in a vacuum drier at 50° C. to obtain 57.8 g of the objective diene compound (60). (Yield: 74%)

The diene compound exhibited liquid crystal properties and the following phase transition behavior and properties. The results of elementary analysis are shown below.

Response time: 25 μs (52° C.)
Tilt angle (2θ): 81° (52° C.)

| | C (%) | H (%) | O (%) |
|---|---|---|---|
| calculated values | 77.37 | 8.58 | 14.06 |
| found values | 77.4 | 8.6 | 14.1 |

Polyaddition reaction
A copolymer comprising

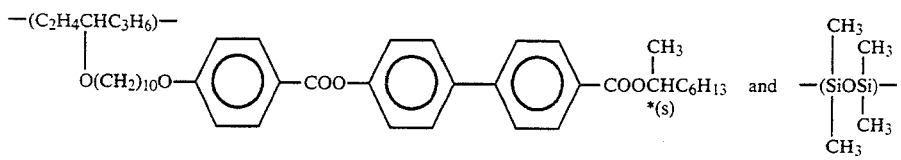

57.8 g of the diene compound (60) and 7.6 g of 1,1,3,3-tetramethyldisiloxane were dissolved in 430 ml of toluene, and were allowed to react in a stream of gaseous argon for 8 hours at 80° C. in the presence of 6 mg of chloroplatinic acid hexahydrate that was added thereto as a catalyst.

Figure 15:
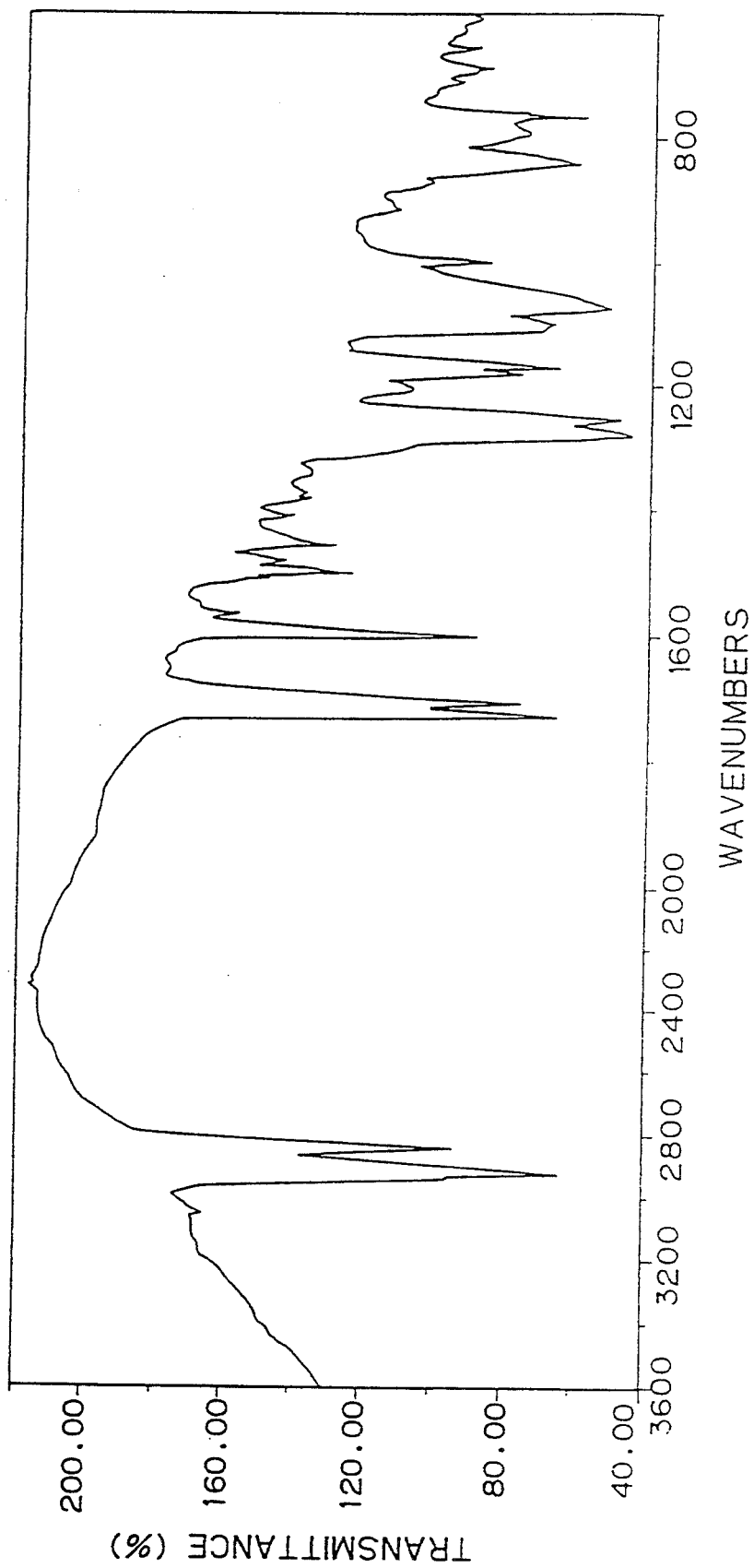

After completion of the reaction, the reaction mixture was allowed to cool to room temperature, and to the cooled reaction mixture was added 1.3 g of activated charcoal. After the mixture was stirred for 10 minutes at 50° C., the activated charcoal was removed by filtration. Toluene was distilled out from the reaction mixture under reduced pressure, and the residue was purified by silica gel column chromatography to obtain 50.3 g of the objective liquid-crystalline copolymer. The molecular weight, phase transition temperatures and response time of the obtained copolymer are as follows. IR spectrum of the obtained copolymer is shown in FIG. 15.

Response time: 2.0 ms (63° C.) 8.2 ms (43° C.) 43 ms (23° C.)
Mn=2800

EXAMPLE 16

Synthesis of

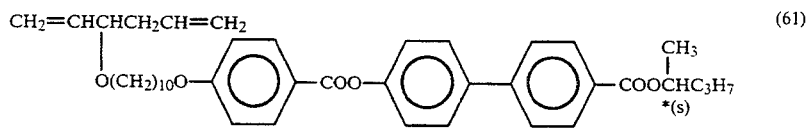

44.4 g of a diene compound (61) represented by the above formula was obtained in the same manner as in Example 15 with the exception that 40 g of the carboxylic acid derivative (22) obtained in Example 5-[3] and 30.5 g of optically active 1-methylbutyl 4'-hydroxybiphenyl-4-carboxylate were used.

The diene compound exhibited liquid crystal properties and the following phase transition behavior and properties. The results of elementary analysis are shown below.

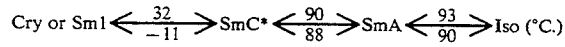

Response time: 41 μs (68° C.)
Tilt angle (2θ): 74° (68° C.)

|  | C (%) | H (%) | O (%) |
|---|---|---|---|
| calculated values | 76.83 | 8.19 | 14.98 |
| found values | 76.8 | 8.2 | 15.0 |

Polyaddition reaction
A copolymer comprising

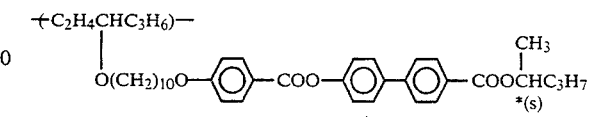

and

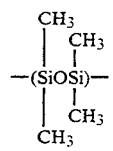

44.4 g of the diene compound (60) and 6.2 g of 1,1,3,3-tetramethyldisiloxane were dissolved in 330 ml of toluene, and were allowed to react in a stream of gaseous argon for 8 hours at 80° C. in the presence of 5 mg of chloroplatinic acid hexahydrate that was added thereto as a catalyst.

Figure 16:
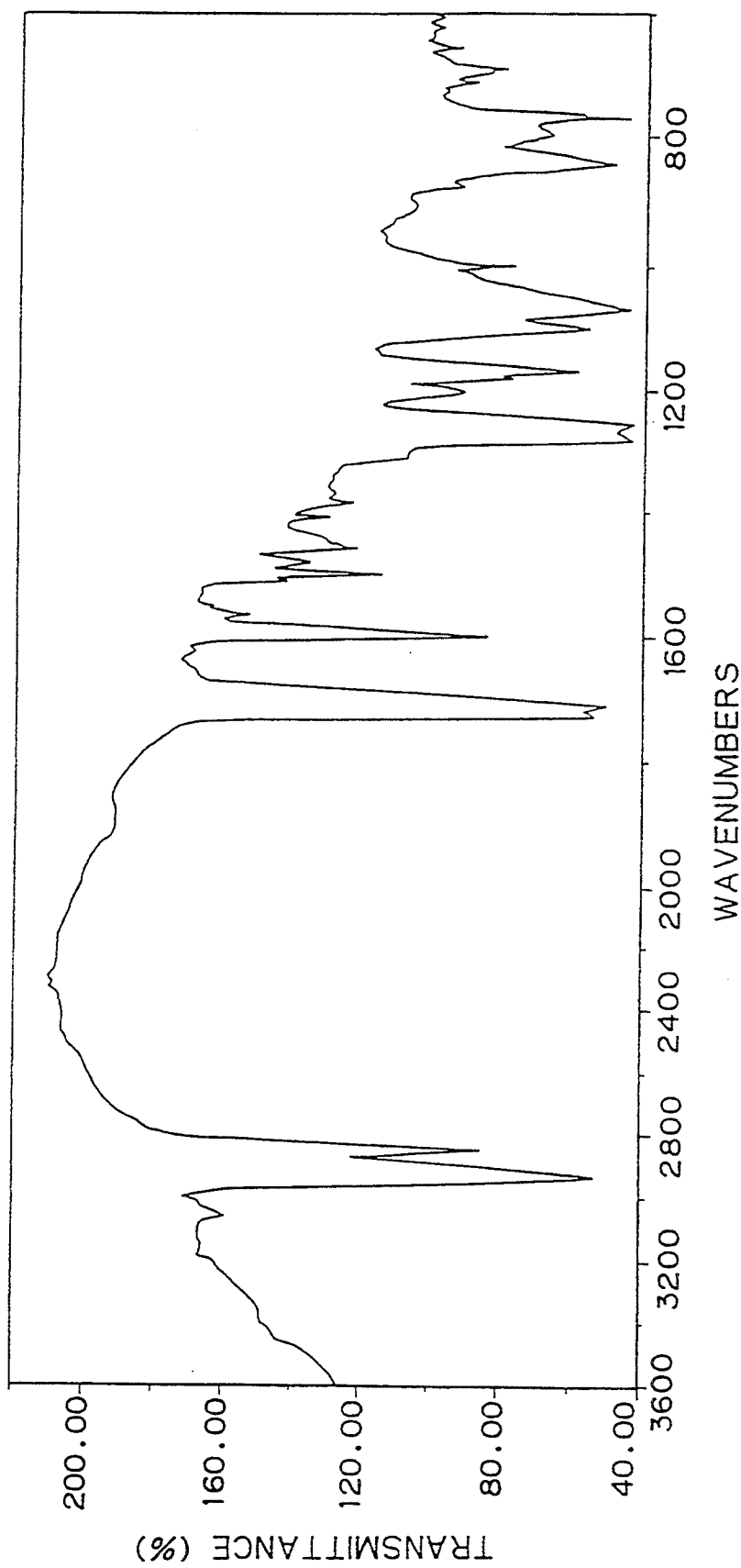

The same treatments and purification procedure as those of Example 15 were carried out to obtain 36.5 g of the objective liquid-crystalline copolymer. The molecular weight, phase transition temperatures and response time of the obtained copolymer are as follows. IR spectrum of the obtained copolymer is shown in FIG. 16.

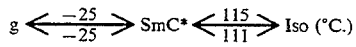

Response time: 0.4 ms (91° C.) 0.9 ms (71° C.) 3.2 ms (51° C.)
Mn=2400

EXAMPLE 17

Synthesis of

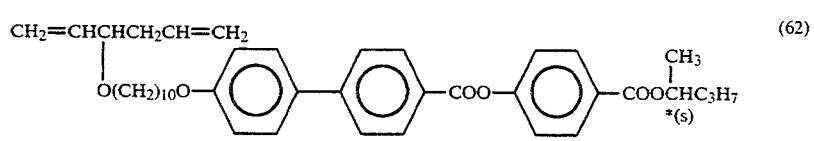

7.1 g (15.8 mmol) of a carboxylic acid derivative (63) represented by the following formula,

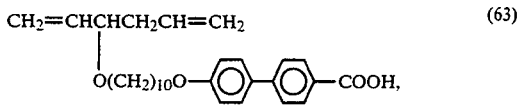 (63)

8 ml of thionyl chloride, 0.5 ml of pyridine and 50 ml of methylene chloride were placed in a flask equipped with a reflux condenser, and stirring and heating were continued for four hours.

The solvent and other removable matters were removed out from the reaction mixture by using an aspirator under reduced pressure at 65° C. The reaction mixture was then cooled to room temperature, and 50 ml of toluene was added thereto. To the mixture were added 3.56 g (17.1 mmol) of (S)-1-methylbutyl 4-hydroxybenzoate, 1.54 g (19.5 mmol) of pyridine and 50 ml of toluene, and stirring was carried out for 16 hours at room temperature.

Subsequently, after solid matters were removed out and the solvent was distilled out under reduced pressure, the residue was purified by silica gel column chromatography to obtain 6.78 g (10.6 mmol, yield: 67%) of the objective diene compound (62).

Polyaddition reaction
A copolymer comprising

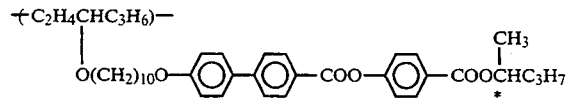

and

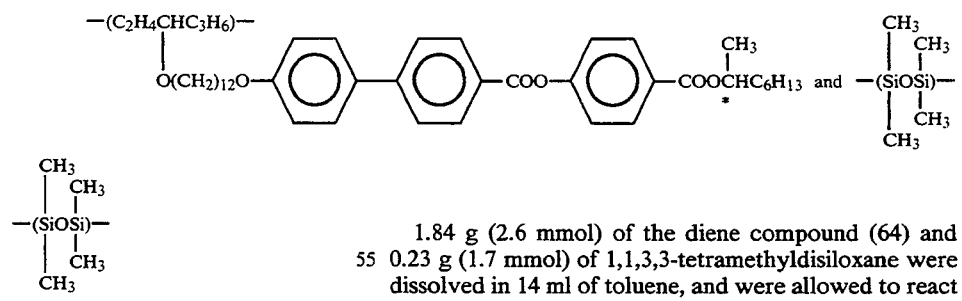

3 g (4.7 mmol) of the diene compound (62) and 0.42 g (3.1 mmol) of 1,1,3,3-tetramethyldisiloxane were dissolved in 20 ml of toluene, and were allowed to react in a stream of gaseous argon for 8 hours at 80° C. in the presence of 3 mg (0.0058 mmol) of chloroplatinic acid hexahydrate that was added thereto as a catalyst in a stream of gaseous argon.

Figure 17:
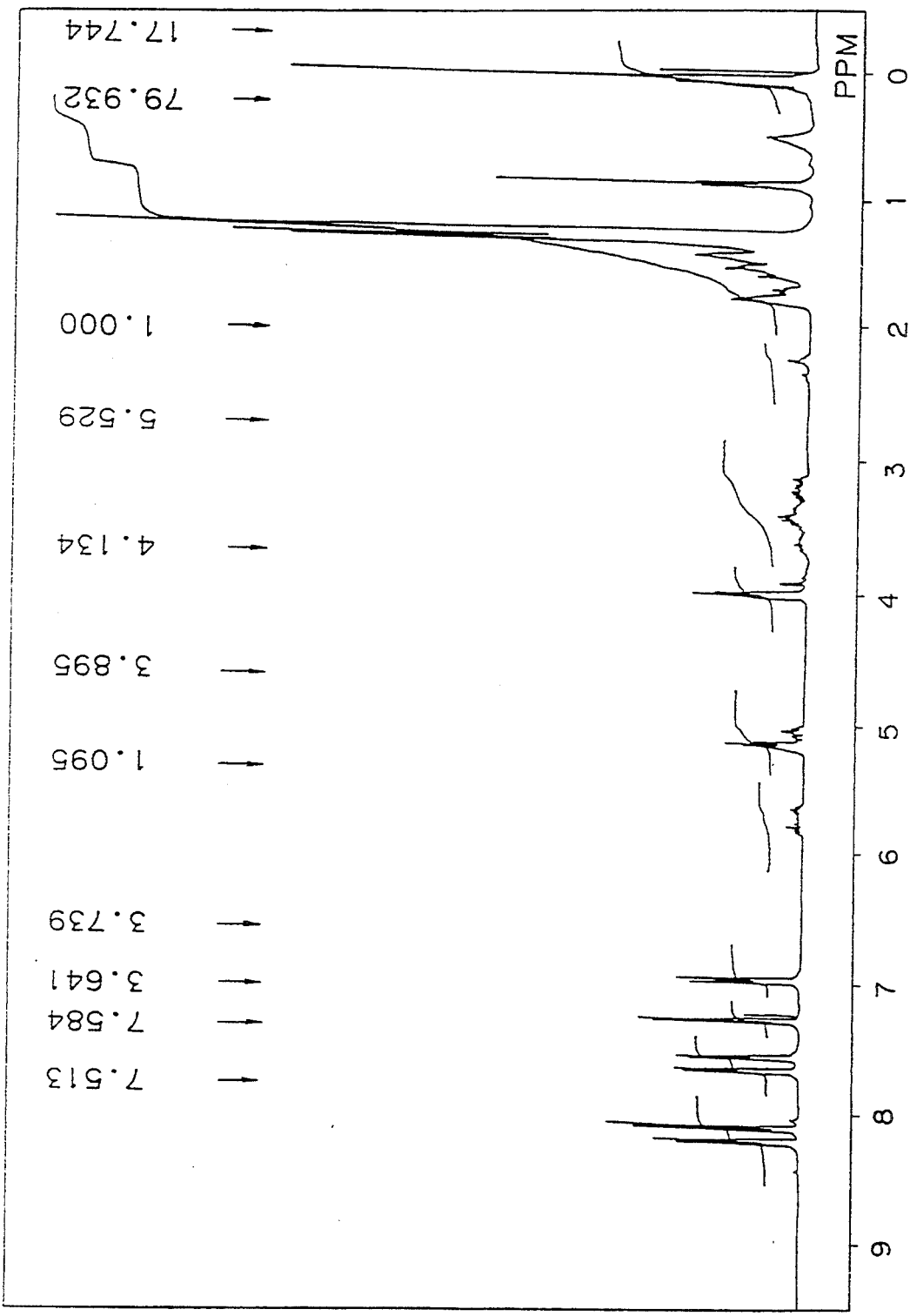
FIGS. 17 and 18 are charts showing $^1$H-NMR spectra of the copolymers obtained in Examples 17 and 18, respectively.

After completion of the reaction, toluene was distilled out from the reaction mixture under reduced pressure, and the residue was purified by silica gel column chromatography to obtain 2.9 g of the objective liquid-crystalline copolymer. The molecular weight, phase transition temperatures and response time of the obtained copolymer are as follows. $^1$H-NMR spectrum of the obtained copolymer is shown in FIG. 17.

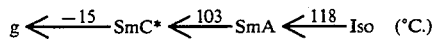

Response time: 3.17 ms (25° C.)
Mn = 1545
Mw = 2279
Mw/Mn = 1.48
Tilt angle $(2\theta) = 66°$ (25° C.)

EXAMPLE 18

Synthesis of

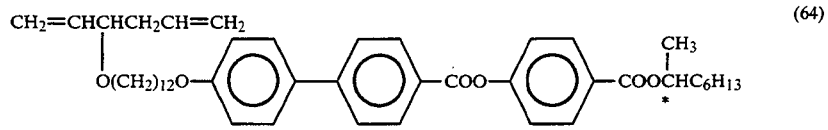 (64)

1.76 g (3.7 mmol) of the carboxylic acid derivative (27) obtained in Example 7-[2] and 8 ml of thionyl chloride were placed in a flask equipped with a reflux condenser, and heating and stirring were continued for 4.5 hours at 60° C. Subsequently, the excessive thionyl chloride was distilled out under reduced pressure by using an aspirator equipped with a trap of dry ice/methanol, and 10 ml of toluene was then added to the resulting reaction mixture cooled to room temperature. To the mixture were added 0.93 g (3.7 mmol) of optically active (S)-1-methylheptyl 4-hydroxybenzoate, 0.37 g (4.7 mmol) of pyridine and 10 ml of toluene, and stirring was carried out for 15 hours at room temperature to complete a reaction.

After solid matters in the reaction mixture were removed out and the solvent was distilled out under reduced pressure, the residue was purified by silica gel column chromatography to obtain 1.86 g (2.6 mmol, yield: 70%) of the objective diene compound (64).

Polyaddition reaction
A copolymer comprising 1.84 g (2.6 mmol) of the diene compound (64) and 0.23 g (1.7 mmol) of 1,1,3,3-tetramethyldisiloxane were dissolved in 14 ml of toluene, and were allowed to react in a stream of gaseous argon for 20 hours at 80° C. in the presence of 2 mg of chloroplatinic acid hexahydrate that was added thereto as a catalyst in a stream of gaseous argon.

Figure 18:
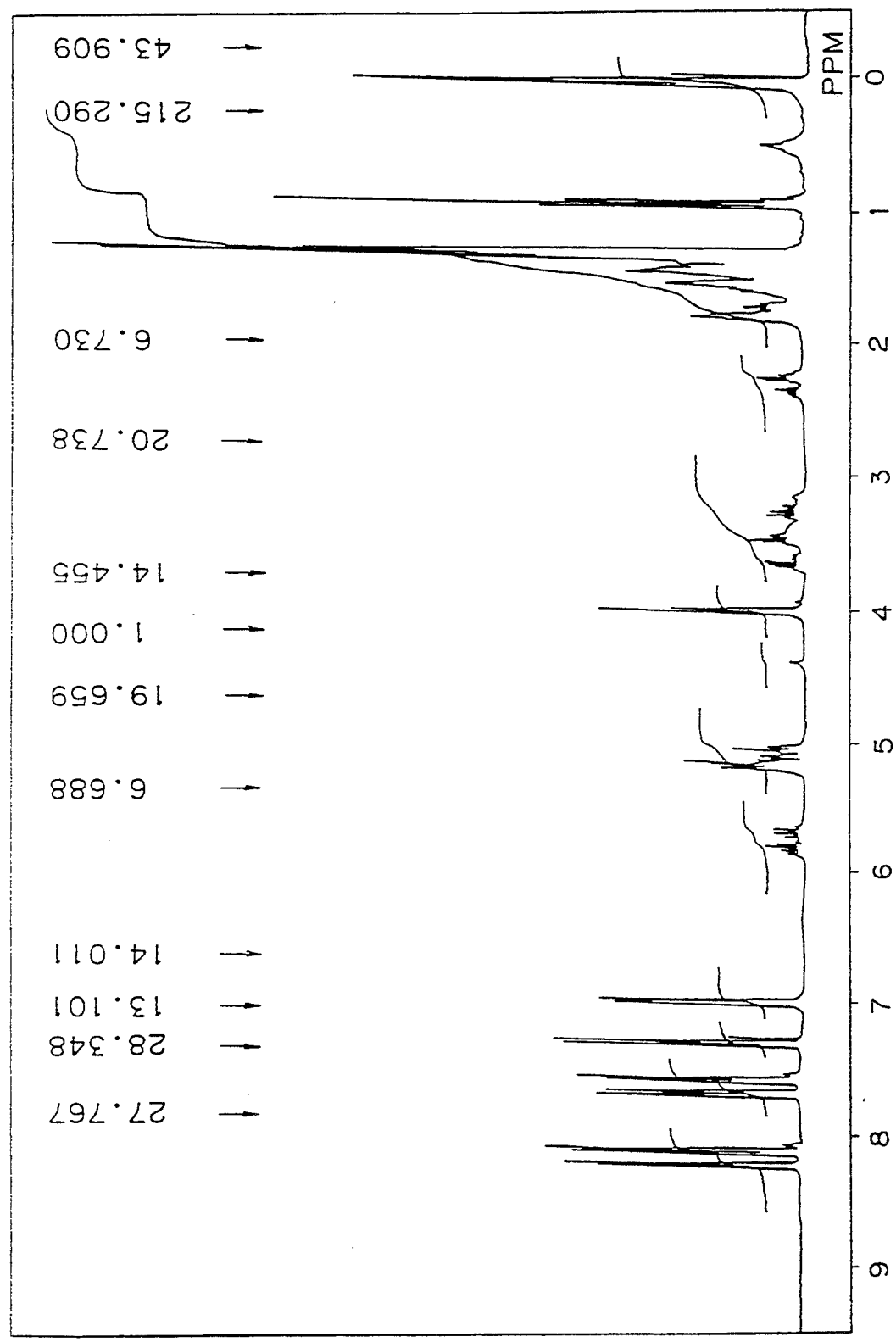

After completion of the reaction, toluene was distilled out from the reaction mixture under reduced pressure, and the residue was purified by silica gel column chromatography to obtain 1.7 g of the objective liquid-crystalline copolymer. The molecular weight, phase transition temperatures and response time of the obtained copolymer are as follows. $^1$H-NMR spectrum of the obtained copolymer is shown in FIG. 18.

$$g \xleftarrow{-15} SmC^* \xleftarrow{90} Iso \quad (°C.)$$

Response time: 6.8 ms (25° C.)
Mn=2243

Mw=3850
Mw/Mn=1.72
Tilt angle (2θ): 70° (25° C.)

The repeating units, phase transition temperatures, number average molecular weights and response times of the copolymers obtained in Examples 15 to 18 are summarized in Table 3.

TABLE 3

| | Repeating Unit | Phase transition temperature (°C.) | Number average molecular weight (Mn) | Response time (temperature °C.) |
|---|---|---|---|---|
| Example 15 | —(Z1)— —($C_2H_4CHCH_3H_6$)— —O($CH_2$)$_{10}$O—〇—〇—COO—〇—COOCH($CH_3$)$C_6H_{13}$ *(s) | Cry or SmI $\underset{4}{\overset{41}{\rightleftarrows}}$ SmC* $\underset{83}{\overset{91}{\rightleftarrows}}$ Iso | 2,800 | 2.0 ms (63° C.) 8.2 ms (43° C.) 43 ms (23° C.) |
| Example 16 | —(Z1)— —($C_2H_4CHCH_3H_6$)— —O($CH_2$)$_{10}$O—〇—〇—COO—〇—COOCH($CH_3$)$C_3H_7$ *(s) | g $\underset{-25}{\overset{-25}{\rightleftarrows}}$ SmC* $\underset{111}{\overset{115}{\rightleftarrows}}$ Iso | 2,400 | 0.4 ms (91° C.) 0.9 ms (71° C.) 3.2 ms (51° C.) |
| Example 17 | —(Z1)— —($C_2H_4CHCH_3H_6$)— —O($CH_2$)$_{10}$O—〇—〇—COO—〇—COO—〇—COOCH($CH_3$)$C_3H_7$ * | g $\overset{-15}{\longleftarrow}$ SmC* $\overset{103}{\longleftarrow}$ SmA $\overset{118}{\longleftarrow}$ Iso | 1,545 | 3.17 ms (25° C.) |
| Example 18 | —(Z1)— —($C_2H_4CHCH_3H_6$)— —O($CH_2$)$_{12}$O—〇—〇—COO—〇—COO—〇—COOCH($CH_3$)$C_6H_{13}$ * | g $\overset{-15}{\longleftarrow}$ SmC* $\overset{90}{\longleftarrow}$ Iso | 2,243 | 6.8 ms (25° C.) |

Z1: $CH_3$—Si($CH_3$)—O—Si($CH_3$)—$CH_3$

EXAMPLE 19

Synthesis of

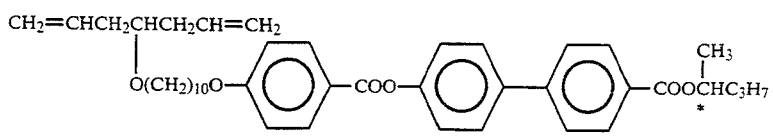

[1] Synthesis of

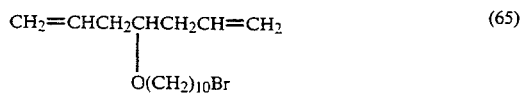 (65)

To a solution containing 0.18 mol of sodium hydride dissolved in 200 ml of THF were added dropwise 0.18 mol of 1,6-heptadien-4-ol and 0.25 mol of 1,10-dibromodecane, in this order, at room temperature with stirring. After reflux for 15 hours, the reaction solution was filtered and concentrated, and the concentrate was purified by silica gel column chromatography to obtain 48 mmol of the objective ether compound (65). (Yield: 27%)

[2] Synthesis of

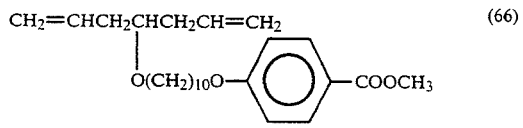 (66)

A solution containing 45 mmol of the ether compound (65) obtained in [1], 54 mmol of methyl 4-hydroxybenzoate and 160 mmol of potassium carbonate dissolved in 100 ml of 2-butanone was refluxed for 10 hours. After the reaction solution was filtered and concentrated, the concentrate was purified by silica gel column chromatography to obtain the objective ester compound (66). (Yield: 75%)

[3] Synthesis of

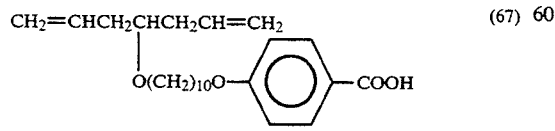 (67)

A mixture of 32 mmol of the ester compound (66) obtained in [2], 91 mmol of potassium hydroxide, 30 ml of methanol and 70 ml of water was refluxed for 6 hours. The reaction solution was added to 300 ml of water, and pH was adjusted to 1 by addition of concentrated hydrochloric acid. Solid matters deposited therein was collected by filtration, washed with water and dried at 30° C. under reduced pressure to obtain the objective compound (67). (Yield: 96%)

[4] Synthesis of

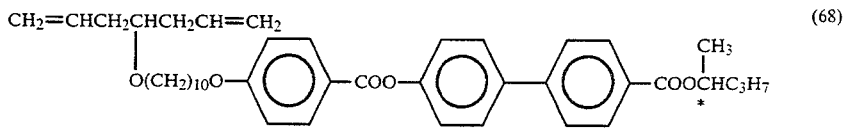 (68)

To 31 mmol of the compound (67) obtained in [3] was added 20 ml of thionyl chloride, and the mixture was stirred for three hours at 60° C. The excessive thionyl chloride was distilled out under reduced pressure to obtain an acid chloride. The acid chloride was dissolved in 50 ml of toluene, and to the obtained solution was added dropwise a solution containing 32 mmol of 1-methylbutyl 4'-hydroxybiphenyl-4-carboxylate and 39 mmol of pyridine dissolved in 100 ml of toluene, at room temperature, and stirring was carried out for 15 hours at room temperature. After solid matters were filtered out, the solvent was distilled out under reduced pressure. The residue was purified by silica gel column chromatography to obtain the objective diene compound (68). (Yield: 78%)

Figure 19:
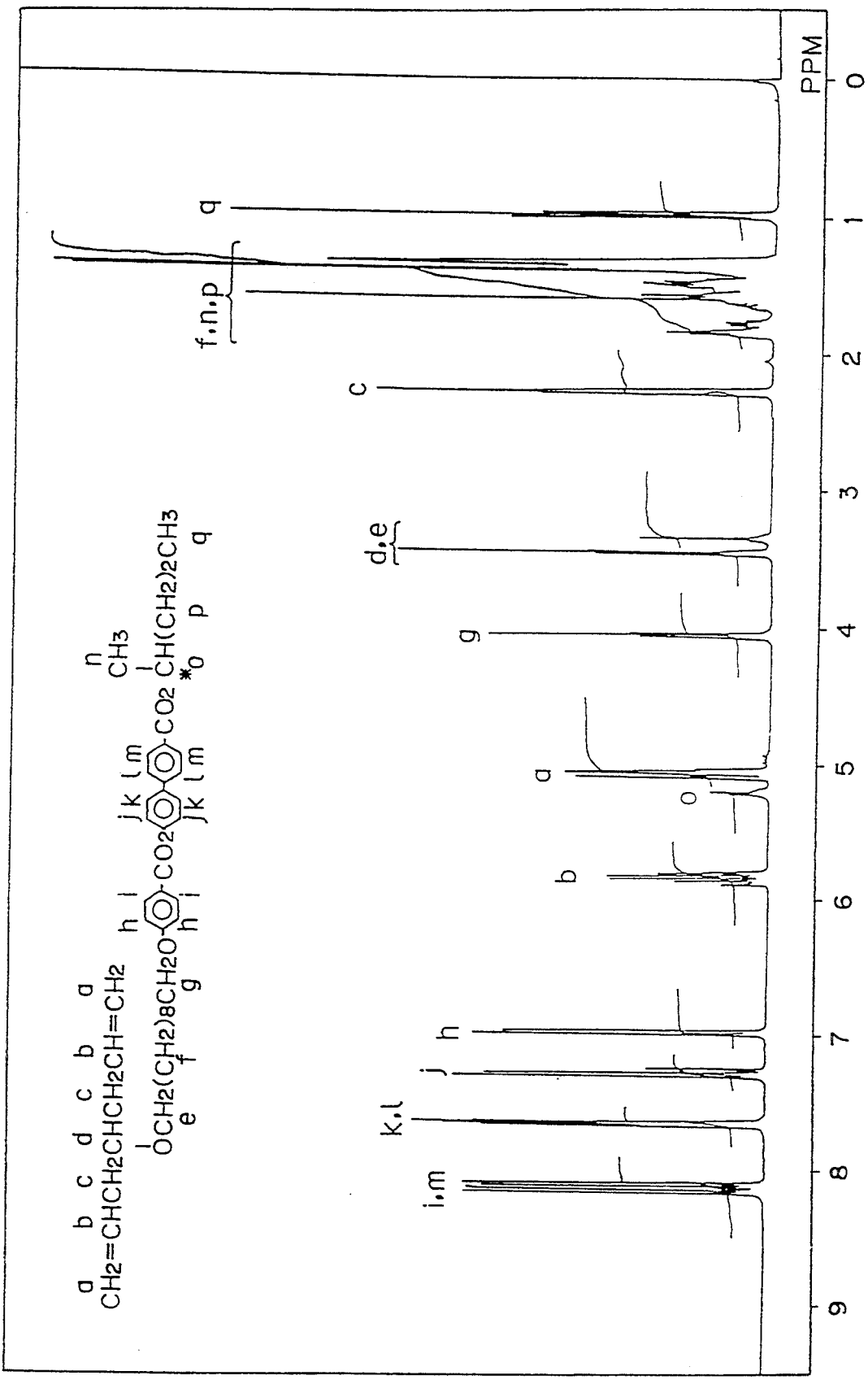
FIG. 19 is a chart showing $^1$H-NMR spectrum of the diene compound obtained in Example 19.

The diene compound exhibited liquid crystal properties and the following phase transition behavior and properties. $^1$H-NMR spectrum of the diene compound is shown in FIG. 19, and the results of elementary analysis in Table 4.

$$Cry \underset{8}{\overset{10}{\rightleftarrows}} SmC^* \underset{80}{\overset{82}{\rightleftarrows}} Iso \quad (°C.)$$

Response time: 10 μs (60° C.), 32 μs (40° C.), 98 μs (25° C.)

Tilt angle (2θ): 74° (25° C.)

Polyaddition reaction

A copolymer comprising

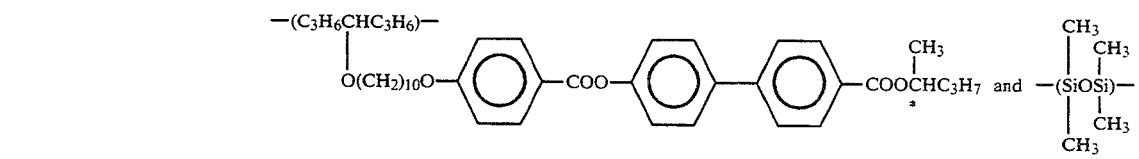 and 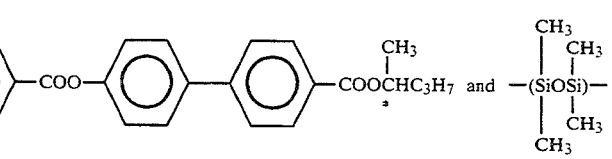

A solution containing 1.6 mmol of the diene compound (68) obtained in [4], 1.0 mmol of 1,1,3,3-tetramethyldisiloxane and 2 mg of hexachloroplatinic acid hexahydrate dissolved in 8 ml of toluene was stirred in an atmosphere of gaseous argon for 8 hours at 85° C. The reaction solution was concentrated and was then purified by silica gel column chromatography to obtain the objective copolymer. (Conversion rate: 84%)

Figure 20:
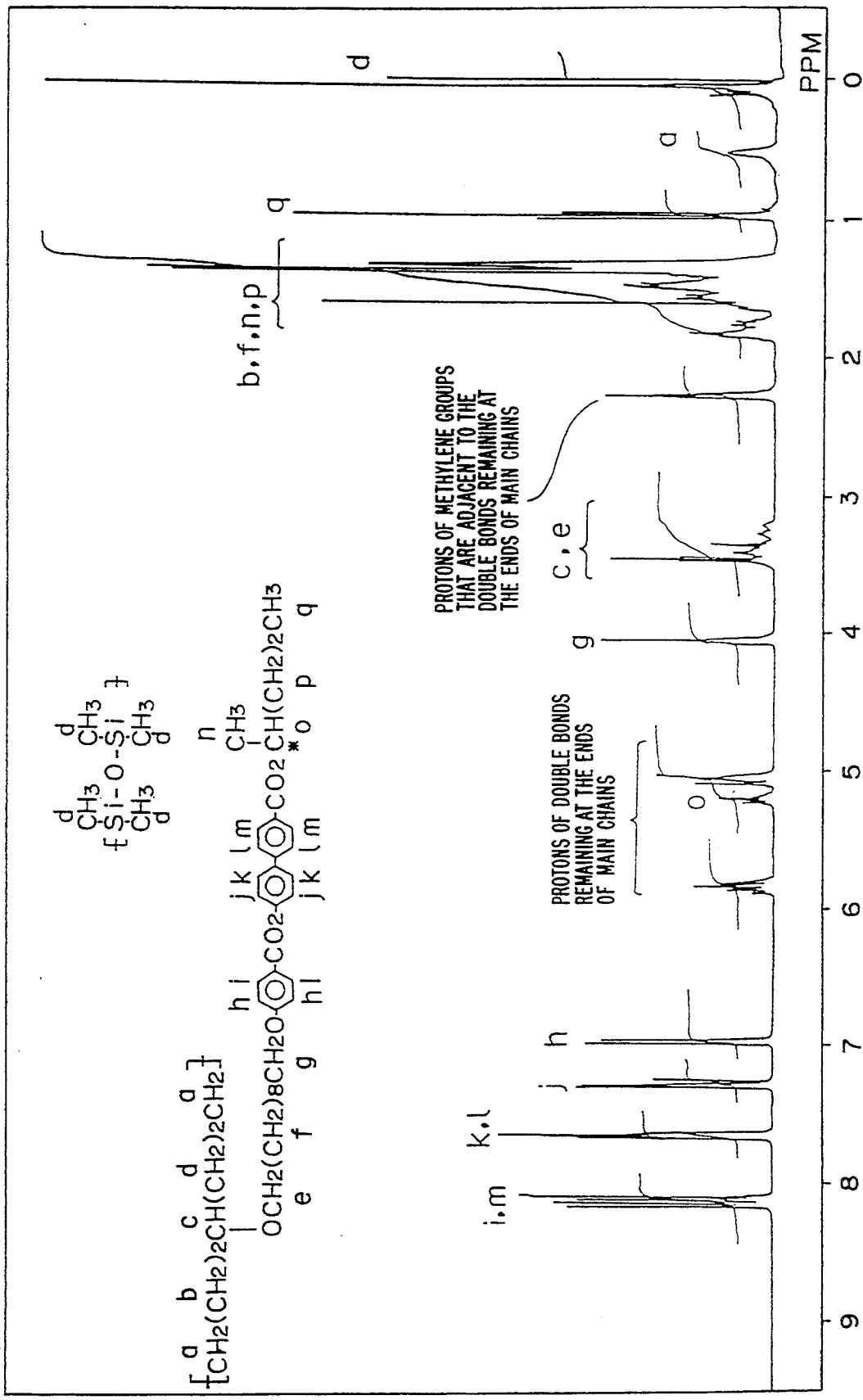
FIG. 20 is a chart showing $^1$H-NMR spectrum of the copolymer obtained in Example 19.

The molecular weight, phase transition temperatures and response time of the obtained copolymer are shown in Table 5, and ¹H-NMR spectrum of the copolymer is shown in FIG. 20.

EXAMPLE 20

A copolymer comprising

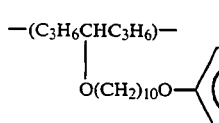

A solution containing 1.6 mmol of the diene compound (68) obtained in Example 19-[4], 1.1 mmol of 1,1,3,3,5,5-hexamethyltrisiloxane and 2 mg of hexachloroplatinic acid hexahydrate dissolved in 8 ml of toluene was stirred in an atmosphere of gaseous argon for 8 hours at 85° C. The reaction solution was concentrated and was then purified by silica gel column chromatography to obtain the objective copolymer. (Conversion rate: 80%)

Figure 21:
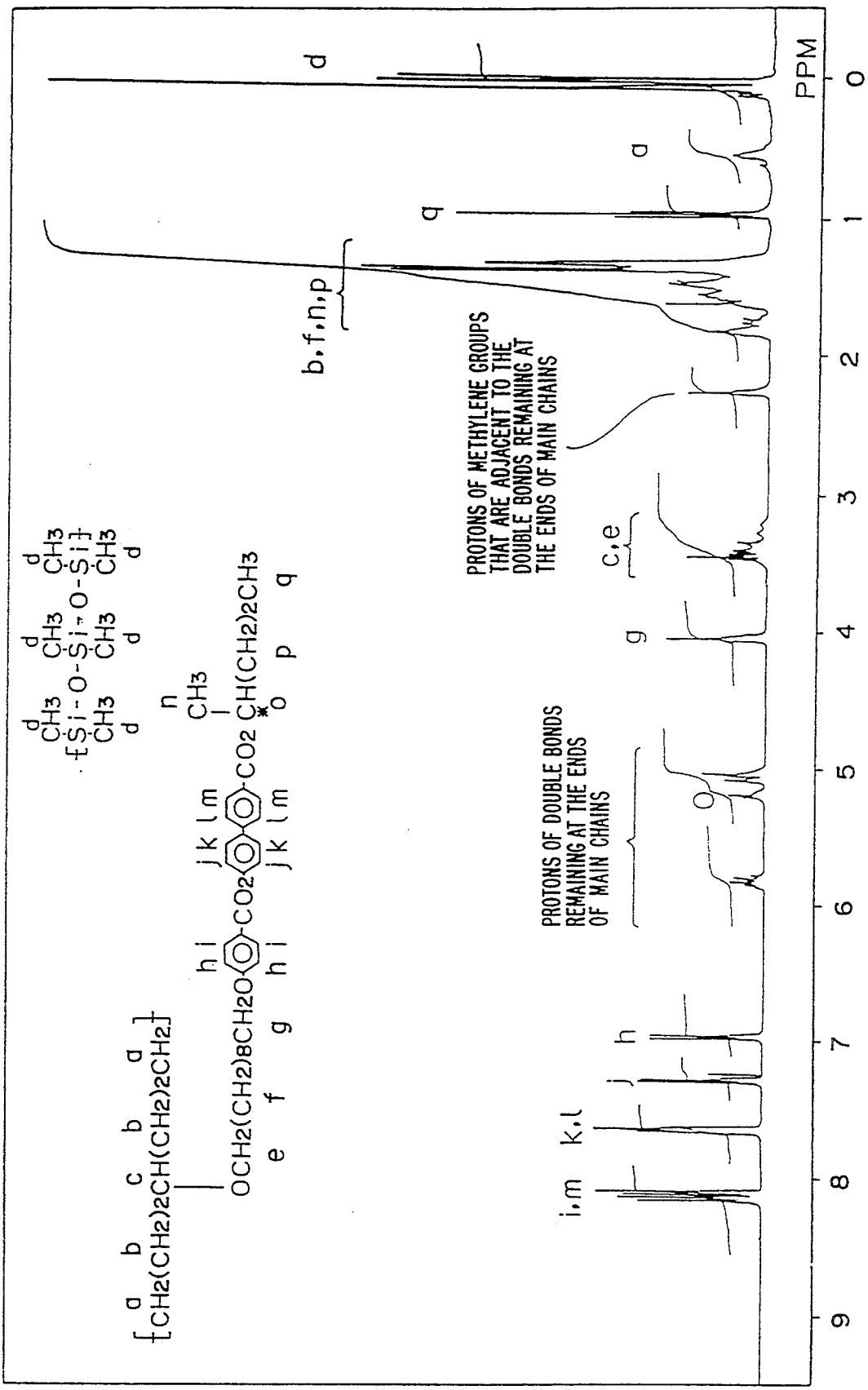
FIG. 21 is a chart showing $^1$H-NMR spectrum of the copolymer obtained in Example 20.

The molecular weight, phase transition temperatures and response time of the obtained copolymer are shown in Table 5, and ¹H-NMR spectrum of the copolymer is shown in FIG. 21.

EXAMPLE 21

A copolymer comprising

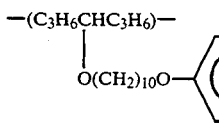

A solution containing 1.1 mmol of the diene compound (68) obtained in Example 19-[4], 0.7 mmol of 1,1,3,3,5,5,7,7-octamethyltetrasiloxane and 2 mg of hexachloroplatinic acid hexahydrate dissolved in 10 ml of toluene was stirred in an atmosphere of gaseous argon for 10 hours at 85° C. The reaction solution was concentrated and was then purified by silica gel column chromatography to obtain the objective copolymer. (Conversion rate: 78%)

Figure 22:
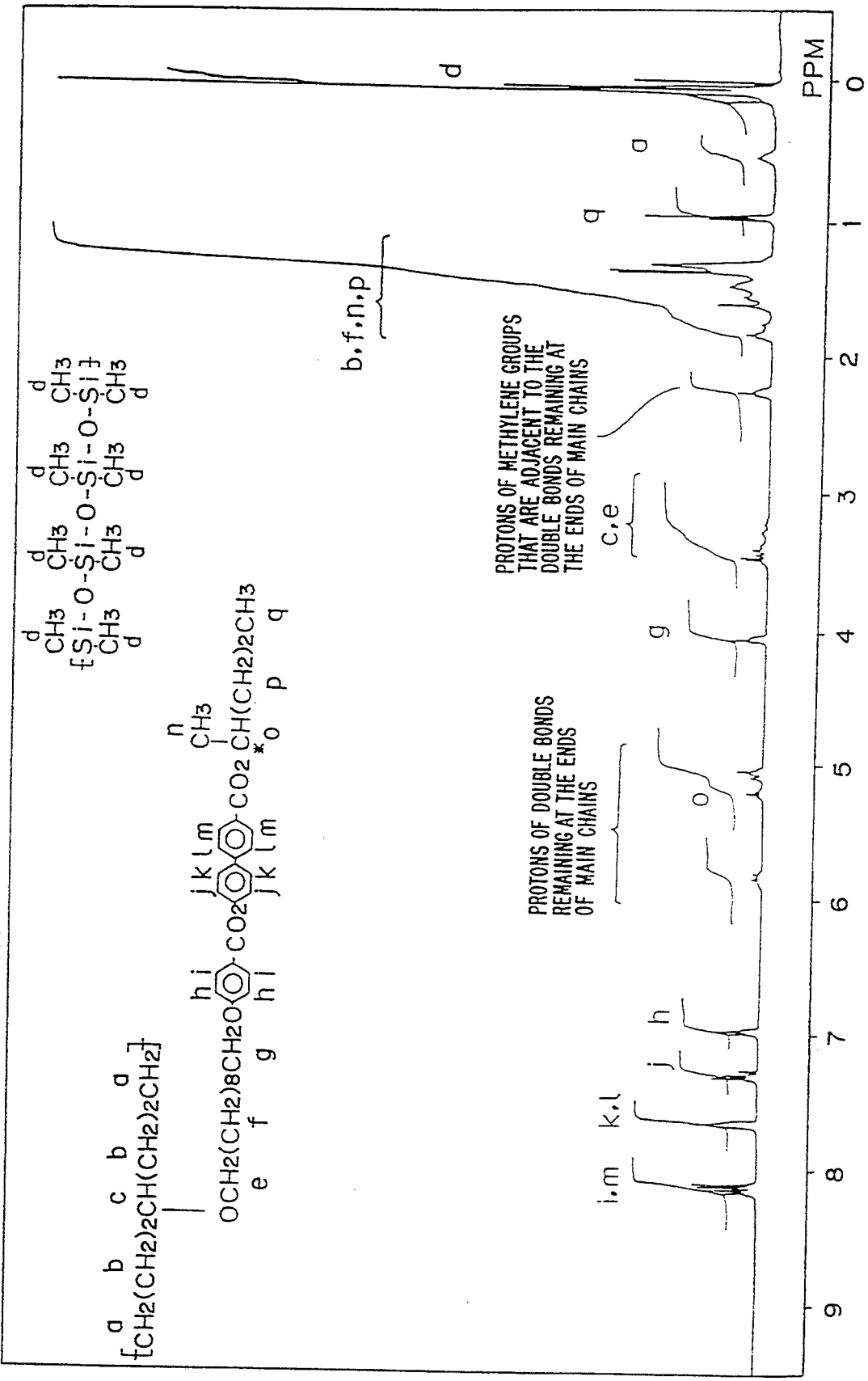
FIG. 22 is a chart showing $^1$H-NMR spectrum of the copolymer obtained in Example 21.

The molecular weight, phase transition temperatures and response time of the obtained copolymer are shown in Table 5, and ¹H-NMR spectrum of the copolymer is shown in FIG. 22.

EXAMPLE 22

Synthesis of

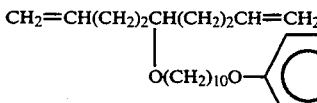

[1] Synthesis of

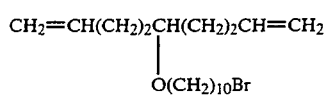

To a solution containing 52 mmol of sodium hydride dissolved in THF were added dropwise 47 mmol of 1,8-nonadiene-5-ol and 94 mmol of 1,10-dibromodecane, in this order, at room temperature with stirring. After reflux for 21 hours, the reaction solution was filtered and concentrated, and the concentrate was purified by silica gel column chromatography to obtain 15 mmol of the objective ether compound (69). (Yield: 32%)

[2] Synthesis of

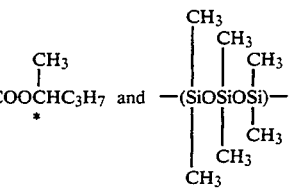

A solution containing 8.3 mmol of the ether compound (60) obtained in [1], 10 mmol of methyl 4-hydroxybenzoate and 30 mmol of potassium carbonate dissolved in 50 ml of 2-butanone was refluxed for 10 hours. After the reaction solution was filtered and concentrated, the concentrate was purified by silica gel column chromatography to obtain the objective ester compound (70). (Yield: 65%)

[3] Synthesis of

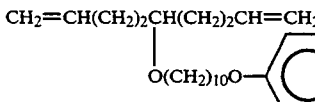

A mixture containing 5.4 mmol of the ester compound (70) obtained in [2], 16 mmol of potassium hydroxide, 6 ml of methanol and 14 ml of water was refluxed for 5 hours. The reaction solution was added to 100 ml of water, and the mixture was then adjusted to pH 1 by addition of concentrated hydrochloric acid. A matter deposited in a state of wax was washed with water and was then dried under reduced pressure at 30° C. to obtain the objective compound (71). (Yield: 95%)

[4] Synthesis of

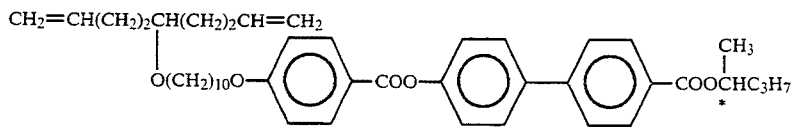

To 5.1 mmol of the compound (71) obtained in [3] was added 5 ml of thionyl chloride, and stirring was carried out for four hours at 60° C. The excessive thionyl chloride was distilled out under reduced pressure to obtain an acid chloride. The acid chloride was dissolved in 5 ml of toluene, and to the solution was added dropwise a solution containing 5.5 mmol of 1-methylbutyl 4'-hydroxybiphenyl-4-carboxylate and 6.4 mmol of pyridine dissolved in 20 ml of toluene, and stirring was then carried out for 18 hours at room temperature. After solid matters were filtered out, the solvent was distilled out under reduced pressure. The residue was purified by alumina column chromatography and silica gel column chromatography, in this order, to obtain the objective diene compound (72). (Yield: 61%)

Figure 23:
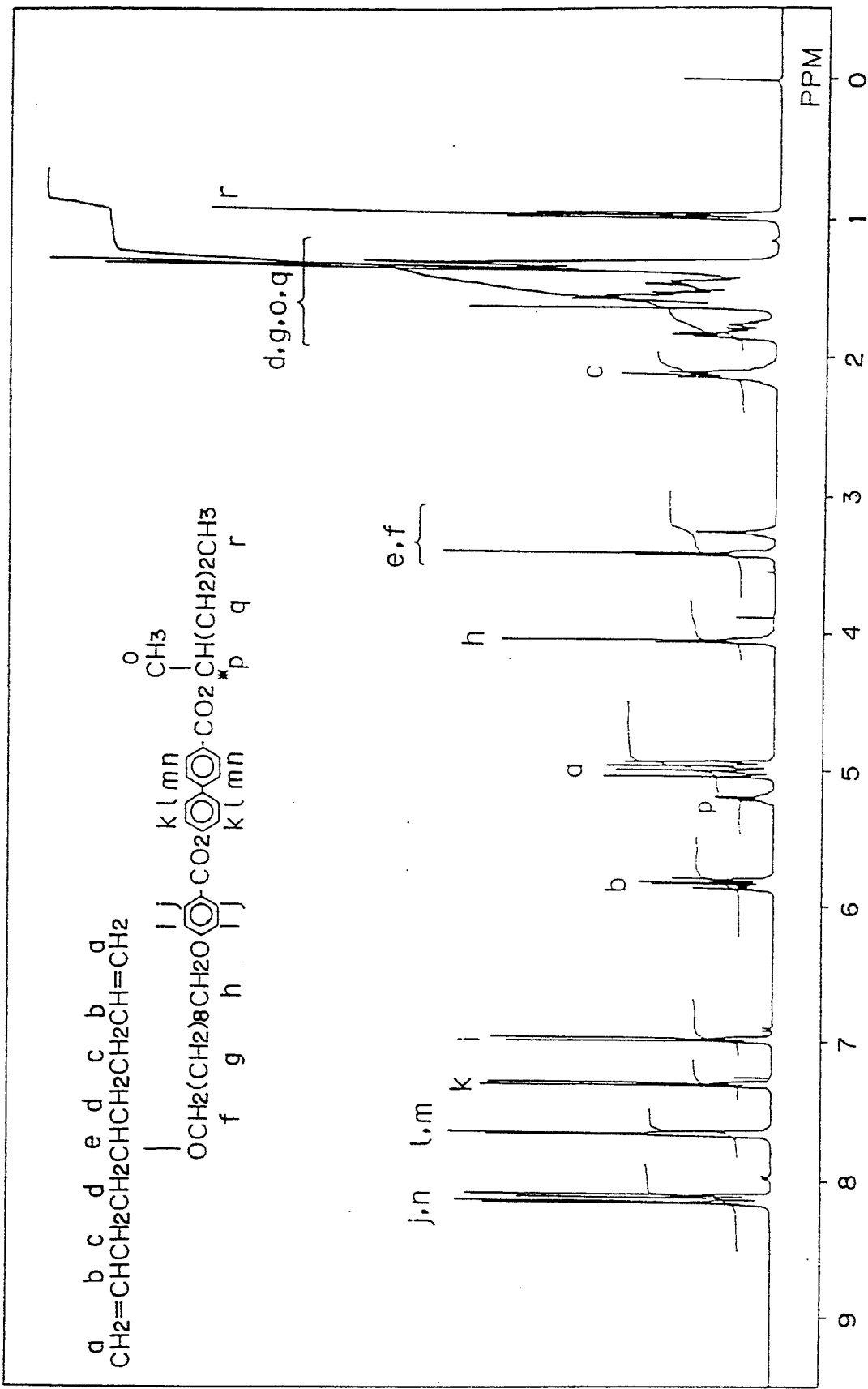
FIG. 23 is a chart showing $^1$H-NMR spectrum of the diene compound obtained in Example 22.

The diene compound exhibited liquid crystal properties and the following phase transition behavior and properties. ¹H-NMR spectrum of the diene compound is shown in FIG. 23, and the results of elementary analysis in Table 4.

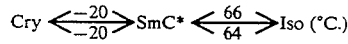

Response time: 6.9 μs (60° C.), 19 μs (40° C.), 56 μs (25° C.)

Tilt angle (2θ): 74° (25° C.)

Polyaddition reaction

A copolymer comprising

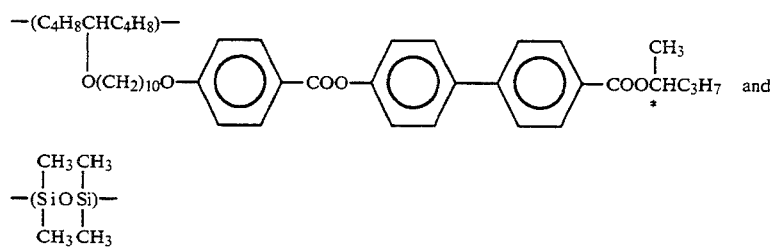

A solution containing 0.9 mmol of the diene compound (72) obtained in [4], 0.6 mmol of 1,1,3,3-tetramethyldisiloxane and 1 mg of hexachloroplatinic acid hexahydrate dissolved in 6 ml of toluene was stirred in an atmosphere of gaseous argon for 10 hours at 85° C. The reaction solution was concentrated and was then purified by silica gel column chromatography to obtain the objective copolymer. (Conversion rate: 64%)

Figure 24:
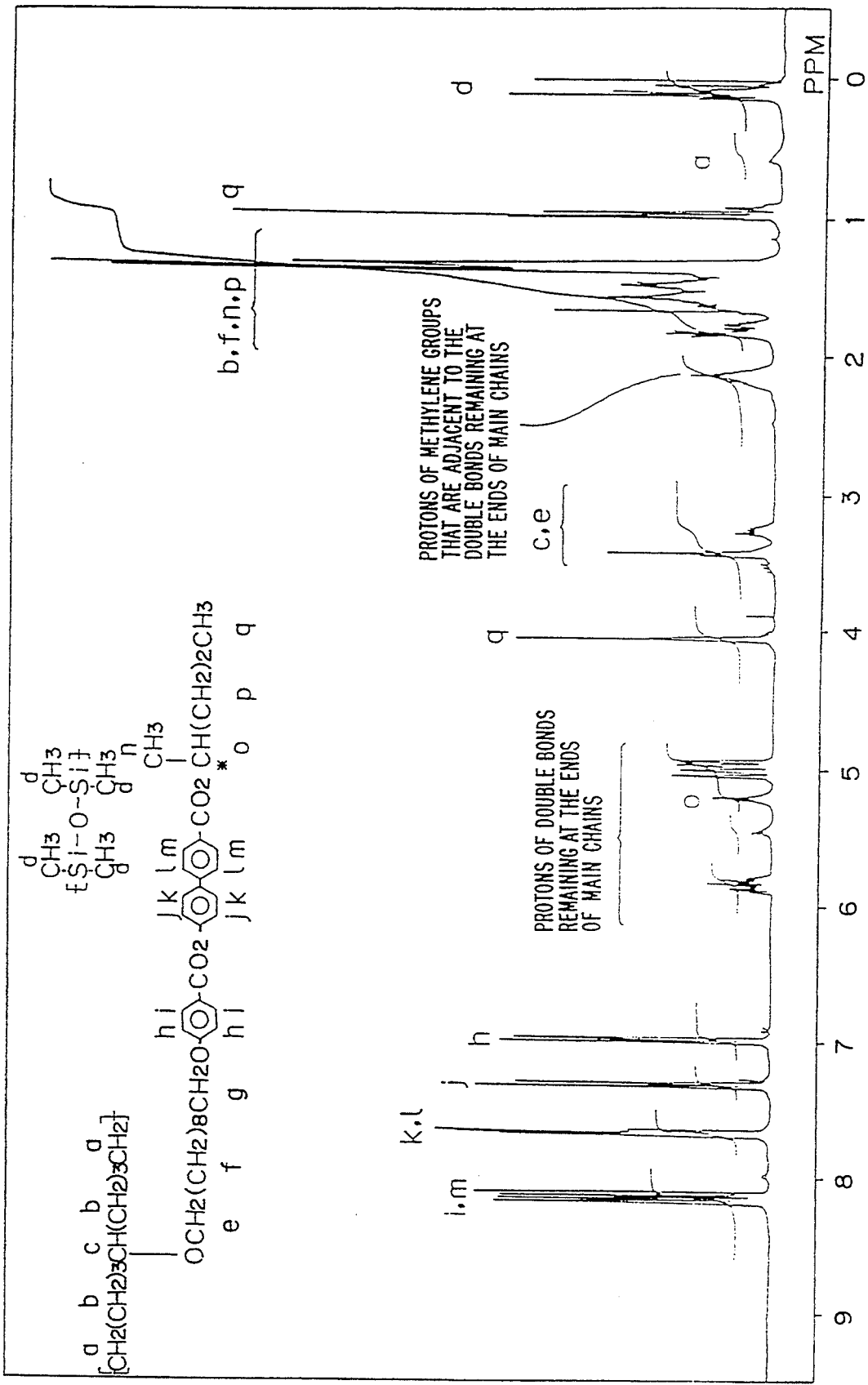
FIG. 24 is a chart showing $^1$H-NMR spectrum of the copolymer obtained in Example 22.

The molecular weight, phase transition temperatures and response time of the obtained copolymer are shown in Table 5, and ¹H-NMR spectrum of the copolymer is shown in FIG. 24.

EXAMPLE 23

Synthesis of

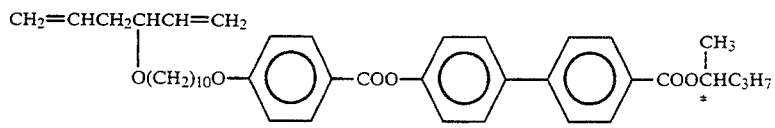

[1] Synthesis of $$CH_2=CHCH_2CHCH=CH_2 \atop | \atop O(CH_2)_{10}Br \qquad (73)$$

To a solution containing 0.18 mol of sodium hydride dissolved in 200 ml of THF were added dropwise 0.18 mol of 1,5-hexadien-3-ol and 0.36 mol of 1,10-dibromodecane, in this order at room temperature. After reflux for 15 hours, the reaction solution was filtered and concentrated, and the concentrate was purified by silica gel column chromatography to obtain 60 mmol of the objective ether compound (73). (Yield: 33%)

[2] Synthesis of

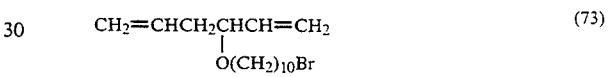

A solution containing 45 mmol of the ether compound (73) obtained in [1], 54 mmol of methyl 4-hydroxybenzoate and 160 mmol of potassium carbonate dissolved in 100 ml of 2-butanone was refluxed for 10 hours. After the reaction solution was filtered and concentrated, the concentrate was purified by silica gel column chromatography to obtain the objective ester compound (74). (Yield; 72%)

[3] Synthesis of

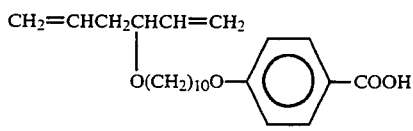 (75)

A mixture of 32 mmol of the ester compound (74) obtained in [2], 91 mmol of potassium hydroxide, 30 ml of methanol and 70 ml of water was refluxed for 6 hours. The reaction solution was added to 300 ml of water, and the mixture was adjusted to pH 1 by addition of concentrated hydrochloric acid. Solid matters deposited therein were collected by filtration, washed with water and dried at 30° C. under reduced pressure to obtain the objective compound (75). (Yield: 90%)

[4] Synthesis of

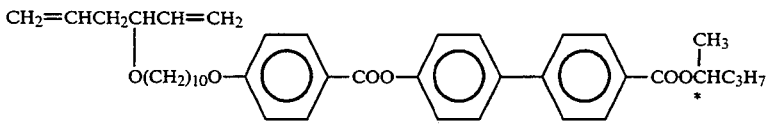

To 25 mmol of the compound (75) obtained in [3] was added 20 ml of thionyl chloride, and stirring was carried out for three hours at 80° C. The excessive thionyl chloride was distilled out under reduced pressure to obtain an acid chloride. The acid chloride was dissolved in 50 ml of toluene, and to the solution was added dropwise a solution containing 30 mmol of 1-methylbutyl 4'-hydroxybiphenyl-4-carboxylate and 35 mmol of pyridine dissolved in 100 ml of toluene, and the mixture was stirred for 15 hours at room temperature. After the solid matters deposited therein were filtered out, the solvent was distilled out under reduced pressure. The residue was purified by alumina column chromatography and silica gel column chromatography, in this order, to obtain the objective diene compound (76). (Yield: 76%)

Figure 25:
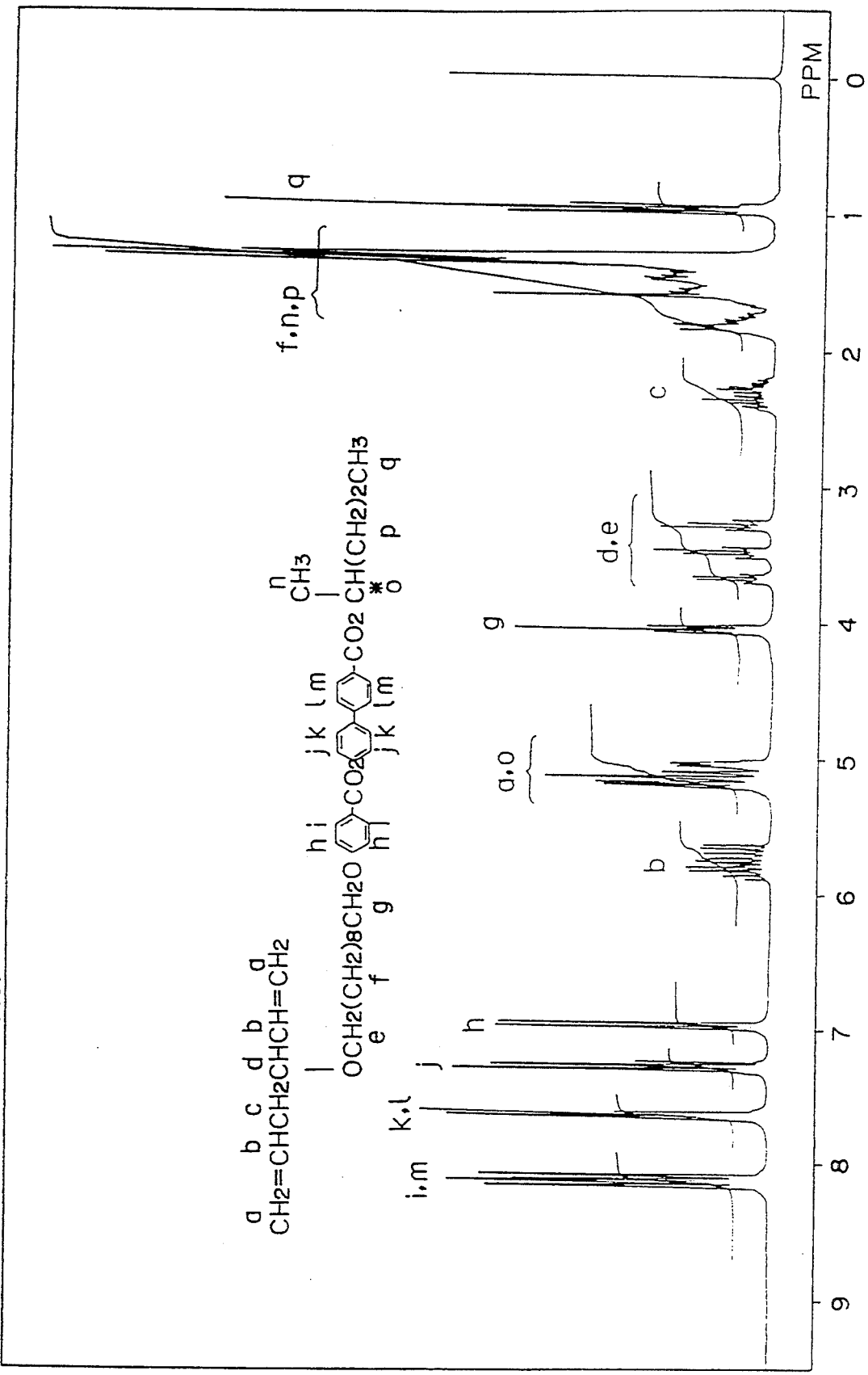
FIG. 25 is a chart showing $^1$H-NMR spectrum of the diene compound obtained in Example 23.

The diene compound exhibited liquid crystal properties and the following phase transition behavior and properties. $^1$H-NMR spectrum of the diene compound is shown in FIG. 25, and the results of elementary analysis in Table 4.

$$Cry \underset{-11}{\overset{32}{\rightleftarrows}} SmC^* \underset{88}{\overset{90}{\rightleftarrows}} SmA \underset{90}{\overset{93}{\rightleftarrows}} Iso \ (°C.)$$

Response time: 41 μs (68° C.)
Tilt angle (2θ): 74° (68° C.)
Polyaddition reaction
A copolymer comprising

A solution containing 1.6 mmol of the diene compound (76) obtained in [4], 1.0 mmol of 1,1,3,3,5,5-hexamethyltrisiloxane and 2 mg of hexachloroplatinic acid hexahydrate dissolved in 10 ml of toluene was stirred in an atmosphere of gaseous argon for 8 hours at 85° C. The reaction solution was concentrated and was then purified by silica gel column chromatography to obtain the objective copolymer. (Conversion rate: 82%)

Figure 26:
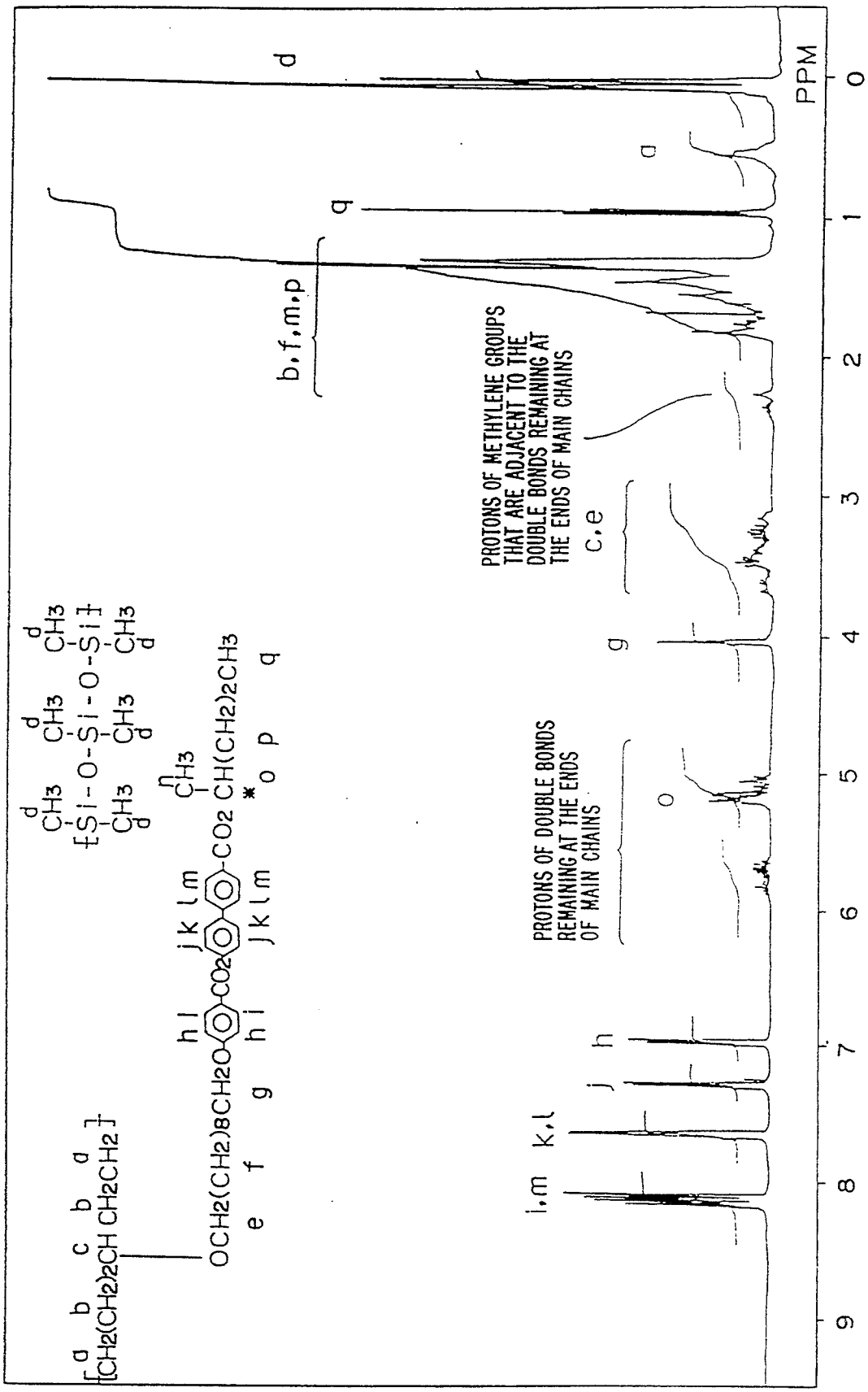
FIG. 26 is a chart showing $^1$H-NMR spectrum of the copolymer obtained in Example 23.

The molecular weight, phase transition temperatures and response time of the obtained copolymer are shown in Table 5, and $^1$H-NMR spectrum of the copolymer is shown in FIG. 26.

EXAMPLE 24

A copolymer comprising

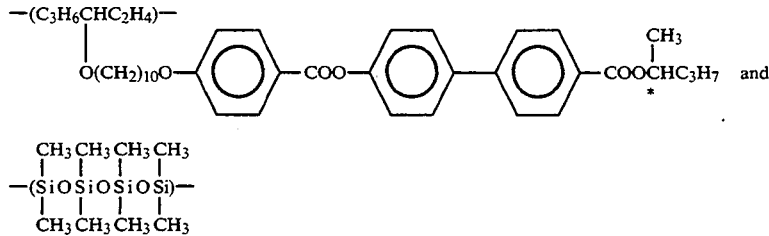

A solution containing 1.6 mmol of the diene compound (76) obtained in Example 23-[4], 1.1 mmol of 1,1,3,3,5,5,7,7-octamethyltetrasiloxane and 2 mg of hexachloroplatinic acid hexahydrate dissolved in 10 ml of toluene was stirred in an atmosphere of gaseous argon for 9 hours at 85° C. The reaction solution was concentrated and was then purified by silica gel column chromatography to obtain the objective copolymer. (Conversion rate: 86%)

Figure 27:
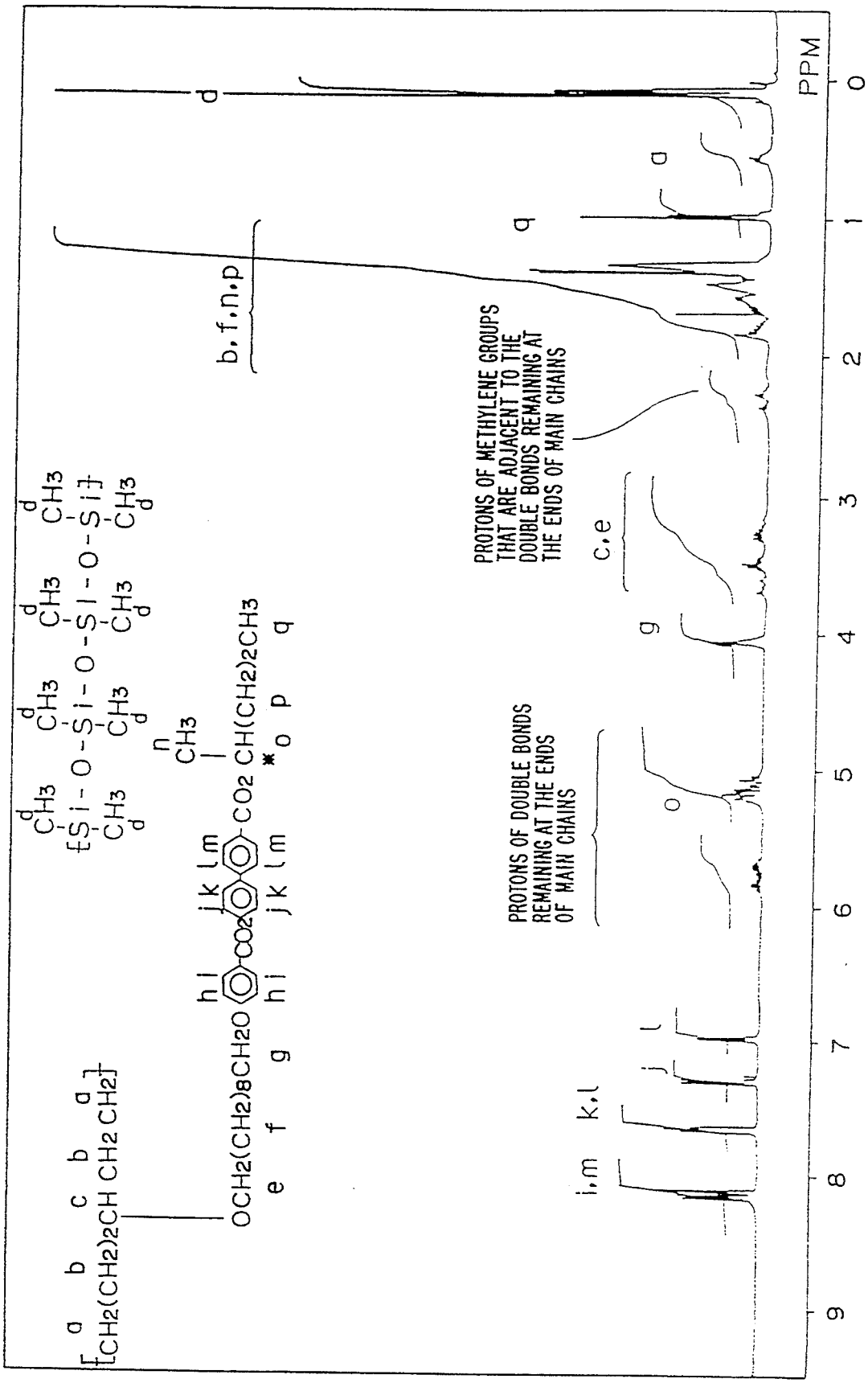
FIG. 27 is a chart showing $^1$H-NMR spectrum of the copolymer obtained in Example 24.

The molecular weight, phase transition temperatures and response time of the obtained copolymer are shown in Table 5, and ¹H-NMR spectrum of the copolymer is shown in FIG. 27.

EXAMPLE 25

Synthesis of

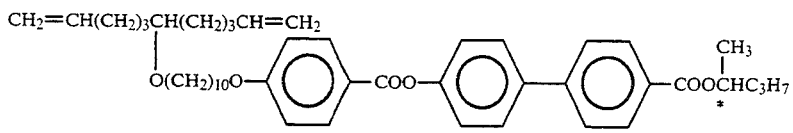

[1] Synthesis of

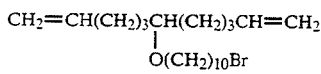 (77)

To a solution containing 55 mmol of sodium hydride dissolved in 50 ml of THF were added dropwise 50 mmol of 1,10-undecadien-6-ol and 100 mmol of 1,10-dibromodecane, in this order at room temperature with stirring. After reflux for 12 hours, the reaction solution was filtered and concentrated, and the concentrate was purified by silica gel column chromatography to obtain 15 mmol of the objective ether compound (77). (Yield: 30%)

[2] Synthesis of

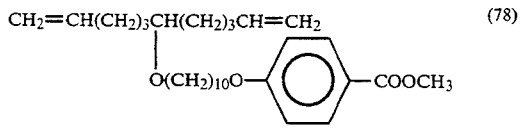 (78)

A solution containing 15 mmol of the ether compound (77) obtained in [1], 17 mmol of methyl 4-hydroxybenzoate and 20 mmol of potassium carbonate dissolved in 50 ml of 2-butanone was refluxed for 15 hours. After the reaction solution was filtered and concentrated, the concentrate was purified by silica gel column chromatography to obtain the objective ester compound (78). (Yield: 78%)

[3] Synthesis of (79)

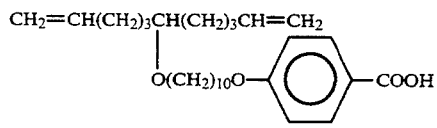

A mixture of 11 mmol of the ester compound (78) obtained in [2], 30 mmol of potassium hydroxide, 6 ml of methanol and 14 ml of water was refluxed for 5 hours. The reaction solution was added to 100 ml of water, and the mixture was adjusted to pH 1 by addition of concentrated hydrochloric acid. The obtained mixture was extracted twice with 50 ml of ether. Two ether layers each obtained by the extraction was combined together and dried over magnesium sulfate. The solvent was then distilled out under reduced pressure to obtain the objective compound (79). (Yield: 61%)

[4] Synthesis of

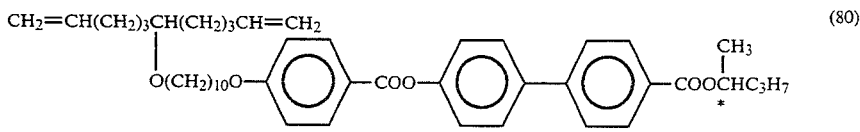

To 0.7 mmol of the compound (79) obtained in [3] was added 5 ml of thionyl chloride, and stirring was carried out for two hours at 80° C. The excessive thionyl chloride was distilled out under reduced pressure to obtain an acid chloride. The acid chloride was dissolved in 10 ml of toluene, and to the solution was added dropwise a solution containing 7 mmol of 1-methylbutyl 4'-hydroxybiphenyl-4-carboxylate and 10 mmol of pyridine dissolved in 20 ml of toluene, and the mixture was stirred for 18 hours at room temperature. After solid matters deposited therein was filtered out, the solvent was distilled out under reduced pressure. The residue was purified by alumina column chromatography and silica gel column chromatography, in this order, to obtain the objective diene compound (80). (Yield: 65%)

Figure 28:
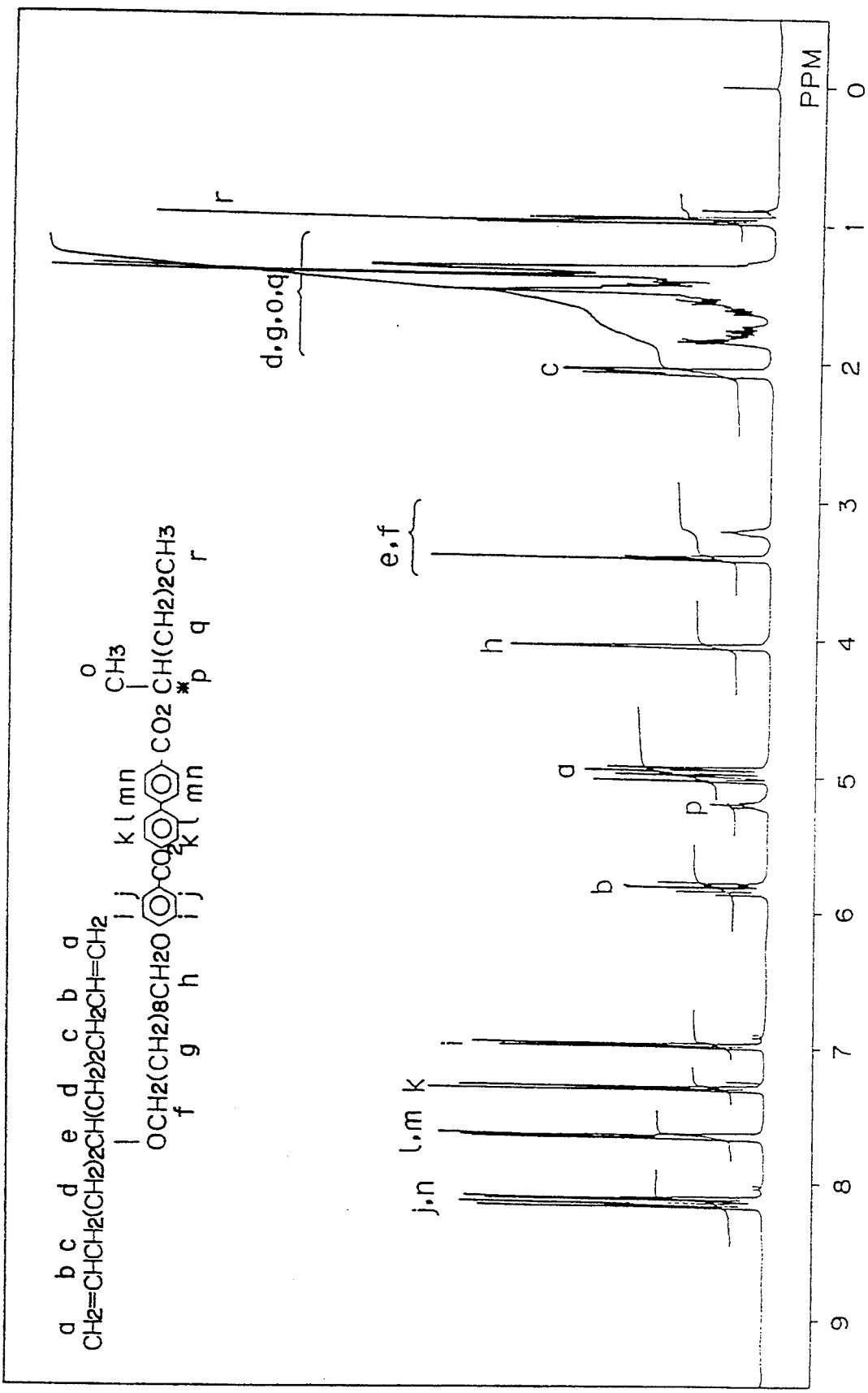
FIG. 28 is a chart showing $^1$H-NMR spectrum of the diene compound obtained in Example 25.

The diene compound exhibited liquid crystal properties and the following phase transition behavior and properties. ¹H-NMR spectrum of the diene compound is shown in FIG. 28, and the results of elementary analysis in Table 4.

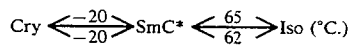

Response time: 17 μs (60° C.), 44 μs (40° C.), 124 μs (25° C.)

Tilt angle (2θ): 81° (25° C.)

Polyaddition reaction

A copolymer comprising

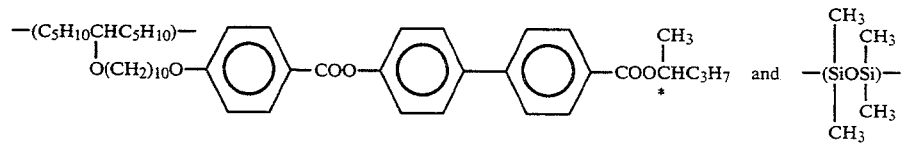

A solution containing 0.9 mmol of the diene compound (80) obtained in [4], 0.6 mmol of 1,1,3,3-tetramethyldisiloxane and 1 mg of hexachloroplatinic acid hexahydrate dissolved in 15 ml of toluene was stirred in an atmosphere of gaseous argon for 8 hours at 85° C. The reaction solution was concentrated and was then purified by silica gel column chromatography to obtain the objective copolymer. (Conversion rate: 65%)

Figure 29:
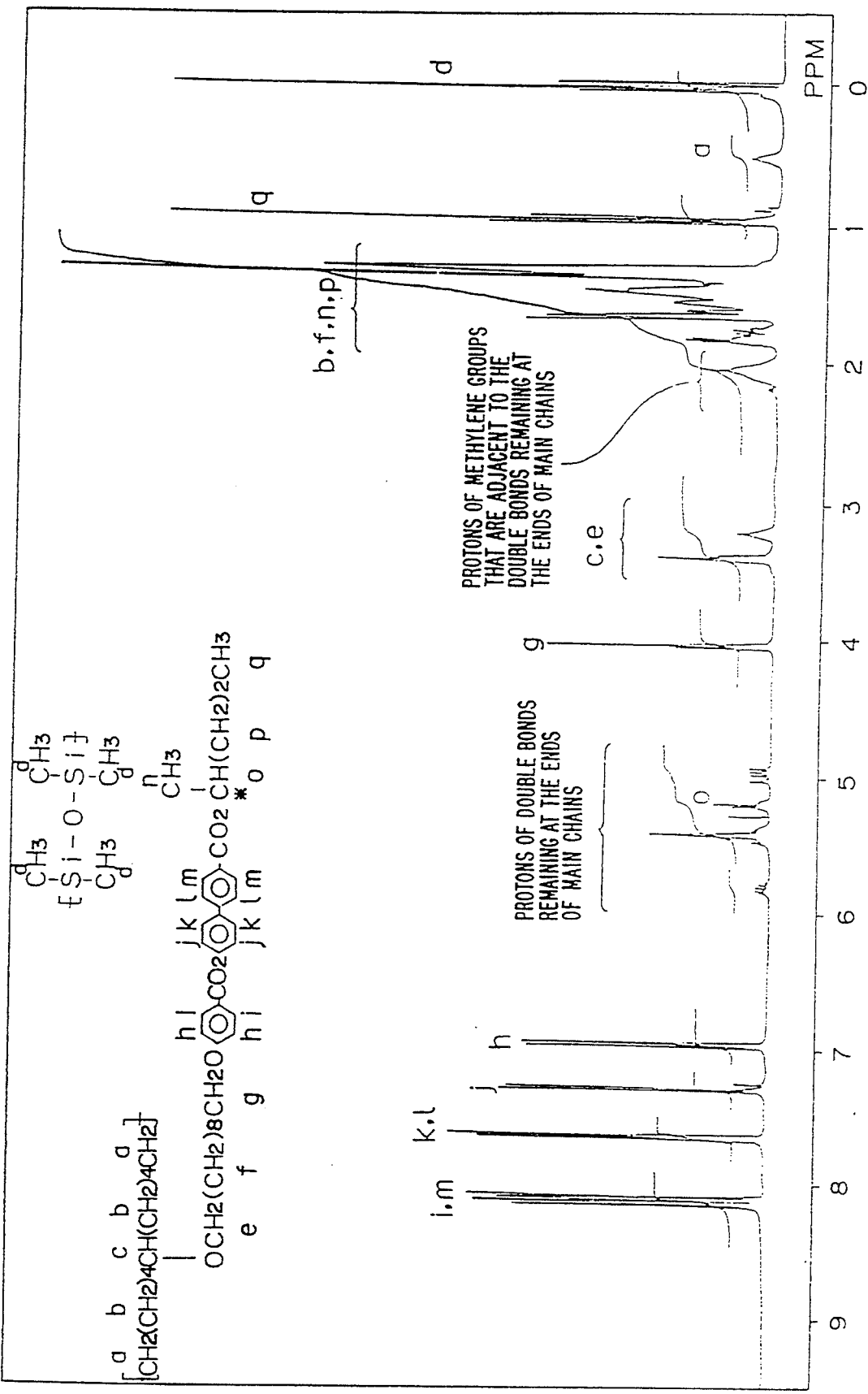
FIG. 29 is a chart showing $^1$H-NMR spectrum of the copolymer obtained in Example 25.

The molecular weight, phase transition temperatures and response time of the obtained copolymer are shown in Table 5, and $^1$H-NMR spectrum of the copolymer is shown in FIG. 29.

TABLE 4

| RESULTS OF ELEMENTARY ANALYSIS | | | |
|---|---|---|---|
| | C (%) | H (%) | O (%) |
| Example 19 | | | |
| Calcd. | 77.03 | 8.31 | 14.66 |
| Found | 76.9 | 8.2 | 14.5 |
| Example 22 | | | |
| Calcd. | 77.38 | 8.56 | 14.06 |
| Found | 77.3 | 8.4 | 13.8 |
| Example 23 | | | |
| Calcd. | 76.83 | 8.19 | 14.98 |
| Found | 76.8 | 8.2 | 15.0 |
| Example 25 | | | |
| Calcd. | 77.71 | 8.79 | 13.50 |
| Found | 77.8 | 8.8 | 13.4 |

TABLE 5

| | Repeating Unit | Phase transition temperature (°C.) | Number average molecular weight (Mn) | Response time (temperature °C.) |
|---|---|---|---|---|
| Example 19 | —(Z1)— —(C$_3$H$_6$CHC$_3$H$_6$)— O(CH$_2$)$_{10}$O—Ph—Ph—COO—Ph—COOCHC$_3$H$_7$(CH$_3$)* | g <—20/<—20 SmC* 86/85 Iso | 1,700 | 140 μs (60° C.) 530 μs (40° C.) 2.6 ms (25° C.) |
| Example 20 | —(Z2)— —(C$_3$H$_6$CHC$_3$H$_6$)— O(CH$_2$)$_{10}$O—Ph—Ph—COO—Ph—COOCHC$_3$H$_7$(CH$_3$)* | g —20/—20 SmC* 82/80 Iso | 1,800 | 170 μs (60° C.) 630 μs (40° C.) 2.7 ms (25° C.) |
| Example 21 | —(Z3)— —(C$_3$H$_6$CHC$_3$H$_6$)— O(CH$_2$)$_{10}$O—Ph—Ph—COO—Ph—COOCHC$_3$H$_7$(CH$_3$)* | g —20/—20 SmC* 66/65 Iso | 1,900 | 370 μs (50° C.) 700 μs (40° C.) 2.5 ms (25° C.) |
| Example 22 | —(Z1)— —(C$_4$H$_8$CHC$_4$H$_8$)— O(CH$_2$)$_{10}$O—Ph—Ph—COO—Ph—COOCHC$_3$H$_7$(CH$_3$)* | g <—20/<—20 SmC* 60/59 Iso | 1,300 | 110 μs (50° C.) 240 μs (40° C.) 900 μs (25° C.) |
| Example 23 | —(Z2)— —(C$_3$H$_6$CHC$_2$H$_4$)— O(CH$_2$)$_{10}$O—Ph—Ph—COO—Ph—COOCHC$_3$H$_7$(CH$_3$)* | g <—20 SmC* 60/105 Iso | 2,100 | 500 μs (50° C.) 2.3 ms (40° C.) 41.3 ms (25° C.) |
| Example 24 | —(Z3)— —(C$_3$H$_6$CHC$_2$H$_4$)— O(CH$_2$)$_{10}$O—Ph—Ph—COO—Ph—COOCHC$_3$H$_7$(CH$_3$)* | g <—20 SmC* 107/103 Iso | 1,800 | 180 μs (60° C.) 680 μs (40° C.) 2.5 ms (25° C.) |
| Example 25 | —(Z1)— —(C$_5$H$_{10}$CHC$_5$H$_{10}$)— O(CH$_2$)$_{10}$O—Ph—Ph—COO—Ph—COOCHC$_3$H$_7$(CH$_3$)* | g <—20 SmC* 70/68 Iso | 1,300 | 76 μs (60° C.) 370 μs (40° C.) 1.4 ms (25° C.) |

Z1: CH$_3$—Si(CH$_3$)$_2$—O—Si(CH$_3$)$_2$—O—Si(CH$_3$)$_2$—O—Si(CH$_3$)$_2$—

Z2: CH$_3$—Si(CH$_3$)$_2$—O—Si(CH$_3$)$_2$—O—Si(CH$_3$)$_2$—

Z3: CH$_3$—Si(CH$_3$)$_2$—O—Si(CH$_3$)$_2$—O—Si(CH$_3$)$_2$—O—Si(CH$_3$)$_2$—O—Si(CH$_3$)$_2$—

INDUSTRIAL APPLICABILITY

The liquid-crystalline copolymer obtained according to the present invention exhibits ferroelectricity at a wide range of temperature including room temperature and as well responds to external electric fields at high speed. The liquid-crystalline copolymer, therefore, is useful for various kinds of electronic optical devices in the field of optoelectronics and is also usable advantageously as a display element for display devices of large picture plane or bent picture plane.

We claim:

1. A diene compound represented by the following general formula

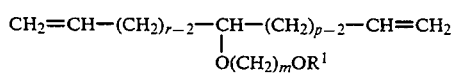

wherein each of r and p is an integer of 2 to 5, m is an integer of 1 to 20, and $R^1$ is

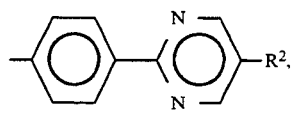

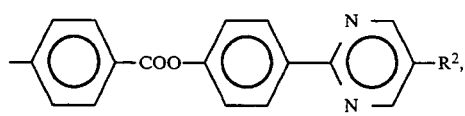

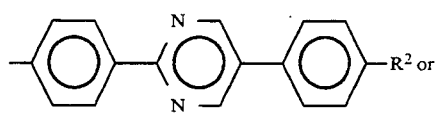

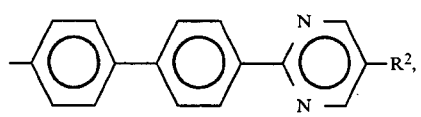

$R^2$ being

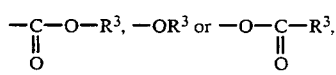

$R^3$ being

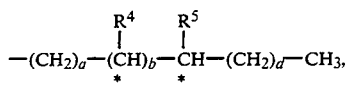

each of $R^4$ and $R^5$ being —$CH_3$ or a halogen atom, each of a and d being an integer of 0 to 10, b being an integer of 0 or 1, with the proviso that d is not 0 when $R^5$ is —$CH_3$.

2. The diene compound as claimed in claim 1, wherein $R^1$ is selected from the group consisting of

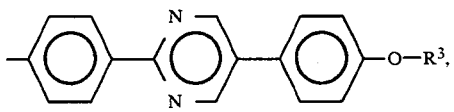

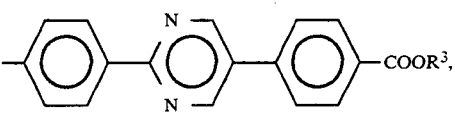

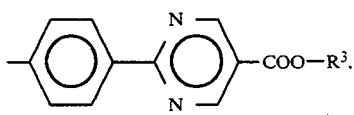

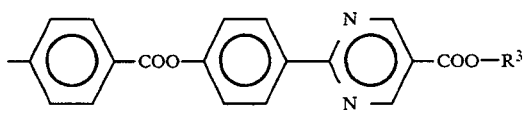

and

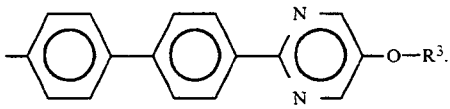

3. The diene compound as claimed in claim 1, wherein $R^3$ is selected from the group consisting of

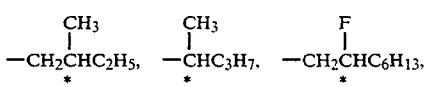

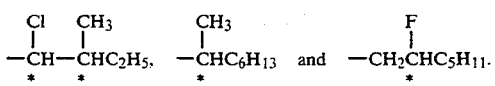

* * * * *